US012384410B2

(12) United States Patent
Zhang et al.

(10) Patent No.: US 12,384,410 B2
(45) Date of Patent: Aug. 12, 2025

(54) TASK-MOTION PLANNING FOR SAFE AND EFFICIENT URBAN DRIVING

(71) Applicant: The Research Foundation for The State University of New York, Binghamton, NY (US)

(72) Inventors: Shiqi Zhang, Vestal, NY (US); Yan Ding, Shanghai (CN)

(73) Assignee: The Research Foundation for The State University of New York, Binghamton, NY (US)

( * ) Notice: Subject to any disclaimer, the term of this patent is extended or adjusted under 35 U.S.C. 154(b) by 323 days.

(21) Appl. No.: 17/687,636

(22) Filed: Mar. 5, 2022

(65) Prior Publication Data

US 2022/0306152 A1    Sep. 29, 2022

Related U.S. Application Data

(60) Provisional application No. 63/200,431, filed on Mar. 5, 2021.

(51) Int. Cl.
*B60W 60/00*    (2020.01)
*B60W 30/14*    (2006.01)
(Continued)

(52) U.S. Cl.
CPC ...... *B60W 60/0011* (2020.02); *B60W 30/143* (2013.01); *B60W 40/04* (2013.01);
(Continued)

(58) Field of Classification Search
CPC ......... B60W 60/0011; B60W 60/0015; B60W 60/00274; B60W 30/143; B60W 40/04;
(Continued)

(56) References Cited

U.S. PATENT DOCUMENTS 4,296,901 A    10/1981    Perrott
4,833,469 A     5/1989    David
(Continued)

OTHER PUBLICATIONS

Quach Hai Tho, Huynh Cong Phap, Pham Anh Phuong, A Predictive Control Solution for Contingency Motion Planning for Autonomous Vehicle, 2019 IEEE-RIVF International Conference on Computing and Communication Technologies (RIVF) (pp. 1-6) (Year: 2019).*

*Primary Examiner* — Scott A Browne
*Assistant Examiner* — Terry C Buse
(74) *Attorney, Agent, or Firm* — Hoffberg & Associates; Steven M. Hoffberg

(57) ABSTRACT

Autonomous vehicles plan at a task level to compute a sequence of symbolic actions to fulfill service requests, where efficiency is the main concern. The vehicle computes continuous trajectories to perform actions at the motion level, where safety is important. Task-motion planning in autonomous driving faces the problem of maximizing task-level efficiency while ensuring motion-level safety. Task-Motion Planning for Urban Driving (TMPUD) enables the task and motion planners to communicate about the safety level of driving behaviors. The motion planner incrementally advances the vehicle toward a goal with an associated incremental utility, based on at least a safety of motion trajectories. The task planner defines the goal and a sequence of the actions to advance the vehicle toward the goal, dependent an optimization of aggregate prospective utility of the task and the safety of the motion trajectories.

20 Claims, 6 Drawing Sheets

(51) Int. Cl.
    *B60W 40/04*        (2006.01)
    *B60W 40/06*        (2012.01)
(52) U.S. Cl.
    CPC ........ *B60W 40/06* (2013.01); *B60W 60/0015*
        (2020.02); *B60W 60/00274* (2020.02); *B60W*
        *2540/18* (2013.01); *B60W 2554/80* (2020.02)
(58) Field of Classification Search
    CPC ............. B60W 40/06; B60W 2554/80; B60W
                                                   2540/18
    See application file for complete search history.

(56)                References Cited

U.S. PATENT DOCUMENTS

| | | |
|---|---|---|
| 4,940,925 A | 7/1990 | Wand |
| 5,281,901 A | 1/1994 | Yardley |
| 5,341,130 A | 8/1994 | Yardley |
| 5,375,059 A | 12/1994 | Kyrtsos |
| 5,390,125 A | 2/1995 | Sennott |
| 5,402,355 A | 3/1995 | Bahlmann |
| 5,438,517 A | 8/1995 | Sennott |
| 5,548,516 A | 8/1996 | Gudat |
| 5,610,815 A | 3/1997 | Gudat |
| 5,612,883 A | 3/1997 | Shaffer |
| 5,629,855 A | 5/1997 | Kyrtsos |
| 5,640,323 A | 6/1997 | Kleimenhagen |
| 5,646,843 A | 7/1997 | Gudat |
| 5,650,703 A | 7/1997 | Yardley |
| 5,657,226 A | 8/1997 | Shin |
| 5,680,306 A | 10/1997 | Shin |
| 5,684,696 A | 11/1997 | Rao |
| 5,747,683 A | 5/1998 | Gerum |
| 5,838,562 A | 11/1998 | Gudat |
| 5,938,710 A | 8/1999 | Lanza |
| 5,995,882 A | 11/1999 | Patterson |
| 6,069,420 A | 5/2000 | Mizzi |
| 6,122,572 A | 9/2000 | Yavnai |
| 6,151,539 A | 11/2000 | Bergholz |
| 6,269,763 B1 | 8/2001 | Woodland |
| 6,351,697 B1 | 2/2002 | Baker |
| 6,393,362 B1 | 5/2002 | Burns |
| 6,442,456 B2 | 8/2002 | Burns |
| 6,799,100 B2 | 9/2004 | Burns |
| 6,804,607 B1 | 10/2004 | Wood |
| 7,047,888 B2 | 5/2006 | Richards |
| 7,197,699 B2 | 3/2007 | Bhogal |
| 7,219,350 B2 | 5/2007 | Bhogal |
| 7,302,316 B2 | 11/2007 | Beard |
| 7,335,067 B2 | 2/2008 | Lee |
| 7,343,232 B2 | 3/2008 | Duggan |
| 7,440,942 B2 | 10/2008 | Dixon |
| 7,494,090 B2 | 2/2009 | Leal |
| 7,496,226 B2 | 2/2009 | Negahdaripour |
| 7,542,828 B2 | 6/2009 | Steele |
| 7,591,630 B2 | 9/2009 | Lert, Jr. |
| 7,693,624 B2 | 4/2010 | Duggan |
| 7,737,878 B2 | 6/2010 | van Tooren |
| 7,844,396 B2 | 11/2010 | Zeitzew |
| 7,911,400 B2 | 3/2011 | Kaplan |
| 7,949,541 B2 | 5/2011 | McGinn |
| 7,979,172 B2 | 7/2011 | Breed |
| 7,979,173 B2 | 7/2011 | Breed |
| 7,991,505 B2 | 8/2011 | Lert, Jr. |
| 8,060,271 B2 | 11/2011 | Dolgov |
| 8,068,949 B2 | 11/2011 | Duggan |
| 8,103,398 B2 | 1/2012 | Duggan |
| 8,109,223 B2 | 2/2012 | Jamieson |
| 8,126,642 B2 | 2/2012 | Trepagnier |
| 8,127,353 B2 | 2/2012 | Rittermann |
| 8,255,092 B2 | 8/2012 | Phillips |
| 8,272,055 B2 | 9/2012 | Wease |
| 8,280,623 B2 | 10/2012 | Trepagnier |
| 8,289,882 B2 | 10/2012 | Vogel, III |
| 8,301,326 B2 | 10/2012 | Malecki |
| 8,355,834 B2 | 1/2013 | Duggan |
| 8,364,334 B2 | 1/2013 | Au |
| 8,412,449 B2 | 4/2013 | Trepagnier |
| 8,433,790 B2 | 4/2013 | Polley |
| 8,437,875 B2 | 5/2013 | Hernandez |
| 8,437,890 B2 | 5/2013 | Anderson |
| 8,442,713 B2 | 5/2013 | Kim |
| 8,474,043 B2 | 6/2013 | Sturges |
| 8,576,430 B2 | 11/2013 | Balduccini |
| 8,577,538 B2 | 11/2013 | Lenser |
| 8,578,002 B1 | 11/2013 | Roesch |
| 8,583,313 B2 | 11/2013 | Mian |
| 8,601,034 B2 | 12/2013 | Roesch |
| 8,606,589 B2 | 12/2013 | McGinn |
| 8,612,084 B2 | 12/2013 | Hennessy |
| 8,671,182 B2 | 3/2014 | Vogel, III |
| 8,677,486 B2 | 3/2014 | Olney |
| 8,706,394 B2 | 4/2014 | Trepagnier |
| 8,744,648 B2 | 6/2014 | Anderson |
| 8,751,143 B2 | 6/2014 | Kelly |
| 8,755,997 B2 | 6/2014 | Au |
| 8,755,999 B2 | 6/2014 | Kelly |
| 8,768,555 B2 | 7/2014 | Duggan |
| 8,784,034 B2 | 7/2014 | Lert, Jr. |
| 8,798,828 B2 | 8/2014 | Erlston |
| 8,843,244 B2 | 9/2014 | Phillips |
| 8,880,287 B2 | 11/2014 | Lee |
| 8,935,071 B2 | 1/2015 | Lee |
| 8,947,531 B2 | 2/2015 | Fischer |
| 8,948,955 B2 | 2/2015 | Zhu |
| 8,954,194 B2 | 2/2015 | Allis |
| 8,988,524 B2 | 3/2015 | Smyth |
| 8,990,387 B2 | 3/2015 | Burchfield |
| 9,055,094 B2 | 6/2015 | Wease |
| 9,059,960 B2 | 6/2015 | Burchfield |
| 9,097,800 B1 | 8/2015 | Zhu |
| 9,100,363 B2 | 8/2015 | Burchfield |
| 9,110,905 B2 | 8/2015 | Polley |
| 9,117,201 B2 | 8/2015 | Kennell |
| 9,120,484 B1 | 9/2015 | Ferguson |
| 9,120,485 B1 | 9/2015 | Dolgov |
| 9,135,432 B2 | 9/2015 | Roesch |
| 9,139,363 B2 | 9/2015 | Lert |
| 9,140,814 B2 | 9/2015 | Welker |
| 9,199,667 B2 | 12/2015 | Di Cairano |
| 9,201,421 B1 | 12/2015 | Fairfield |
| 9,201,424 B1 | 12/2015 | Ogale |
| 9,202,382 B2 | 12/2015 | Klinger |
| 9,208,456 B2 | 12/2015 | McGinn |
| 9,223,025 B2 | 12/2015 | Debrunner |
| 9,234,618 B1 | 1/2016 | Zhu |
| 9,261,590 B1 | 2/2016 | Brown |
| 9,265,187 B2 | 2/2016 | Cavender-Bares |
| 9,288,938 B2 | 3/2016 | Cavender-Bares |
| 9,298,186 B2 | 3/2016 | Harvey |
| 9,327,734 B2 | 5/2016 | Lombrozo |
| 9,349,055 B1 | 5/2016 | Ogale |
| 9,373,149 B2 | 6/2016 | Abhyanker |
| 9,373,262 B2 | 6/2016 | Stigler |
| 9,383,752 B2 | 7/2016 | Mian |
| 9,383,753 B1 | 7/2016 | Templeton |
| 9,384,666 B1 | 7/2016 | Harvey |
| 9,392,743 B2 | 7/2016 | Camacho-Cook |
| 9,423,498 B1 | 8/2016 | Brown |
| 9,432,929 B1 | 8/2016 | Ross |
| 9,434,309 B1 | 9/2016 | Smyth |
| 9,435,652 B2 | 9/2016 | Ralston |
| 9,450,975 B2 | 9/2016 | Wease |
| 9,451,020 B2 | 9/2016 | Liu |
| 9,494,439 B1 | 11/2016 | Ross |
| 9,494,940 B1 | 11/2016 | Kentley |
| 9,494,943 B2 | 11/2016 | Harvey |
| 9,507,346 B1 | 11/2016 | Levinson |
| 9,508,260 B2 | 11/2016 | Shaik |
| 9,510,316 B2 | 11/2016 | Skaaksrud |
| 9,513,632 B1 | 12/2016 | Gordon |
| 9,517,767 B1 | 12/2016 | Kentley |
| 9,523,984 B1 | 12/2016 | Herbach |
| 9,523,986 B1 | 12/2016 | Abebe |

(56) References Cited

U.S. PATENT DOCUMENTS

| | | |
|---|---|---|
| 9,535,423 B1 | 1/2017 | Debreczeni |
| 9,536,427 B2 | 1/2017 | Tonguz |
| 9,545,995 B1 | 1/2017 | Chau |
| 9,547,309 B2 | 1/2017 | Ross |
| 9,547,986 B1 | 1/2017 | Curlander |
| 9,547,989 B2 | 1/2017 | Fairfield |
| 9,557,736 B1 | 1/2017 | Silver |
| 9,559,804 B2 | 1/2017 | Ibrahim |
| 9,561,941 B1 | 2/2017 | Watts |
| 9,563,199 B1 | 2/2017 | Ferguson |
| 9,581,460 B1 | 2/2017 | McNew |
| 9,584,535 B2 | 2/2017 | Roesch |
| 9,598,239 B2 | 3/2017 | Lert, Jr. |
| 9,599,989 B1 | 3/2017 | Brown |
| 9,603,158 B1 | 3/2017 | Ross |
| 9,606,539 B1 | 3/2017 | Kentley |
| 9,612,123 B1 | 4/2017 | Levinson |
| 9,630,619 B1 | 4/2017 | Kentley |
| 9,632,502 B1 | 4/2017 | Levinson |
| 9,645,578 B2 | 5/2017 | Harvey |
| 9,662,068 B2 | 5/2017 | Raymondos |
| 9,669,904 B2 | 6/2017 | Hanson |
| 9,672,446 B1 | 6/2017 | Vallespi-Gonzalez |
| 9,674,759 B2 | 6/2017 | Czaja |
| 9,679,191 B1 | 6/2017 | Zhu |
| 9,679,206 B1 | 6/2017 | Ferguson |
| 9,688,396 B2 | 6/2017 | Avery, III |
| 9,693,297 B2 | 6/2017 | Condeixa |
| 9,702,098 B1 | 7/2017 | King |
| 9,702,443 B2 | 7/2017 | Erlston |
| 9,707,966 B2 | 7/2017 | Herbach |
| 9,710,710 B2 | 7/2017 | Malecki |
| 9,718,471 B2 | 8/2017 | Gordon |
| 9,720,412 B1 | 8/2017 | Zhu |
| 9,720,415 B2 | 8/2017 | Levinson |
| 9,721,397 B2 | 8/2017 | Gordon |
| 9,733,378 B2 | 8/2017 | Carcaterra |
| 9,734,455 B2 | 8/2017 | Levinson |
| 9,739,881 B1 | 8/2017 | Pavek |
| 9,740,205 B2 | 8/2017 | Ross |
| 9,746,444 B2 | 8/2017 | Goroshevskiy |
| 9,754,490 B2 | 9/2017 | Kentley |
| 9,760,092 B2 | 9/2017 | Ferguson |
| 9,761,136 B2 | 9/2017 | Tonguz |
| 9,766,333 B1 | 9/2017 | Brown |
| 9,783,075 B2 | 10/2017 | Henry |
| 9,783,262 B2 | 10/2017 | Dubose |
| 9,788,282 B2 | 10/2017 | Neves |
| 9,798,329 B2 | 10/2017 | Shattil |
| 9,802,661 B1 | 10/2017 | Kentley-Klay |
| 9,802,759 B2 | 10/2017 | Lert, Jr. |
| 9,804,594 B2 | 10/2017 | Gariepy |
| 9,804,599 B2 | 10/2017 | Kentley-Klay |
| 9,804,601 B2 | 10/2017 | Lombrozo |
| 9,805,605 B2 | 10/2017 | Ramanujam |
| 9,821,801 B2 | 11/2017 | Di Cairano |
| 9,821,807 B2 | 11/2017 | Herbach |
| 9,833,901 B2 | 12/2017 | Perrone |
| 9,834,224 B2 | 12/2017 | Gordon |
| 9,836,973 B2 | 12/2017 | Gordon |
| 9,857,795 B2 | 1/2018 | Gupta |
| 9,857,798 B2 | 1/2018 | Ogale |
| 9,862,391 B2 | 1/2018 | Morfin |
| 9,864,378 B1 | 1/2018 | Ferguson |
| 9,868,332 B2 | 1/2018 | Anderson |
| 9,874,871 B1 | 1/2018 | Zhu |
| 9,878,664 B2 | 1/2018 | Kentley-Klay |
| 9,884,630 B1 | 2/2018 | Ross |
| 9,891,333 B2 | 2/2018 | Valsvik |
| 9,896,100 B2 | 2/2018 | Gordon |
| 9,898,005 B2 | 2/2018 | Mei |
| 9,902,396 B2 | 2/2018 | Itagaki |
| 9,904,286 B2 | 2/2018 | Kozak |
| 9,910,434 B1 | 3/2018 | Nelson |
| 9,910,441 B2 | 3/2018 | Levinson |
| 9,911,030 B1 | 3/2018 | Zhu |
| 9,913,240 B2 | 3/2018 | Skaaksrud |
| 9,915,950 B2 | 3/2018 | Hartung |
| 9,916,538 B2 | 3/2018 | Zadeh |
| 9,916,703 B2 | 3/2018 | Levinson |
| 9,921,065 B2 | 3/2018 | Brannstrom |
| 9,925,462 B2 | 3/2018 | Sakakibara |
| 9,933,779 B2 | 4/2018 | Ross |
| 9,939,817 B1 | 4/2018 | Kentley-Klay |
| 9,940,651 B2 | 4/2018 | Ross |
| 9,944,291 B2 | 4/2018 | Gordon |
| 9,946,531 B1 | 4/2018 | Fields |
| 9,946,890 B2 | 4/2018 | Valasek |
| 9,947,224 B2 | 4/2018 | Fairfield |
| 9,948,917 B2 | 4/2018 | Inacio De Matos |
| 9,949,228 B2 | 4/2018 | Skaaksrud |
| 9,950,568 B2 | 4/2018 | Edgren |
| 9,955,436 B2 | 4/2018 | Neves |
| 9,958,379 B1 | 5/2018 | Zhu |
| 9,958,864 B2 | 5/2018 | Kentley-Klay |
| 9,958,875 B2 | 5/2018 | Paduano |
| 9,959,754 B1 | 5/2018 | King |
| 9,963,143 B2 | 5/2018 | Lu |
| 9,964,952 B1 | 5/2018 | Costa |
| 9,964,954 B1 | 5/2018 | Silver |
| 9,967,815 B2 | 5/2018 | Condeixa |
| 9,969,285 B2 | 5/2018 | Henry |
| 9,969,326 B2 | 5/2018 | Ross |
| 9,969,481 B2 | 5/2018 | Stigler |
| 9,977,430 B2 | 5/2018 | Shalev-Shwartz |
| 9,981,669 B2 | 5/2018 | Gordon |
| 9,983,305 B2 | 5/2018 | Pavek |
| 9,988,055 B1 | 6/2018 | O'Flaherty et al. |
| 9,989,645 B2 | 6/2018 | Donnelly |
| 10,000,124 B2 | 6/2018 | Kentley-Klay |
| 10,000,338 B2 | 6/2018 | Lert, Jr. |
| 10,007,264 B2 | 6/2018 | Zhu |
| 10,007,271 B2 | 6/2018 | Amla |
| 10,012,981 B2 | 7/2018 | Gariepy |
| 10,012,990 B2 | 7/2018 | Rander |
| 10,019,002 B2 | 7/2018 | Harnett |
| 10,019,008 B2 | 7/2018 | Kong |
| 10,019,011 B1 | 7/2018 | Green |
| 10,030,418 B2 | 7/2018 | McGinn |
| 10,031,521 B1 | 7/2018 | Newman |
| 10,031,526 B1 | 7/2018 | Li |
| 10,037,553 B2 | 7/2018 | Ross |
| 10,040,632 B2 | 8/2018 | Lert, Jr. |
| 10,048,683 B2 | 8/2018 | Levinson |
| 10,049,328 B2 | 8/2018 | Jiang |
| 10,053,091 B2 | 8/2018 | Jiang |
| 10,054,945 B2 | 8/2018 | Zhu |
| 10,055,653 B2 | 8/2018 | Cohen |
| 10,061,313 B2 | 8/2018 | Letwin |
| 10,061,325 B2 | 8/2018 | Watts |
| 10,065,638 B1 | 9/2018 | Wood |
| 10,065,654 B2 | 9/2018 | Nishi |
| 10,073,456 B2 | 9/2018 | Mudalige |
| 10,073,462 B2 | 9/2018 | Debreczeni |
| 10,074,223 B2 | 9/2018 | Newman |
| 10,083,604 B2 | 9/2018 | Ricci |
| 10,086,782 B1 | 10/2018 | Konrardy |
| 10,089,116 B2 | 10/2018 | Valasek |
| 10,095,236 B1 | 10/2018 | Ferguson |
| 10,096,067 B1 | 10/2018 | Slusar |
| 10,109,195 B2 | 10/2018 | Gordon |
| 10,118,577 B1 | 11/2018 | Sweeney |
| 10,118,639 B2 | 11/2018 | Zhu |
| 10,122,736 B2 | 11/2018 | Baxley |
| 10,123,473 B2 | 11/2018 | Cavender-Bares |
| 10,126,136 B2 | 11/2018 | Iagnemma |
| 10,126,742 B2 | 11/2018 | Ross |
| 10,126,749 B2 | 11/2018 | Rander |
| 10,127,465 B2 | 11/2018 | Cohen |
| 10,127,818 B2 | 11/2018 | Mandeville-Clarke |
| 10,133,275 B1 | 11/2018 | Kobilarov |
| 10,134,278 B1 | 11/2018 | Konrardy |
| 10,137,896 B2 | 11/2018 | Zhuang |
| 10,137,903 B2 | 11/2018 | Tascione |

(56) References Cited

U.S. PATENT DOCUMENTS

| | | |
|---|---|---|
| 10,139,237 B2 | 11/2018 | Outwater |
| 10,139,818 B2 | 11/2018 | Tao |
| 10,139,823 B2 | 11/2018 | Prokhorov |
| 10,139,828 B2 | 11/2018 | Ho |
| 10,140,468 B2 | 11/2018 | Valasek |
| 10,143,040 B2 | 11/2018 | Condeixa |
| 10,152,891 B2 | 12/2018 | Rusciolelli |
| 10,156,845 B1 | 12/2018 | Greenberger |
| 10,156,848 B1 | 12/2018 | Konrardy |
| 10,156,849 B1 | 12/2018 | Zych |
| 10,156,850 B1 | 12/2018 | Ansari |
| 10,157,423 B1 | 12/2018 | Fields |
| 10,160,378 B2 | 12/2018 | Sweeney |
| 10,160,457 B1 | 12/2018 | O'Flaherty et al. |
| 10,160,484 B2 | 12/2018 | Lee |
| 10,162,354 B2 | 12/2018 | Kong |
| 10,163,139 B2 | 12/2018 | Ross |
| 10,166,994 B1 | 1/2019 | Fields |
| 10,168,703 B1 | 1/2019 | Konrardy |
| 10,171,967 B2 | 1/2019 | Ameixieira |
| 10,173,679 B2 | 1/2019 | Gordon |
| 10,179,700 B2 | 1/2019 | Lert, Jr. |
| 10,187,751 B2 | 1/2019 | Coutinho |
| 10,188,024 B2 | 1/2019 | Rusciolelli |
| 10,191,493 B2 | 1/2019 | Zhu |
| 10,197,407 B2 | 2/2019 | Mouthaan |
| 10,198,619 B1 | 2/2019 | Zhu |
| 10,202,117 B2 | 2/2019 | Gordon |
| 10,203,697 B2 | 2/2019 | Ogale |
| 10,205,457 B1 | 2/2019 | Josefsberg |
| 10,209,715 B2 | 2/2019 | Hardy |
| 10,214,240 B2 | 2/2019 | Ghose |
| 10,216,196 B2 | 2/2019 | Harvey |
| 10,220,705 B2 | 3/2019 | Ramanujam |
| 10,220,857 B2 | 3/2019 | Jones |
| 10,222,211 B2 | 3/2019 | Chen |
| 10,222,462 B2 | 3/2019 | Brown |
| 10,222,798 B1 | 3/2019 | Brady |
| 10,223,479 B1 | 3/2019 | Konrardy |
| 10,223,916 B2 | 3/2019 | Song |
| 10,225,348 B2 | 3/2019 | Wang |
| 10,227,075 B2 | 3/2019 | Zhu |
| 10,228,690 B2 | 3/2019 | Bostick |
| 10,229,590 B2 | 3/2019 | Du |
| 10,233,021 B1 | 3/2019 | Brady |
| 10,234,863 B2 | 3/2019 | Ross |
| 10,235,881 B2 | 3/2019 | Nishi |
| 10,241,509 B1 | 3/2019 | Fields |
| 10,241,516 B1 | 3/2019 | Brady |
| 10,243,604 B2 | 3/2019 | Ross |
| 10,245,993 B1 | 4/2019 | Brady |
| 10,246,097 B1 | 4/2019 | Fields |
| 10,248,119 B2 | 4/2019 | Kentley-Klay |
| 10,248,120 B1 | 4/2019 | Siegel |
| 10,248,124 B2 | 4/2019 | Bellaiche |
| 10,249,109 B1 | 4/2019 | Konrardy |
| 10,253,468 B1 | 4/2019 | Linville |
| 10,254,763 B2 | 4/2019 | Tatourian |
| 10,256,890 B2 | 4/2019 | Neves |
| 10,259,514 B2 | 4/2019 | Kentley-Klay |
| 10,260,898 B2 | 4/2019 | McNew |
| 10,261,514 B2 | 4/2019 | Zych |
| 10,262,217 B2 | 4/2019 | Cohen |
| 10,266,180 B1 | 4/2019 | Fields |
| 10,267,634 B2 | 4/2019 | Chen |
| 10,267,635 B2 | 4/2019 | Chen |
| 10,268,200 B2 | 4/2019 | Fang |
| 10,272,778 B2 | 4/2019 | Zhu |
| 10,272,924 B2 | 4/2019 | Luo |
| 10,284,777 B2 | 5/2019 | Rogers |
| 10,288,439 B2 | 5/2019 | Pedersen |
| 10,289,110 B2 | 5/2019 | Zhu |
| 10,293,932 B2 | 5/2019 | Alzahrani |
| 10,295,363 B1 | 5/2019 | Konrardy |
| 10,296,004 B2 | 5/2019 | Nishi |
| 10,296,006 B2 | 5/2019 | Lee |
| 10,298,910 B1 | 5/2019 | Kroeger |
| 10,303,171 B1 | 5/2019 | Brady |
| 10,303,174 B2 | 5/2019 | Kentley-Klay |
| 10,303,182 B2 | 5/2019 | Harvey |
| 10,303,183 B2 | 5/2019 | Harvey |
| 10,303,959 B2 | 5/2019 | Cohen |
| 10,305,765 B2 | 5/2019 | Church |
| 10,308,430 B1 | 6/2019 | Brady |
| 10,309,777 B2 | 6/2019 | Zhang |
| 10,309,778 B2 | 6/2019 | Zhang |
| 10,309,792 B2 | 6/2019 | Iagnemma |
| 10,310,499 B1 | 6/2019 | Brady |
| 10,310,500 B1 | 6/2019 | Brady |
| 10,310,514 B2 | 6/2019 | Harvey |
| 10,310,515 B2 | 6/2019 | Harvey |
| 10,310,517 B2 | 6/2019 | Paduano |
| 10,311,731 B1 | 6/2019 | Li |
| 10,317,231 B2 | 6/2019 | Ferencz |
| 10,317,899 B2 | 6/2019 | Liu |
| 10,317,911 B2 | 6/2019 | Harvey |
| 10,317,912 B2 | 6/2019 | Harvey |
| 10,317,913 B2 | 6/2019 | Harvey |
| 10,319,224 B2 | 6/2019 | de Azevedo |
| 10,324,463 B1 | 6/2019 | Konrardy |
| 10,327,160 B2 | 6/2019 | Lopes |
| 10,331,127 B2 | 6/2019 | Oba |
| 10,331,133 B2 | 6/2019 | Lombrozo |
| 10,331,136 B2 | 6/2019 | Perrone |
| 10,331,138 B2 | 6/2019 | Zhu |
| 10,331,141 B2 | 6/2019 | Grimm |
| 10,332,320 B2 | 6/2019 | Lakshamanan |
| 10,334,050 B2 | 6/2019 | Kentley-Klay |
| 10,336,321 B1 | 7/2019 | Fields |
| 10,338,594 B2 | 7/2019 | Long |
| 10,342,067 B2 | 7/2019 | Coutinho |
| 10,343,559 B2 | 7/2019 | Xiao |
| 10,343,685 B2 | 7/2019 | Zhu |
| 10,343,698 B2 | 7/2019 | Poeppel |
| 10,345,808 B2 | 7/2019 | Wilkinson |
| 10,345,809 B2 | 7/2019 | Ross |
| 10,345,810 B1 | 7/2019 | Zhu |
| 10,349,011 B2 | 7/2019 | Du |
| 10,351,261 B1 | 7/2019 | Bryant |
| 10,353,390 B2 | 7/2019 | Linscott |
| 10,353,393 B2 | 7/2019 | Zhu |
| 10,353,694 B1 | 7/2019 | Fields |
| 10,353,931 B2 | 7/2019 | Wheeler |
| 10,354,157 B2 | 7/2019 | Cohen |
| 10,358,147 B2 | 7/2019 | Zamorano Morfín |
| 10,359,783 B2 | 7/2019 | Williams |
| 10,360,021 B2 | 7/2019 | Pereira Cabral |
| 10,364,027 B2 | 7/2019 | Loveland |
| 10,365,654 B2 | 7/2019 | Wood |
| 10,365,657 B2 | 7/2019 | Tokuyama |
| 10,369,974 B2 | 8/2019 | Carlson |
| 10,372,129 B1 | 8/2019 | Urmson |
| 10,372,130 B1 | 8/2019 | Kaushansky |
| 10,372,141 B2 | 8/2019 | Donnelly |
| 10,373,097 B2 | 8/2019 | Kulkarni |
| 10,373,268 B1 | 8/2019 | Orphys |
| 10,379,538 B1 | 8/2019 | Sheckells |
| 10,380,890 B2 | 8/2019 | Wang |
| 10,386,192 B1 | 8/2019 | Konrardy |
| 10,386,856 B2 | 8/2019 | Wood |
| 10,388,155 B2 | 8/2019 | Curlander |
| 10,388,162 B2 | 8/2019 | de Moura |
| 10,392,025 B2 | 8/2019 | Ross |
| 10,394,245 B2 | 8/2019 | Li |
| 10,395,285 B2 | 8/2019 | Ross |
| 10,395,332 B1 | 8/2019 | Konrardy |
| 10,397,019 B2 | 8/2019 | Hartung |
| 10,399,458 B2 | 9/2019 | Prunty |
| 10,401,852 B2 | 9/2019 | Levinson |
| 10,401,867 B2 | 9/2019 | Strautmann |
| 10,405,215 B2 | 9/2019 | Tavares Coutinho |
| 10,407,076 B2 | 9/2019 | Luo |
| 10,409,279 B2 | 9/2019 | Kwon |
| 10,410,250 B2 | 9/2019 | Singhal |

(56) References Cited

U.S. PATENT DOCUMENTS

| | | |
|---|---|---|
| 10,410,747 B2 | 9/2019 | Matos |
| 10,416,670 B1 | 9/2019 | Fields |
| 10,416,671 B2 | 9/2019 | Herbach |
| 10,416,677 B2 | 9/2019 | Dean |
| 10,421,460 B2 | 9/2019 | Jiang |
| 10,421,463 B2 | 9/2019 | Luo |
| 10,423,162 B2 | 9/2019 | Yalla |
| 10,425,954 B2 | 9/2019 | Karjee |
| 10,429,194 B2 | 10/2019 | Wheeler |
| 10,429,849 B2 | 10/2019 | Zhang |
| 10,430,653 B2 | 10/2019 | Malecki |
| 10,431,018 B1 | 10/2019 | Fields |
| 10,433,243 B2 | 10/2019 | Lopes |
| 10,435,015 B2 | 10/2019 | Kong |
| 10,435,242 B2 | 10/2019 | Lert, Jr. |
| 10,436,595 B2 | 10/2019 | Wang |
| 10,436,885 B2 | 10/2019 | Wheeler |
| 10,437,247 B2 | 10/2019 | Patel |
| 10,437,256 B2 | 10/2019 | Andert |
| 10,438,493 B2 | 10/2019 | Bavar |
| 10,440,547 B2 | 10/2019 | Ameixieira |
| 10,444,759 B2 | 10/2019 | Douillard |
| 10,446,031 B2 | 10/2019 | Agnew |
| 10,446,037 B2 | 10/2019 | Kentley-Klay |
| 10,449,957 B2 | 10/2019 | Nagy |
| 10,451,514 B2 | 10/2019 | Xu |
| 10,452,065 B2 | 10/2019 | Xiao |
| 10,452,070 B2 | 10/2019 | Greenfield |
| 10,459,441 B2 | 10/2019 | Zhuang |
| 10,459,444 B1 | 10/2019 | Kentley-Klay |
| 10,466,712 B2 | 11/2019 | Ferguson |
| 10,467,581 B2 | 11/2019 | Laury |
| 10,467,915 B2 | 11/2019 | Kessler |
| 10,469,282 B1 | 11/2019 | Konrardy |
| 10,469,753 B2 | 11/2019 | Yang |
| 10,471,976 B2 | 11/2019 | Mian |
| 10,473,780 B1 | 11/2019 | Brown |
| 10,474,149 B2 | 11/2019 | Palanisamy |
| 10,474,157 B2 | 11/2019 | Yu |
| 10,474,159 B2 | 11/2019 | Ferguson |
| 10,474,160 B2 | 11/2019 | Huang |
| 10,474,161 B2 | 11/2019 | Huang |
| 10,474,164 B2 | 11/2019 | Wheeler |
| 10,474,916 B2 | 11/2019 | Krishnan |
| 10,477,449 B2 | 11/2019 | Matos |
| 10,489,529 B2 | 11/2019 | Cahoon |
| 10,489,686 B2 | 11/2019 | Vallespi-Gonzalez |
| 10,490,068 B2 | 11/2019 | Nascimento |
| 10,493,622 B2 | 12/2019 | Sweeney |
| 10,493,936 B1 | 12/2019 | Konrardy |
| 10,496,098 B2 | 12/2019 | Zhu |
| 10,496,099 B2 | 12/2019 | Wilkinson |
| 10,496,766 B2 | 12/2019 | Levinson |
| 10,498,600 B2 | 12/2019 | Ramos de Azevedo |
| 10,501,014 B2 | 12/2019 | Castro |
| 10,503,165 B2 | 12/2019 | Hummelshøj |
| 10,503,172 B2 | 12/2019 | England |
| 10,504,306 B1 | 12/2019 | Konrardy |
| 10,506,509 B2 | 12/2019 | Condeixa |
| 10,507,787 B2 | 12/2019 | Ferguson |
| 10,508,986 B1 | 12/2019 | Zhu |
| 10,509,947 B1 | 12/2019 | Douillard |
| 10,513,161 B2 | 12/2019 | Anderson |
| 10,514,690 B1 | 12/2019 | Siegel |
| 10,514,692 B2 | 12/2019 | Liu |
| 10,514,700 B2 | 12/2019 | Cantrell |
| 10,514,709 B2 | 12/2019 | Shattil |
| 10,518,770 B2 | 12/2019 | Kroop |
| 10,520,319 B2 | 12/2019 | Zhu |
| 10,527,417 B2 | 1/2020 | Chen |
| 10,527,450 B2 | 1/2020 | McNew |
| 10,527,720 B2 | 1/2020 | Apker |
| 10,527,734 B2 | 1/2020 | Adachi |
| 10,528,048 B2 | 1/2020 | Cavender-Bares |
| 10,528,059 B2 | 1/2020 | Donnelly |
| 10,528,836 B1 | 1/2020 | Krishnan |
| 10,529,027 B1 | 1/2020 | Konrardy |
| 10,531,004 B2 | 1/2020 | Wheeler |
| 10,532,885 B1 | 1/2020 | Brady |
| 10,534,364 B2 | 1/2020 | Zhu |
| 10,536,497 B2 | 1/2020 | Condeixa |
| 10,543,838 B2 | 1/2020 | Kentley-Klay |
| 10,543,844 B2 | 1/2020 | Gordon |
| 10,545,024 B1 | 1/2020 | Konrardy |
| 10,545,029 B2 | 1/2020 | Yang |
| 10,545,507 B2 | 1/2020 | Aitken |
| 10,546,560 B2 | 1/2020 | Bradley |
| 10,549,752 B2 | 2/2020 | Zhu |
| 10,554,527 B2 | 2/2020 | Lopes |
| 10,554,901 B2 | 2/2020 | Kiser |
| 10,558,222 B2 | 2/2020 | Fridman |
| 10,558,864 B2 | 2/2020 | Huang |
| 10,562,538 B2 | 2/2020 | Lan |
| 10,563,993 B1 | 2/2020 | Ho |
| 10,564,643 B2 | 2/2020 | Lui |
| 10,567,650 B2 | 2/2020 | Rogers |
| 10,569,651 B2 | 2/2020 | Zhu |
| 10,569,663 B2 | 2/2020 | Webb |
| 10,569,773 B2 | 2/2020 | Zhao |
| 10,571,916 B2 | 2/2020 | Tschanz |
| 10,571,922 B2 | 2/2020 | Greenfield |
| 10,572,514 B2 | 2/2020 | Wheeler |
| 10,572,717 B1 | 2/2020 | Zhu |
| 10,573,178 B2 | 2/2020 | Nascimento |
| 10,576,966 B2 | 3/2020 | Endo |
| 10,576,991 B2 | 3/2020 | Gao |
| 10,579,054 B2 | 3/2020 | Zhao |
| 10,579,065 B2 | 3/2020 | Wang |
| 10,579,070 B1 | 3/2020 | Konrardy |
| 10,584,971 B1 | 3/2020 | Askeland |
| 10,586,458 B2 | 3/2020 | Bavar |
| 10,588,033 B2 | 3/2020 | Behera |
| 10,591,608 B2 | 3/2020 | Ibrahim |
| 10,591,910 B2 | 3/2020 | Levinson |
| 10,591,912 B2 | 3/2020 | Pedersen |
| 10,593,042 B1 | 3/2020 | Douillard |
| 10,595,175 B2 | 3/2020 | Ramalho de Oliveira |
| 10,596,339 B2 | 3/2020 | Musuku |
| 10,598,489 B2 | 3/2020 | Zhang |
| 10,599,141 B2 | 3/2020 | Liu |
| 10,599,546 B1 | 3/2020 | Walther |
| 10,606,270 B2 | 3/2020 | England |
| 10,606,274 B2 | 3/2020 | Yalla |
| 10,606,278 B2 | 3/2020 | Shalev-Shwartz |
| 10,606,786 B2 | 3/2020 | Fox |
| 10,607,293 B2 | 3/2020 | Gordon |
| 10,611,384 B1 | 4/2020 | VandenBerg, III |
| 10,611,389 B2 | 4/2020 | Khosla |
| 10,613,489 B2 | 4/2020 | Luo |
| 10,613,547 B2 | 4/2020 | Riess |
| 10,613,550 B2 | 4/2020 | Khosla |
| 10,618,519 B2 | 4/2020 | Marden |
| 10,621,860 B2 | 4/2020 | Coelho de Azevedo |
| 10,627,810 B2 | 4/2020 | Liu |
| 10,627,830 B2 | 4/2020 | Stein |
| 10,629,080 B2 | 4/2020 | Kazemi |
| 10,635,108 B2 | 4/2020 | Liu |
| 10,635,109 B2 | 4/2020 | Guo |
| 10,636,297 B2 | 4/2020 | Wang |
| 10,642,275 B2 | 5/2020 | Silva |
| 10,645,848 B1 | 5/2020 | Lu |
| 10,647,250 B1 | 5/2020 | Diehl |
| 10,647,333 B1 | 5/2020 | Donnelly |
| 10,649,453 B1 | 5/2020 | Svegliato |
| 10,649,458 B2 | 5/2020 | Sun |
| 10,649,462 B2 | 5/2020 | Shalev-Shwartz |
| 10,649,469 B2 | 5/2020 | Salas-Moreno |
| 10,654,476 B2 | 5/2020 | Wray |
| 10,656,657 B2 | 5/2020 | Djuric |
| 10,659,975 B2 | 5/2020 | Carreira |
| 10,664,918 B1 | 5/2020 | Slusar |
| 10,668,925 B2 | 6/2020 | Zhu |
| 10,670,411 B2 | 6/2020 | Starns |
| 10,670,416 B2 | 6/2020 | Wheeler |

(56) References Cited

U.S. PATENT DOCUMENTS

| | | |
|---|---|---|
| 10,671,075 B1 | 6/2020 | Kobilarov |
| 10,671,076 B1 | 6/2020 | Kobilarov |
| 10,671,077 B2 | 6/2020 | Ros Sanchez |
| 10,671,082 B2 | 6/2020 | Huang |
| 10,671,961 B2 | 6/2020 | Cao |
| 10,674,332 B2 | 6/2020 | Mineiro Ramos de Azevedo |
| 10,678,234 B2 | 6/2020 | Sun |
| 10,678,253 B2 | 6/2020 | Zeng |
| 10,679,497 B1 | 6/2020 | Konrardy |
| 10,683,012 B2 | 6/2020 | Zhu |
| 10,685,244 B2 | 6/2020 | Ge |
| 10,685,403 B1 | 6/2020 | Konrardy |
| 10,691,126 B1 | 6/2020 | Konrardy |
| 10,691,127 B2 | 6/2020 | Kobilarov |
| 10,691,130 B2 | 6/2020 | Phillips |
| 10,691,138 B2 | 6/2020 | Antunes Marques Esteves |
| 10,692,371 B1 | 6/2020 | Nix |
| 10,698,407 B2 | 6/2020 | Ostafew |
| 10,698,409 B1 | 6/2020 | Siegel |
| 10,698,414 B2 | 6/2020 | Stein |
| 10,699,579 B2 | 6/2020 | Hashimoto |
| 10,705,220 B2 | 7/2020 | Kim |
| 10,705,525 B2 | 7/2020 | Smolyanskiy |
| 10,705,534 B2 | 7/2020 | Kim |
| 10,705,536 B2 | 7/2020 | Miao |
| 10,705,539 B2 | 7/2020 | Pedersen |
| 10,705,814 B2 | 7/2020 | Schulte |
| 10,706,480 B1 | 7/2020 | Orphys |
| 10,708,823 B2 | 7/2020 | Condeixa |
| 10,710,592 B2 | 7/2020 | Lin |
| 10,710,633 B2 | 7/2020 | Carlson |
| 10,712,745 B2 | 7/2020 | Zych |
| 10,712,746 B2 | 7/2020 | Li |
| 10,712,750 B2 | 7/2020 | Kentley-Klay |
| 10,719,886 B1 | 7/2020 | Konrardy |
| 10,720,059 B2 | 7/2020 | Bartel |
| 10,725,469 B2 | 7/2020 | Harnett |
| 10,726,379 B1 | 7/2020 | Donnelly |
| 10,726,498 B1 | 7/2020 | Konrardy |
| 10,726,499 B1 | 7/2020 | Konrardy |
| 10,730,365 B2 | 8/2020 | Rice |
| 10,730,531 B1 | 8/2020 | Phillips |
| 10,732,639 B2 | 8/2020 | Palanisamy |
| 10,732,645 B2 | 8/2020 | Switkes |
| 10,733,673 B1 | 8/2020 | Slusar |
| 10,733,761 B2 | 8/2020 | Kroeger |
| 10,735,518 B2 | 8/2020 | Magalhães De Matos |
| 10,739,768 B2 | 8/2020 | Liao-Mcpherson |
| 10,739,774 B2 | 8/2020 | Parashar |
| 10,739,775 B2 | 8/2020 | Sun |
| 10,739,776 B2 | 8/2020 | Mukadam |
| 10,739,780 B1 | 8/2020 | Silver |
| 10,740,850 B1 | 8/2020 | Slusar |
| 10,740,988 B2 | 8/2020 | Liu |
| 10,743,159 B2 | 8/2020 | Ameixieira |
| 10,745,003 B2 | 8/2020 | Kentley-Klay |
| 10,745,011 B2 | 8/2020 | Zhao |
| 10,747,234 B1 | 8/2020 | Konrardy |
| 10,747,597 B2 | 8/2020 | Shen |
| 10,748,218 B2 | 8/2020 | Konrardy |
| 10,753,754 B2 | 8/2020 | DeLizio |
| 10,753,758 B2 | 8/2020 | Ferencz |
| 10,754,341 B2 | 8/2020 | Li |
| 10,754,348 B2 | 8/2020 | McClendon |
| 10,755,581 B2 | 8/2020 | de Moura |
| 10,756,909 B2 | 8/2020 | Condeixa |
| 10,761,542 B1 | 9/2020 | Fairfield |
| 10,762,396 B2 | 9/2020 | Vallespi-Gonzalez |
| 10,768,620 B1 | 9/2020 | Tran |
| 10,768,621 B1 | 9/2020 | Nix |
| 10,768,626 B2 | 9/2020 | Sun |
| 10,769,947 B2 | 9/2020 | de Moura |
| 10,773,597 B2 | 9/2020 | Zhao |
| 10,775,184 B2 | 9/2020 | Ho |
| 10,775,488 B2 | 9/2020 | Bradley |
| 10,775,790 B2 | 9/2020 | Luo |
| 10,775,792 B2 | 9/2020 | Cooper |
| 10,775,801 B2 | 9/2020 | Zhang |
| 10,780,880 B2 | 9/2020 | Wood |
| 10,782,687 B2 | 9/2020 | Kawamoto |
| 10,782,693 B2 | 9/2020 | Zhang |
| 10,782,694 B2 | 9/2020 | Zhang |
| 10,782,699 B2 | 9/2020 | Tao |
| 10,782,703 B2 | 9/2020 | Shalev-Shwartz |
| 10,788,839 B2 | 9/2020 | Zhang |
| 10,788,841 B2 | 9/2020 | Zhang |
| 10,795,360 B2 | 10/2020 | Nakhaei Sarvedani |
| 10,795,367 B2 | 10/2020 | Milstein |
| 10,795,375 B2 | 10/2020 | Shalev-Shwartz |
| 10,796,174 B2 | 10/2020 | Zhang |
| 10,796,204 B2 | 10/2020 | Rohani |
| 10,796,402 B2 | 10/2020 | Yan |
| 10,796,562 B1 | 10/2020 | Wild |
| 10,800,606 B2 | 10/2020 | Lert, Jr. |
| 10,801,845 B2 | 10/2020 | Wheeler |
| 10,802,477 B1 | 10/2020 | Konrardy |
| 10,803,325 B2 | 10/2020 | Bai |
| 10,807,599 B2 | 10/2020 | Zhu |
| 10,809,081 B1 | 10/2020 | Kentley-Klay |
| 10,809,722 B2 | 10/2020 | Glebov |
| 10,809,726 B2 | 10/2020 | Kong |
| 10,809,736 B2 | 10/2020 | Xu |
| 10,810,872 B2 | 10/2020 | Tao |
| 10,812,996 B2 | 10/2020 | Tavares Coutinho |
| 10,813,074 B2 | 10/2020 | Costa |
| 10,814,882 B2 | 10/2020 | Zhu |
| 10,816,346 B2 | 10/2020 | Wheeler |
| 10,816,984 B2 | 10/2020 | Zhang |
| 10,816,995 B2 | 10/2020 | Zhang |
| 10,818,035 B1 | 10/2020 | Guo |
| 10,818,105 B1 | 10/2020 | Konrardy |
| 10,818,187 B2 | 10/2020 | Perko |
| 10,821,971 B1 | 11/2020 | Fields |
| 10,823,575 B2 | 11/2020 | Zhang |
| 10,824,144 B1 | 11/2020 | Fields |
| 10,824,145 B1 | 11/2020 | Konrardy |
| 10,824,153 B2 | 11/2020 | Zhang |
| 10,824,170 B2 | 11/2020 | Paduano |
| 10,824,415 B1 | 11/2020 | Fields |
| 10,828,999 B1 | 11/2020 | Konrardy |
| 10,829,063 B1 | 11/2020 | Konrardy |
| 10,829,149 B1 | 11/2020 | Garimella |
| 10,831,188 B2 | 11/2020 | Hammond |
| 10,831,191 B1 | 11/2020 | Fields |
| 10,831,196 B2 | 11/2020 | Lombrozo |
| 10,831,202 B1 | 11/2020 | Askeland |
| 10,831,204 B1 | 11/2020 | Fields |
| 10,831,210 B1 | 11/2020 | Kobilarov |
| 10,831,212 B2 | 11/2020 | Coq |
| 10,832,066 B2 | 11/2020 | Cohen |
| 10,832,141 B2 | 11/2020 | Boni |
| 10,832,502 B2 | 11/2020 | Levinson |
| 10,836,395 B2 | 11/2020 | Liu |
| 10,836,405 B2 | 11/2020 | Wray |
| 10,837,788 B1 | 11/2020 | Kentley-Klay |
| 10,838,426 B2 | 11/2020 | Fridman |
| 10,839,234 B2 | 11/2020 | Wang |
| 10,839,340 B2 | 11/2020 | Skaaksrud |
| 10,839,426 B2 | 11/2020 | e Costa |
| 10,839,473 B2 | 11/2020 | Pedersen |
| 10,841,496 B2 | 11/2020 | Wheeler |
| 10,843,722 B2 | 11/2020 | Letwin |
| 10,845,816 B2 | 11/2020 | Shalev-Shwartz |
| 10,845,820 B2 | 11/2020 | Wheeler |
| 10,852,721 B1 | 12/2020 | Smith |
| 10,855,922 B2 | 12/2020 | Park |
| 10,857,896 B2 | 12/2020 | Bridges |
| 10,857,994 B2 | 12/2020 | Iagnemma |
| 10,859,395 B2 | 12/2020 | Wheeler |
| 10,860,022 B2 | 12/2020 | Korchev |
| 10,860,036 B2 | 12/2020 | Szubbocsev |
| 10,864,920 B1 | 12/2020 | Donnelly |
| 10,866,108 B2 | 12/2020 | Pedersen |
| 10,867,188 B2 | 12/2020 | Huang |

(56) References Cited

U.S. PATENT DOCUMENTS

| | | |
|---|---|---|
| 10,870,368 B2 | 12/2020 | Ing |
| 10,870,437 B2 | 12/2020 | Battles |
| 10,872,476 B2 | 12/2020 | Battles |
| 10,882,535 B2 | 1/2021 | Lan |
| 10,883,843 B2 | 1/2021 | Outwater |
| 10,884,422 B2 | 1/2021 | Zhang |
| 10,885,727 B2 | 1/2021 | Manoria |
| 10,886,023 B2 | 1/2021 | Matos |
| 10,887,431 B2 | 1/2021 | Khasis |
| 10,890,912 B2 | 1/2021 | Cavender-Bares |
| 10,891,138 B2 | 1/2021 | Valasek |
| 10,891,694 B1 | 1/2021 | Leise |
| 10,897,575 B2 | 1/2021 | Wheeler |
| 10,906,558 B1 | 2/2021 | Hwang |
| 10,908,613 B2 | 2/2021 | Zhang |
| 10,909,377 B2 | 2/2021 | Chen |
| 10,915,106 B2 | 2/2021 | Zych |
| 10,915,116 B2 | 2/2021 | Teng |
| 10,915,965 B1 | 2/2021 | Fields |
| 10,916,077 B2 | 2/2021 | Zhang |
| 10,916,142 B2 | 2/2021 | Fairfield |
| 10,921,135 B2 | 2/2021 | Jiang |
| 10,921,811 B2 | 2/2021 | Levinson |
| 10,921,812 B2 | 2/2021 | Wilson |
| 10,921,825 B2 | 2/2021 | Koch |
| 10,922,556 B2 | 2/2021 | Dreyfuss |
| 10,928,207 B2 | 2/2021 | Zhang |
| 10,928,523 B2 | 2/2021 | Adachi |
| 10,928,820 B1 | 2/2021 | Tao |
| 10,928,829 B2 | 2/2021 | Tatourian |
| 10,932,156 B2 | 2/2021 | Amorim de Faria Cardote |
| 10,977,111 B2 | 4/2021 | Rungta |
| 10,997,467 B1 | 5/2021 | Alsallakh |
| 11,030,476 B2 | 6/2021 | Xu |
| 11,036,774 B2 | 6/2021 | Zhao |
| 11,055,200 B2 | 7/2021 | Prabhu Kholkar |
| 11,074,103 B2 | 7/2021 | Okuno |
| 11,150,655 B2 | 10/2021 | Zhou |
| 11,150,658 B2 | 10/2021 | Ouyang |
| 11,165,783 B1 | 11/2021 | Eiers |
| 11,170,300 B2 | 11/2021 | Dalli |
| 2001/0021888 A1 | 9/2001 | Burns |
| 2002/0143461 A1 | 10/2002 | Burns |
| 2004/0035315 A1 | 2/2004 | Richards |
| 2008/0027591 A1 | 1/2008 | Lenser |
| 2008/0027599 A1 | 1/2008 | Logan |
| 2008/0059015 A1 | 3/2008 | Whittaker |
| 2008/0093498 A1 | 4/2008 | Leal |
| 2008/0161986 A1 | 7/2008 | Breed |
| 2008/0161987 A1 | 7/2008 | Breed |
| 2009/0182786 A1 | 7/2009 | Haanpaa |
| 2009/0306881 A1 | 12/2009 | Dolgov |
| 2010/0030473 A1 | 2/2010 | Au |
| 2010/0076631 A1 | 3/2010 | Mian |
| 2010/0106344 A1 | 4/2010 | Edwards |
| 2010/0106356 A1 | 4/2010 | Trepagnier |
| 2010/0114416 A1 | 5/2010 | Au |
| 2010/0225954 A1 | 9/2010 | Balduccini |
| 2011/0153136 A1 | 6/2011 | Anderson |
| 2011/0153338 A1 | 6/2011 | Anderson |
| 2011/0288714 A1 | 11/2011 | Flohr |
| 2011/0295423 A1 | 12/2011 | Anderson |
| 2011/0295424 A1 | 12/2011 | Johnson |
| 2012/0044043 A1 | 2/2012 | Nettleton |
| 2012/0046818 A1 | 2/2012 | Nettleton |
| 2012/0046927 A1 | 2/2012 | Nettleton |
| 2012/0046983 A1 | 2/2012 | Nettleton |
| 2012/0050787 A1 | 3/2012 | Balduccini |
| 2012/0053703 A1 | 3/2012 | Nettleton |
| 2012/0053775 A1 | 3/2012 | Nettleton |
| 2012/0083947 A1 | 4/2012 | Anderson |
| 2012/0095651 A1 | 4/2012 | Anderson |
| 2012/0101680 A1 | 4/2012 | Trepagnier |
| 2012/0166019 A1 | 6/2012 | Anderson |
| 2012/0283906 A1 | 11/2012 | Anderson |
| 2012/0316725 A1 | 12/2012 | Trepagnier |
| 2013/0274986 A1 | 10/2013 | Trepagnier |
| 2013/0321627 A1 | 12/2013 | Turn, Jr. |
| 2014/0032017 A1 | 1/2014 | Anderson |
| 2014/0067188 A1 | 3/2014 | Mian |
| 2014/0136414 A1 | 5/2014 | Abhyanker |
| 2014/0195095 A1 | 7/2014 | Flohr |
| 2014/0201126 A1 | 7/2014 | Zadeh |
| 2014/0214259 A1 | 7/2014 | Trepagnier |
| 2014/0214474 A1 | 7/2014 | Balduccini |
| 2014/0214487 A1 | 7/2014 | Balduccini |
| 2014/0214580 A1 | 7/2014 | Balduccini |
| 2014/0214581 A1 | 7/2014 | Balduccini |
| 2014/0214582 A1 | 7/2014 | Gobeyn |
| 2014/0253722 A1 | 9/2014 | Smyth |
| 2014/0278682 A1 | 9/2014 | Kennell |
| 2014/0278683 A1 | 9/2014 | Kennell |
| 2015/0081156 A1 | 3/2015 | Trepagnier |
| 2015/0092178 A1 | 4/2015 | Debrunner |
| 2015/0153175 A1 | 6/2015 | Skaaksrud |
| 2015/0154557 A1 | 6/2015 | Skaaksrud |
| 2015/0177736 A1 | 6/2015 | Anderson |
| 2015/0229906 A1 | 8/2015 | Inacio De Matos |
| 2015/0253768 A1 | 9/2015 | Meng |
| 2015/0298786 A1 | 10/2015 | Stigler |
| 2015/0339355 A1 | 11/2015 | Haanpaa |
| 2015/0350914 A1 | 12/2015 | Baxley |
| 2016/0011318 A1 | 1/2016 | Cohen |
| 2016/0021178 A1 | 1/2016 | Liu |
| 2016/0036558 A1 | 2/2016 | Ibrahim |
| 2016/0231746 A1 | 8/2016 | Hazelton |
| 2016/0236617 A1 | 8/2016 | Smyth |
| 2016/0273922 A1 | 9/2016 | Stefan |
| 2016/0280238 A1 | 9/2016 | Zamorano Morfín |
| 2016/0313739 A1 | 10/2016 | Mian |
| 2016/0320773 A1 | 11/2016 | Skaaksrud |
| 2016/0334229 A1 | 11/2016 | Ross |
| 2016/0334230 A1 | 11/2016 | Ross |
| 2016/0334797 A1 | 11/2016 | Ross |
| 2016/0339587 A1 | 11/2016 | Rublee |
| 2016/0375976 A1 | 12/2016 | Stigler |
| 2017/0003681 A1 | 1/2017 | Ross |
| 2017/0015405 A1 | 1/2017 | Chau |
| 2017/0017236 A1 | 1/2017 | Song |
| 2017/0060129 A1 | 3/2017 | Ross |
| 2017/0083957 A1 | 3/2017 | Ross |
| 2017/0090480 A1 | 3/2017 | Ho |
| 2017/0120814 A1 | 5/2017 | Kentley |
| 2017/0120902 A1 | 5/2017 | Kentley |
| 2017/0123419 A1 | 5/2017 | Levinson |
| 2017/0123421 A1 | 5/2017 | Kentley |
| 2017/0123422 A1 | 5/2017 | Kentley |
| 2017/0123428 A1 | 5/2017 | Levinson |
| 2017/0123429 A1 | 5/2017 | Levinson |
| 2017/0124476 A1 | 5/2017 | Levinson |
| 2017/0124781 A1 | 5/2017 | Douillard |
| 2017/0126810 A1 | 5/2017 | Kentley |
| 2017/0132334 A1 | 5/2017 | Levinson |
| 2017/0132934 A1 | 5/2017 | Kentley |
| 2017/0136842 A1 | 5/2017 | Anderson |
| 2017/0139411 A1 | 5/2017 | Hartung |
| 2017/0160742 A1 | 6/2017 | Ross |
| 2017/0164423 A1 | 6/2017 | Ross |
| 2017/0166215 A1 | 6/2017 | Rander |
| 2017/0227965 A1 | 8/2017 | DeCenzo |
| 2017/0235316 A1 | 8/2017 | Shattil |
| 2017/0248963 A1 | 8/2017 | Levinson |
| 2017/0248964 A1 | 8/2017 | Kentley |
| 2017/0277186 A1 | 9/2017 | Ross |
| 2017/0284819 A1 | 10/2017 | Donnelly |
| 2017/0285642 A1 | 10/2017 | Rander |
| 2017/0294130 A1 | 10/2017 | Donnelly |
| 2017/0315229 A1 | 11/2017 | Pavek |
| 2017/0316333 A1 | 11/2017 | Levinson |
| 2017/0323179 A1 | 11/2017 | Vallespi-Gonzalez |
| 2017/0329346 A1 | 11/2017 | Latotzki |
| 2017/0341236 A1 | 11/2017 | Patrick |
| 2017/0351261 A1 | 12/2017 | Levinson |
| 2017/0353943 A1 | 12/2017 | Skaaksrud |

(56) References Cited

U.S. PATENT DOCUMENTS

| | | |
|---|---|---|
| 2017/0371355 A1 | 12/2017 | Paduano |
| 2018/0005123 A1 | 1/2018 | Lagos |
| 2018/0009445 A1 | 1/2018 | Nishi |
| 2018/0011494 A1 | 1/2018 | Zhu |
| 2018/0017968 A1 | 1/2018 | Zhu |
| 2018/0023960 A1 | 1/2018 | Fridman |
| 2018/0024553 A1 | 1/2018 | Kong |
| 2018/0024562 A1 | 1/2018 | Bellaiche |
| 2018/0024565 A1 | 1/2018 | Fridman |
| 2018/0024568 A1 | 1/2018 | Fridman |
| 2018/0032082 A1 | 2/2018 | Shalev-Shwartz |
| 2018/0033310 A1 | 2/2018 | Kentley-Klay |
| 2018/0039287 A1 | 2/2018 | Shattil |
| 2018/0045832 A1 | 2/2018 | Ibrahim |
| 2018/0047292 A1 | 2/2018 | Hashimoto |
| 2018/0050704 A1 | 2/2018 | Tascione |
| 2018/0059672 A1 | 3/2018 | Li |
| 2018/0061242 A1 | 3/2018 | Bavar |
| 2018/0086344 A1 | 3/2018 | Zhu |
| 2018/0086351 A1 | 3/2018 | Zhu |
| 2018/0088576 A1 | 3/2018 | Kong |
| 2018/0088582 A1 | 3/2018 | Kong |
| 2018/0088590 A1 | 3/2018 | Zhu |
| 2018/0093671 A1 | 4/2018 | Allan |
| 2018/0095467 A1 | 4/2018 | Perrone |
| 2018/0107942 A1 | 4/2018 | Jiang |
| 2018/0111612 A1 | 4/2018 | Jiang |
| 2018/0114258 A1 | 4/2018 | Ross |
| 2018/0114259 A1 | 4/2018 | Ross |
| 2018/0127000 A1 | 5/2018 | Jiang |
| 2018/0127001 A1 | 5/2018 | Ricci |
| 2018/0129215 A1 | 5/2018 | Hazelton |
| 2018/0136643 A1 | 5/2018 | Tao |
| 2018/0136644 A1 | 5/2018 | Levinson |
| 2018/0136651 A1 | 5/2018 | Levinson |
| 2018/0141564 A1 | 5/2018 | Ross |
| 2018/0143622 A1 | 5/2018 | Zhu |
| 2018/0143632 A1 | 5/2018 | Zhu |
| 2018/0143639 A1 | 5/2018 | Singhal |
| 2018/0143644 A1 | 5/2018 | Li |
| 2018/0143647 A1 | 5/2018 | Wang |
| 2018/0143649 A1 | 5/2018 | Miao |
| 2018/0150086 A1 | 5/2018 | Nobukawa |
| 2018/0154829 A1 | 6/2018 | Kentley-Klay |
| 2018/0162186 A1 | 6/2018 | Anderson |
| 2018/0162412 A1 | 6/2018 | Gao |
| 2018/0164822 A1 | 6/2018 | Chu |
| 2018/0164827 A1 | 6/2018 | Chu |
| 2018/0170392 A1 | 6/2018 | Yang |
| 2018/0170395 A1 | 6/2018 | Luo |
| 2018/0172821 A1 | 6/2018 | Apker |
| 2018/0173240 A1 | 6/2018 | Fang |
| 2018/0178791 A1 | 6/2018 | Zhu |
| 2018/0183873 A1 | 6/2018 | Wang |
| 2018/0186378 A1 | 7/2018 | Zhuang |
| 2018/0186403 A1 | 7/2018 | Zhu |
| 2018/0188026 A1 | 7/2018 | Zhang |
| 2018/0188027 A1 | 7/2018 | Zhang |
| 2018/0188037 A1 | 7/2018 | Wheeler |
| 2018/0188039 A1 | 7/2018 | Chen |
| 2018/0188040 A1 | 7/2018 | Chen |
| 2018/0188041 A1 | 7/2018 | Chen |
| 2018/0188042 A1 | 7/2018 | Chen |
| 2018/0188043 A1 | 7/2018 | Chen |
| 2018/0188044 A1 | 7/2018 | Wheeler |
| 2018/0188059 A1 | 7/2018 | Wheeler |
| 2018/0188060 A1 | 7/2018 | Wheeler |
| 2018/0188727 A1 | 7/2018 | Zhuang |
| 2018/0188734 A1 | 7/2018 | Zhu |
| 2018/0188742 A1 | 7/2018 | Wheeler |
| 2018/0188743 A1 | 7/2018 | Wheeler |
| 2018/0189323 A1 | 7/2018 | Wheeler |
| 2018/0189578 A1 | 7/2018 | Yang |
| 2018/0189717 A1 | 7/2018 | Cao |
| 2018/0190046 A1 | 7/2018 | Levinson |
| 2018/0196433 A1 | 7/2018 | Rander |
| 2018/0196439 A1 | 7/2018 | Levinson |
| 2018/0196440 A1 | 7/2018 | Zhu |
| 2018/0201182 A1 | 7/2018 | Zhu |
| 2018/0203443 A1 | 7/2018 | Newman |
| 2018/0203450 A1 | 7/2018 | Zhu |
| 2018/0204111 A1 | 7/2018 | Zadeh |
| 2018/0204122 A1 | 7/2018 | Boni |
| 2018/0204141 A1 | 7/2018 | Nettleton |
| 2018/0208215 A1 | 7/2018 | Zamorano Morfín |
| 2018/0211534 A1 | 7/2018 | de Moura |
| 2018/0216942 A1 | 8/2018 | Wang |
| 2018/0217614 A1 | 8/2018 | Salas-Moreno |
| 2018/0224869 A1 | 8/2018 | Paduano |
| 2018/0225968 A1 | 8/2018 | Wang |
| 2018/0233047 A1 | 8/2018 | Mandeville-Clarke |
| 2018/0238698 A1 | 8/2018 | Pedersen |
| 2018/0247160 A1 | 8/2018 | Rohani |
| 2018/0253647 A1 | 9/2018 | Yu |
| 2018/0257660 A1 | 9/2018 | Ibrahim |
| 2018/0259956 A1 | 9/2018 | Kawamoto |
| 2018/0259958 A1 | 9/2018 | Kalanick |
| 2018/0267537 A1 | 9/2018 | Kroop |
| 2018/0275678 A1 | 9/2018 | Andert |
| 2018/0282955 A1 | 10/2018 | McClendon |
| 2018/0284774 A1 | 10/2018 | Kawamoto |
| 2018/0288774 A1 | 10/2018 | Karjee |
| 2018/0292222 A1 | 10/2018 | Lin |
| 2018/0292825 A1 | 10/2018 | Smolyanskiy |
| 2018/0292831 A1 | 10/2018 | Kong |
| 2018/0297606 A1 | 10/2018 | Luo |
| 2018/0300964 A1 | 10/2018 | Lakshamanan |
| 2018/0304889 A1 | 10/2018 | Shalev-Shwartz |
| 2018/0304900 A1 | 10/2018 | Luo |
| 2018/0307229 A1 | 10/2018 | Stein |
| 2018/0307239 A1 | 10/2018 | Shalev-Shwartz |
| 2018/0307240 A1 | 10/2018 | Shalev-Shwartz |
| 2018/0307245 A1 | 10/2018 | Khawaja |
| 2018/0312238 A1 | 11/2018 | Stigler |
| 2018/0314266 A1 | 11/2018 | Shalev-Shwartz |
| 2018/0321685 A1 | 11/2018 | Yalla |
| 2018/0322546 A1 | 11/2018 | Ross |
| 2018/0327091 A1 | 11/2018 | Burks |
| 2018/0329411 A1 | 11/2018 | Levinson |
| 2018/0330173 A1 | 11/2018 | Zhu |
| 2018/0334166 A1 | 11/2018 | Zhu |
| 2018/0335781 A1 | 11/2018 | Chase |
| 2018/0336421 A1 | 11/2018 | Huang |
| 2018/0341274 A1 | 11/2018 | Donnelly |
| 2018/0342157 A1 | 11/2018 | Donnelly |
| 2018/0348775 A1 | 12/2018 | Yu |
| 2018/0349713 A1 | 12/2018 | Jiang |
| 2018/0349802 A1 | 12/2018 | Jiang |
| 2018/0356821 A1 | 12/2018 | Kentley-Klay |
| 2018/0356823 A1 | 12/2018 | Cooper |
| 2018/0364657 A1 | 12/2018 | Luo |
| 2018/0364700 A1 | 12/2018 | Liu |
| 2018/0364701 A1 | 12/2018 | Liu |
| 2018/0364702 A1 | 12/2018 | Liu |
| 2018/0364703 A1 | 12/2018 | Liu |
| 2018/0364704 A1 | 12/2018 | Liu |
| 2018/0365908 A1 | 12/2018 | Liu |
| 2018/0370540 A1 | 12/2018 | Yousuf |
| 2018/0373245 A1 | 12/2018 | Nishi |
| 2018/0373268 A1 | 12/2018 | Antunes Marques Esteves |
| 2018/0374359 A1 | 12/2018 | Li |
| 2018/0375939 A1 | 12/2018 | Magalhães De Matos |
| 2018/0376357 A1 | 12/2018 | Tavares Coutinho |
| 2019/0004510 A1 | 1/2019 | Xiao |
| 2019/0004516 A1 | 1/2019 | Liu |
| 2019/0004518 A1 | 1/2019 | Zhou |
| 2019/0004522 A1 | 1/2019 | Zych |
| 2019/0004524 A1 | 1/2019 | Wang |
| 2019/0004533 A1 | 1/2019 | Huang |
| 2019/0004534 A1 | 1/2019 | Huang |
| 2019/0004535 A1 | 1/2019 | Huang |
| 2019/0018411 A1 | 1/2019 | Herbach |
| 2019/0018412 A1 | 1/2019 | Tschanz |
| 2019/0025843 A1 | 1/2019 | Wilkinson |

(56) References Cited

U.S. PATENT DOCUMENTS

| | | |
|---|---|---|
| 2019/0028370 A1 | 1/2019 | Church |
| 2019/0035275 A1 | 1/2019 | Nishi |
| 2019/0039609 A1 | 2/2019 | Wood |
| 2019/0049342 A1 | 2/2019 | Anderson |
| 2019/0049946 A1 | 2/2019 | Ross |
| 2019/0050729 A1 | 2/2019 | Lakshmanan |
| 2019/0053074 A1 | 2/2019 | Behera |
| 2019/0056737 A1 | 2/2019 | Palanisamy |
| 2019/0056742 A1 | 2/2019 | Ho |
| 2019/0061765 A1 | 2/2019 | Marden |
| 2019/0066409 A1 | 2/2019 | Moreira da Mota |
| 2019/0066506 A1 | 2/2019 | Kazemi |
| 2019/0068434 A1 | 2/2019 | Moreira da Mota |
| 2019/0071091 A1 | 3/2019 | Zhu |
| 2019/0071092 A1 | 3/2019 | Ma |
| 2019/0071093 A1 | 3/2019 | Ma |
| 2019/0072965 A1 | 3/2019 | Zhang |
| 2019/0072966 A1 | 3/2019 | Zhang |
| 2019/0072973 A1 | 3/2019 | Sun |
| 2019/0072979 A1 | 3/2019 | Sukhomlinov |
| 2019/0073426 A1 | 3/2019 | Balduccini |
| 2019/0078896 A1 | 3/2019 | Zhu |
| 2019/0079524 A1 | 3/2019 | Zhu |
| 2019/0080602 A1 | 3/2019 | Rice |
| 2019/0084571 A1 | 3/2019 | Zhu |
| 2019/0086924 A1 | 3/2019 | Greenfield |
| 2019/0094868 A1 | 3/2019 | Zych |
| 2019/0105968 A1 | 4/2019 | Rice |
| 2019/0107840 A1 | 4/2019 | Green |
| 2019/0113351 A1 | 4/2019 | Antony |
| 2019/0120640 A1 | 4/2019 | Ho |
| 2019/0120946 A1 | 4/2019 | Wheeler |
| 2019/0120947 A1 | 4/2019 | Wheeler |
| 2019/0120948 A1 | 4/2019 | Yang |
| 2019/0122037 A1 | 4/2019 | Russell |
| 2019/0122386 A1 | 4/2019 | Wheeler |
| 2019/0129831 A1 | 5/2019 | Goldberg |
| 2019/0130878 A1 | 5/2019 | Bradley |
| 2019/0134821 A1 | 5/2019 | Patrick |
| 2019/0137991 A1 | 5/2019 | Agarwal |
| 2019/0138008 A1 | 5/2019 | Ross |
| 2019/0146508 A1 | 5/2019 | Dean |
| 2019/0146509 A1 * | 5/2019 | Dean .................. G05D 1/0214 701/25 |
| 2019/0147253 A1 | 5/2019 | Bai |
| 2019/0147254 A1 | 5/2019 | Bai |
| 2019/0147255 A1 | 5/2019 | Homayounfar |
| 2019/0156134 A1 | 5/2019 | Krishnan |
| 2019/0156150 A1 | 5/2019 | Krishnan |
| 2019/0156679 A1 | 5/2019 | Bartel |
| 2019/0161080 A1 | 5/2019 | Gochev |
| 2019/0163191 A1 | 5/2019 | Sorin |
| 2019/0168769 A1 | 6/2019 | Zhu |
| 2019/0171912 A1 | 6/2019 | Vallespi-Gonzalez |
| 2019/0174276 A1 | 6/2019 | Mineiro Ramos de Azevedo |
| 2019/0176684 A1 | 6/2019 | Zych |
| 2019/0179311 A1 | 6/2019 | Paden |
| 2019/0179979 A1 | 6/2019 | Melick |
| 2019/0185018 A1 | 6/2019 | Tao |
| 2019/0186939 A1 | 6/2019 | Cox |
| 2019/0187715 A1 | 6/2019 | Zhang |
| 2019/0187723 A1 | 6/2019 | Tao |
| 2019/0195998 A1 | 6/2019 | Campbell |
| 2019/0196471 A1 | 6/2019 | Vaughn |
| 2019/0202561 A1 | 7/2019 | Weekes |
| 2019/0204092 A1 | 7/2019 | Wheeler |
| 2019/0204425 A1 | 7/2019 | Abari |
| 2019/0204427 A1 | 7/2019 | Abari |
| 2019/0204842 A1 | 7/2019 | Jafari Tafti |
| 2019/0204843 A1 | 7/2019 | Fang |
| 2019/0212161 A1 | 7/2019 | Pedersen |
| 2019/0212744 A1 | 7/2019 | Milstein |
| 2019/0212754 A1 | 7/2019 | Smith |
| 2019/0220011 A1 | 7/2019 | Della Penna |
| 2019/0220015 A1 | 7/2019 | Phillips |
| 2019/0220016 A1 | 7/2019 | Phillips |
| 2019/0227550 A1 | 7/2019 | Yershov |
| 2019/0227553 A1 | 7/2019 | Kentley-Klay |
| 2019/0235488 A1 | 8/2019 | Beth |
| 2019/0235499 A1 | 8/2019 | Kazemi |
| 2019/0235532 A1 | 8/2019 | Paduano |
| 2019/0243370 A1 | 8/2019 | Li |
| 2019/0248487 A1 | 8/2019 | Holtz |
| 2019/0250000 A1 | 8/2019 | Zhang |
| 2019/0250609 A1 | 8/2019 | Luo |
| 2019/0250636 A1 | 8/2019 | Szubbocsev |
| 2019/0250640 A1 | 8/2019 | O'Flaherty et al. |
| 2019/0258246 A1 | 8/2019 | Liu |
| 2019/0258251 A1 | 8/2019 | Ditty |
| 2019/0265703 A1 | 8/2019 | Hicok |
| 2019/0266179 A1 | 8/2019 | Wheeler |
| 2019/0266420 A1 | 8/2019 | Ge |
| 2019/0270408 A1 | 9/2019 | Castro |
| 2019/0271549 A1 | 9/2019 | Zhang |
| 2019/0277632 A1 | 9/2019 | Zhang |
| 2019/0278277 A1 | 9/2019 | Tao |
| 2019/0278284 A1 | 9/2019 | Zhang |
| 2019/0278290 A1 | 9/2019 | Zhang |
| 2019/0286143 A1 | 9/2019 | Ross |
| 2019/0286155 A1 | 9/2019 | Stein |
| 2019/0291728 A1 | 9/2019 | Shalev-Shwartz |
| 2019/0295421 A1 | 9/2019 | Bavar |
| 2019/0302768 A1 | 10/2019 | Zhang |
| 2019/0310627 A1 | 10/2019 | Halder |
| 2019/0310636 A1 | 10/2019 | Halder |
| 2019/0310650 A1 | 10/2019 | Halder |
| 2019/0310654 A1 | 10/2019 | Halder |
| 2019/0315232 A1 | 10/2019 | Ing |
| 2019/0315357 A1 | 10/2019 | Zhang |
| 2019/0317455 A1 | 10/2019 | Leon |
| 2019/0317507 A1 | 10/2019 | Zhang |
| 2019/0317508 A1 | 10/2019 | Zhang |
| 2019/0317512 A1 | 10/2019 | Zhang |
| 2019/0317513 A1 | 10/2019 | Zhang |
| 2019/0317515 A1 | 10/2019 | Zhang |
| 2019/0317520 A1 | 10/2019 | Zhang |
| 2019/0318411 A1 | 10/2019 | Dhungana |
| 2019/0318550 A1 | 10/2019 | Lakshamanan |
| 2019/0324456 A1 | 10/2019 | Ryan |
| 2019/0324463 A1 | 10/2019 | Zhu |
| 2019/0325223 A1 | 10/2019 | Chen |
| 2019/0325546 A1 | 10/2019 | Hagestad |
| 2019/0329903 A1 | 10/2019 | Thompson |
| 2019/0332123 A1 | 10/2019 | Donnelly |
| 2019/0332875 A1 | 10/2019 | Vallespi-Gonzalez |
| 2019/0333120 A1 | 10/2019 | Ross |
| 2019/0333164 A1 | 10/2019 | Fox |
| 2019/0346851 A1 | 11/2019 | Liu |
| 2019/0349794 A1 | 11/2019 | Tavares Coutinho |
| 2019/0354911 A1 | 11/2019 | Alaniz |
| 2019/0359202 A1 | 11/2019 | Zhu |
| 2019/0361432 A1 | 11/2019 | Levinson |
| 2019/0361444 A1 | 11/2019 | Herbach |
| 2019/0367019 A1 | 12/2019 | Yan |
| 2019/0367020 A1 | 12/2019 | Yan |
| 2019/0367021 A1 | 12/2019 | Zhao |
| 2019/0367022 A1 | 12/2019 | Zhao |
| 2019/0368882 A1 | 12/2019 | Wheeler |
| 2019/0369616 A1 | 12/2019 | Ostafew |
| 2019/0369626 A1 | 12/2019 | Lui |
| 2019/0371174 A1 | 12/2019 | de Moura |
| 2019/0377345 A1 | 12/2019 | Bachrach |
| 2019/0377349 A1 | 12/2019 | Van der Merwe |
| 2019/0377351 A1 | 12/2019 | Phillips |
| 2019/0378423 A1 | 12/2019 | Bachrach |
| 2019/0382007 A1 | 12/2019 | Casas |
| 2019/0382031 A1 | 12/2019 | Hu |
| 2019/0383945 A1 | 12/2019 | Wang |
| 2019/0384301 A1 | 12/2019 | Greenfield |
| 2019/0384304 A1 | 12/2019 | Towal |
| 2019/0385450 A1 | 12/2019 | Kim |
| 2019/0387060 A1 | 12/2019 | Kentley-Klay |
| 2019/0391585 A1 | 12/2019 | Zhang |
| 2020/0001862 A1 | 1/2020 | Luo |

(56) References Cited

U.S. PATENT DOCUMENTS

| | | |
|---|---|---|
| 2020/0001863 A1 | 1/2020 | Li |
| 2020/0003564 A1 | 1/2020 | Zhang |
| 2020/0004241 A1 | 1/2020 | Levinson |
| 2020/0004261 A1 | 1/2020 | Kim |
| 2020/0013225 A1 | 1/2020 | Park |
| 2020/0014759 A1 | 1/2020 | Wunderlich |
| 2020/0019165 A1 | 1/2020 | Levandowski |
| 2020/0019175 A1 | 1/2020 | Dean |
| 2020/0019801 A1 | 1/2020 | Krishnan |
| 2020/0021728 A1 | 1/2020 | Yang |
| 2020/0023838 A1 | 1/2020 | Zhang |
| 2020/0026276 A1 | 1/2020 | Zhang |
| 2020/0026283 A1 | 1/2020 | Barnes |
| 2020/0026285 A1 | 1/2020 | Perrone |
| 2020/0026294 A1 | 1/2020 | Kim |
| 2020/0027354 A1 | 1/2020 | Goldman |
| 2020/0031340 A1 | 1/2020 | Tao |
| 2020/0033147 A1 | 1/2020 | Ahn |
| 2020/0033872 A1 | 1/2020 | Burch, V |
| 2020/0041296 A1 | 2/2020 | Ho |
| 2020/0042007 A1 | 2/2020 | Zhang |
| 2020/0043326 A1 | 2/2020 | Tao |
| 2020/0050195 A1 | 2/2020 | Gross |
| 2020/0050199 A1 | 2/2020 | Park |
| 2020/0051346 A1 | 2/2020 | Zhang |
| 2020/0055362 A1 | 2/2020 | Anderson |
| 2020/0064483 A1 | 2/2020 | Li |
| 2020/0064842 A1 | 2/2020 | Kentley-Klay |
| 2020/0064851 A1 | 2/2020 | Wilkinson |
| 2020/0064859 A1 | 2/2020 | Zhang |
| 2020/0064861 A1 | 2/2020 | Zhang |
| 2020/0073385 A1 | 3/2020 | Jobanputra |
| 2020/0073739 A1 | 3/2020 | Rungta |
| 2020/0074024 A1 | 3/2020 | Levinson |
| 2020/0082180 A1 | 3/2020 | Wang |
| 2020/0089243 A1 | 3/2020 | Poeppel |
| 2020/0089245 A1 | 3/2020 | Yadmellat |
| 2020/0101974 A1 | 4/2020 | Ha |
| 2020/0108785 A1 | 4/2020 | Sweeney |
| 2020/0110835 A1 | 4/2020 | Zhao |
| 2020/0111169 A1 | 4/2020 | Halder |
| 2020/0116497 A1 | 4/2020 | Jiang |
| 2020/0116867 A1 | 4/2020 | Zhu |
| 2020/0117207 A1 | 4/2020 | Zhang |
| 2020/0117575 A1 | 4/2020 | Prabhu Kholkar |
| 2020/0120253 A1 | 4/2020 | Wheeler |
| 2020/0122721 A1 | 4/2020 | Zhang |
| 2020/0122830 A1 | 4/2020 | Anderson |
| 2020/0124719 A1 | 4/2020 | Noujeim |
| 2020/0125094 A1 | 4/2020 | Zhang |
| 2020/0125102 A1 | 4/2020 | Jiang |
| 2020/0130864 A1 | 4/2020 | Brockers |
| 2020/0133270 A1 | 4/2020 | Han |
| 2020/0134525 A1 | 4/2020 | Goldman |
| 2020/0137928 A1 | 4/2020 | Lu |
| 2020/0139973 A1 | 5/2020 | Palanisamy |
| 2020/0142405 A1 | 5/2020 | Havens |
| 2020/0142428 A1 | 5/2020 | Donnelly |
| 2020/0142732 A1 | 5/2020 | Okuno |
| 2020/0145569 A1 | 5/2020 | Wheeler |
| 2020/0149231 A1 | 5/2020 | Lo Vaglio |
| 2020/0149906 A1 | 5/2020 | Tu |
| 2020/0150682 A1 | 5/2020 | Donnelly |
| 2020/0159216 A1 | 5/2020 | Le |
| 2020/0159225 A1 | 5/2020 | Zeng |
| 2020/0160067 A1 | 5/2020 | Huang |
| 2020/0172115 A1 | 6/2020 | Zhu |
| 2020/0172116 A1 | 6/2020 | Zhu |
| 2020/0174472 A1 | 6/2020 | Zhang |
| 2020/0174486 A1 | 6/2020 | Luo |
| 2020/0174765 A1 | 6/2020 | Schulte |
| 2020/0175691 A1 | 6/2020 | Zhang |
| 2020/0175695 A1 | 6/2020 | Zhang |
| 2020/0180740 A1 | 6/2020 | Christ |
| 2020/0182639 A1 | 6/2020 | Ho |
| 2020/0182640 A1 | 6/2020 | Ho |
| 2020/0183395 A1 | 6/2020 | Levandowski |
| 2020/0191601 A1 | 6/2020 | Jiang |
| 2020/0192372 A1 | 6/2020 | Levandowski |
| 2020/0192373 A1 | 6/2020 | Levandowski |
| 2020/0192374 A1 | 6/2020 | Riggs |
| 2020/0192375 A1 | 6/2020 | Riggs |
| 2020/0192376 A1 | 6/2020 | Levandowski |
| 2020/0192377 A1 | 6/2020 | Levandowski |
| 2020/0192378 A1 | 6/2020 | Levandowski |
| 2020/0192379 A1 | 6/2020 | Levandowski |
| 2020/0192380 A1 | 6/2020 | Bernstein |
| 2020/0192381 A1 | 6/2020 | Levandowski |
| 2020/0192402 A1 | 6/2020 | Wang |
| 2020/0193606 A1 | 6/2020 | Douillard |
| 2020/0201329 A1 | 6/2020 | Levandowski |
| 2020/0201350 A1 | 6/2020 | Newman |
| 2020/0207360 A1 | 7/2020 | Dougherty |
| 2020/0207369 A1 | 7/2020 | Mehta |
| 2020/0207371 A1 | 7/2020 | Dougherty |
| 2020/0207375 A1 | 7/2020 | Mehta |
| 2020/0209853 A1 | 7/2020 | Leach |
| 2020/0209857 A1 | 7/2020 | Djuric |
| 2020/0209872 A1 | 7/2020 | Xu |
| 2020/0225032 A1 | 7/2020 | Chen |
| 2020/0225673 A1 | 7/2020 | Ebrahimi Afrouzi |
| 2020/0231106 A9 | 7/2020 | Sweeney |
| 2020/0231142 A1 | 7/2020 | Liu |
| 2020/0233415 A1 | 7/2020 | Panzica |
| 2020/0233418 A1 | 7/2020 | Liu |
| 2020/0233420 A1 | 7/2020 | Liu |
| 2020/0233429 A1 | 7/2020 | Zhang |
| 2020/0240799 A1 | 7/2020 | Gao |
| 2020/0240805 A1 | 7/2020 | Kanajan |
| 2020/0241546 A1 | 7/2020 | Sun |
| 2020/0249677 A1 | 8/2020 | Maat |
| 2020/0250067 A1 | 8/2020 | Walther |
| 2020/0250981 A1 | 8/2020 | Kazemi |
| 2020/0262263 A1 | 8/2020 | Doerksen |
| 2020/0265249 A1 | 8/2020 | Ge |
| 2020/0272148 A1 | 8/2020 | Karasev |
| 2020/0282907 A1 | 9/2020 | Diehl |
| 2020/0282987 A1 | 9/2020 | Zhu |
| 2020/0284581 A1 | 9/2020 | Zhang |
| 2020/0285240 A1 | 9/2020 | Diehl |
| 2020/0285658 A1 | 9/2020 | Wheeler |
| 2020/0290647 A1 | 9/2020 | Anderson |
| 2020/0293051 A1 | 9/2020 | Hasegawa |
| 2020/0293052 A1 | 9/2020 | Hasegawa |
| 2020/0293053 A1 | 9/2020 | Hasegawa |
| 2020/0298863 A1 | 9/2020 | Lin |
| 2020/0301435 A1 | 9/2020 | Phillips |
| 2020/0310417 A1 | 10/2020 | Pedersen |
| 2020/0310442 A1 | 10/2020 | Halder |
| 2020/0310444 A1 | 10/2020 | Hasegawa |
| 2020/0327234 A1 | 10/2020 | Zhou |
| 2020/0331480 A1 | 10/2020 | Zhang |
| 2020/0333470 A1 | 10/2020 | Oh |
| 2020/0333785 A1 | 10/2020 | Cooper |
| 2020/0341469 A1 | 10/2020 | Smolyanskiy |
| 2020/0341487 A1 | 10/2020 | Hazelton |
| 2020/0341490 A1 | 10/2020 | Silva |
| 2020/0342693 A1 | 10/2020 | Jiang |
| 2020/0346637 A1 | 11/2020 | Zhou |
| 2020/0348668 A1 | 11/2020 | Poulet |
| 2020/0348676 A1 | 11/2020 | Zhou |
| 2020/0348684 A1 | 11/2020 | Zhang |
| 2020/0349848 A1 | 11/2020 | Bartel |
| 2020/0356090 A1 | 11/2020 | Thakur |
| 2020/0356100 A1 | 11/2020 | Nagarajan |
| 2020/0356849 A1 | 11/2020 | Xu |
| 2020/0363813 A1 | 11/2020 | He |
| 2020/0371533 A1 | 11/2020 | Kentley-Klay |
| 2020/0379457 A1 | 12/2020 | Ostafew |
| 2020/0379462 A1 | 12/2020 | Kawamoto |
| 2020/0379474 A1 | 12/2020 | Zhang |
| 2020/0383580 A1 | 12/2020 | Shouldice |
| 2020/0387155 A1 | 12/2020 | Liu |
| 2020/0388154 A1 | 12/2020 | Kim |

(56) References Cited

U.S. PATENT DOCUMENTS

| | | |
|---|---|---|
| 2020/0393261 A1 | 12/2020 | Zhang |
| 2020/0393837 A1 | 12/2020 | Zhang |
| 2020/0394474 A1 | 12/2020 | Vallespi-Gonzalez |
| 2020/0401145 A1 | 12/2020 | Milstein |
| 2020/0402323 A1 | 12/2020 | Liu |
| 2020/0406893 A1 | 12/2020 | Choe |
| 2020/0408921 A1 | 12/2020 | Oh |
| 2020/0409351 A1 | 12/2020 | Zhu |
| 2020/0409377 A1 | 12/2020 | Ready-Campbell |
| 2020/0409386 A1 | 12/2020 | Thakur |
| 2020/0410252 A1 | 12/2020 | Tsoi |
| 2020/0410255 A1 | 12/2020 | Guo |
| 2020/0410703 A1 | 12/2020 | Guo |
| 2021/0004012 A1 | 1/2021 | Marchetti-Bowick |
| 2021/0009163 A1 | 1/2021 | Urtasun |
| 2021/0009166 A1 | 1/2021 | Li |
| 2021/0018916 A1 | 1/2021 | Thakur |
| 2021/0018917 A1 | 1/2021 | Levandowski |
| 2021/0018918 A1 | 1/2021 | Levandowski |
| 2021/0024100 A1 | 1/2021 | Calleija |
| 2021/0024144 A1 | 1/2021 | Patnaik |
| 2021/0026348 A1 | 1/2021 | Gogna |
| 2021/0026355 A1 | 1/2021 | Chen |
| 2021/0031760 A1 | 2/2021 | Ostafew |
| 2021/0031801 A1 | 2/2021 | Wood |
| 2021/0033410 A1 | 2/2021 | Niemiec |
| 2021/0034068 A1 | 2/2021 | Shalev-Shwartz |
| 2021/0034412 A1 | 2/2021 | Televitckiy |
| 2021/0035442 A1 | 2/2021 | Baig |
| 2021/0035450 A1 | 2/2021 | Gao |
| 2021/0039669 A1 | 2/2021 | Watson |
| 2021/0039682 A1 | 2/2021 | Wu |
| 2021/0039779 A1 | 2/2021 | Salas-Moreno |
| 2021/0041882 A1 | 2/2021 | Lacaze |
| 2021/0042575 A1 | 2/2021 | Firner |
| 2021/0046861 A1 | 2/2021 | Li |
| 2021/0046946 A1 | 2/2021 | Nemec |
| 2021/0048304 A1 | 2/2021 | Pedersen |
| 2021/0048991 A1 | 2/2021 | Tanner |
| 2021/0049243 A1 | 2/2021 | Venkatadri |
| 2021/0049415 A1 | 2/2021 | Whiteson |
| 2021/0049903 A1 | 2/2021 | Zhang |
| 2021/0053407 A1 | 2/2021 | Smith |
| 2021/0065027 A1 | 3/2021 | Yamamoto |
| 2021/0086370 A1 | 3/2021 | Zhang |
| 2021/0088337 A1 | 3/2021 | Koubaa |
| 2021/0117730 A1 | 4/2021 | Alsallakh |
| 2021/0133502 A1 | 5/2021 | Dees |
| 2021/0173831 A1 | 6/2021 | Crabtree |
| 2021/0188316 A1* | 6/2021 | Marchetti-Bowick ................... G06N 3/045 |
| 2021/0232915 A1 | 7/2021 | Dalli |
| 2021/0247781 A1 | 8/2021 | Liu |
| 2021/0271253 A1 | 9/2021 | Liu |
| 2021/0278854 A1 | 9/2021 | Serrano |
| 2021/0287556 A1 | 9/2021 | Hong |
| 2021/0304066 A1 | 9/2021 | Tomioka |
| 2021/0311504 A1 | 10/2021 | Chai |
| 2021/0380105 A1* | 12/2021 | Hudecek ............. G05D 1/0088 |
| 2021/0394788 A1 | 12/2021 | Guo |
| 2022/0027737 A1 | 1/2022 | Dalli |
| 2022/0055215 A1 | 2/2022 | Hasegawa |
| 2022/0057804 A1 | 2/2022 | Hasegawa |
| 2022/0058815 A1 | 2/2022 | Xu |
| 2022/0146997 A1* | 5/2022 | Stepanova ............. G06N 20/00 |
| 2023/0316924 A1* | 10/2023 | Hruschka ............. G08G 1/166 701/301 |
| 2024/0067209 A1* | 2/2024 | Bárdos ............. B60W 60/0011 |

* cited by examiner

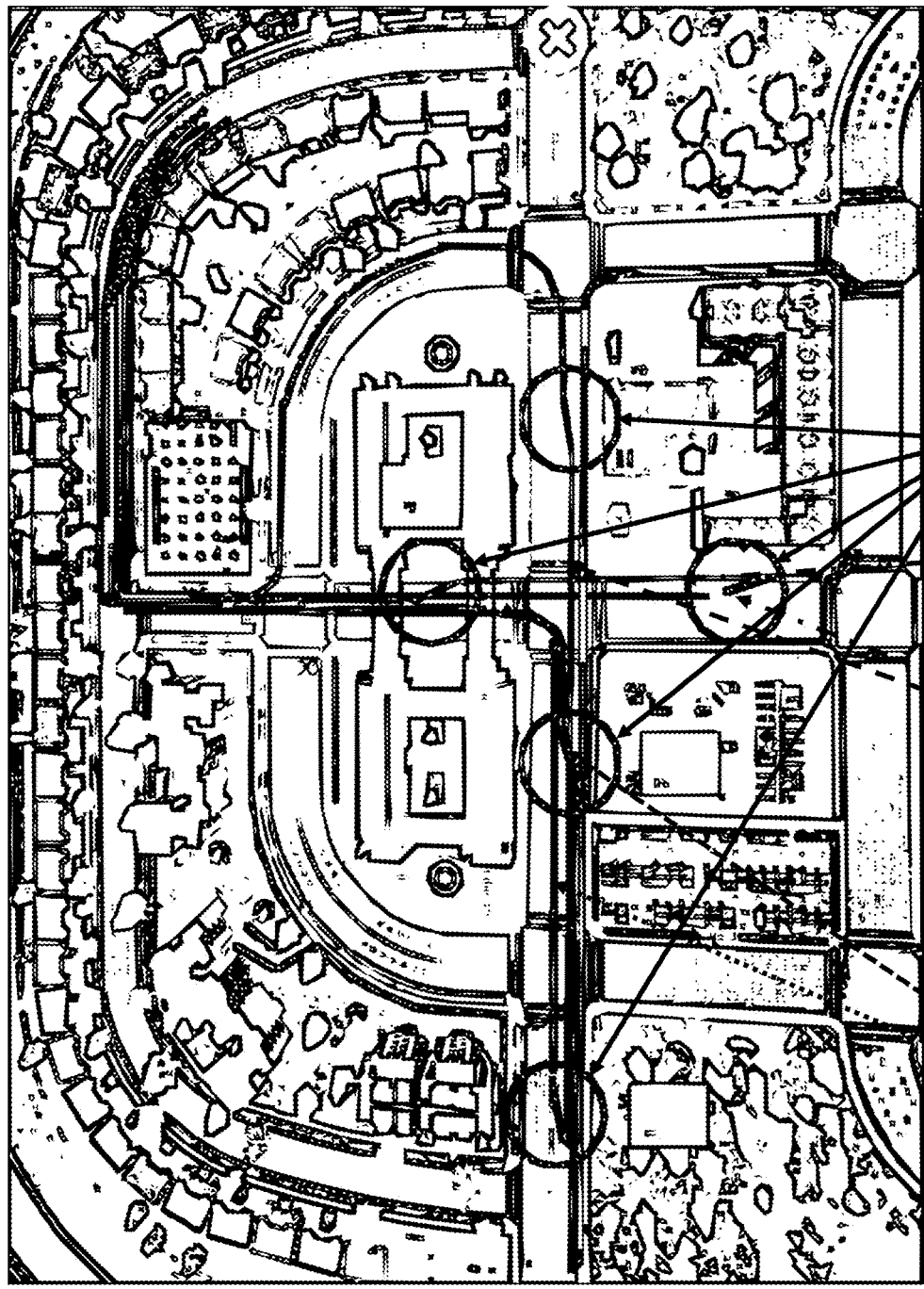

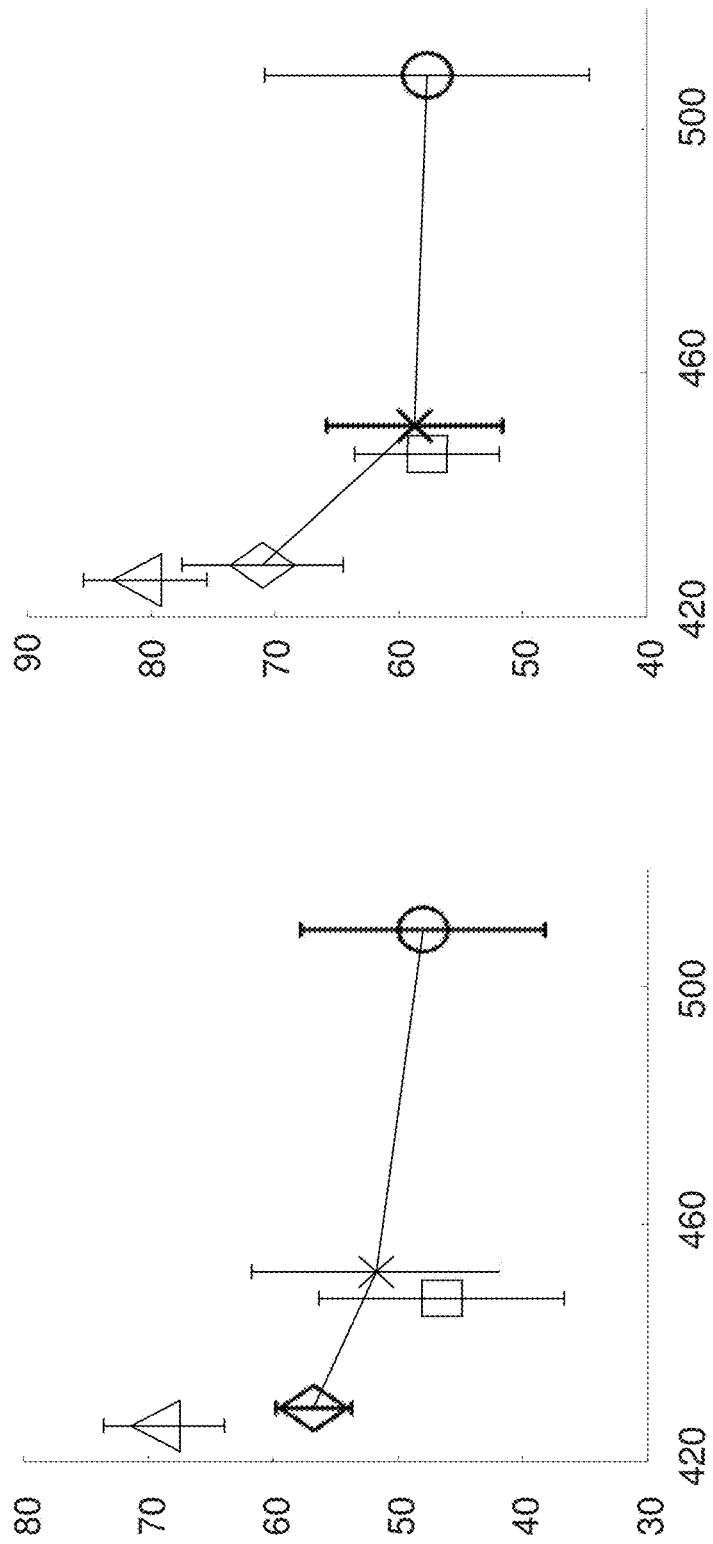

TASK-MOTION PLANNING FOR SAFE AND EFFICIENT URBAN DRIVING

CROSS REFERENCE TO RELATED APPLICATION

The present application is a non-provisional of, and claims benefit under 35 U.S.C. § 119(e) of, U.S. Provisional Patent Application No. 62/200,431, filed Mar. 5, 2021, the entirety of which is expressly incorporated herein by reference.

FIELD OF THE INVENTION

The present invention relates to the field of autonomous driving systems, and more particularly to a system which enables interaction between task and motion planners.

INCORPORATION BY REFERENCE

Citation or identification of any reference herein, or any section of this application shall not be construed as an admission that such reference is available as prior art. The disclosure of each publication and patent listed or referenced herein are hereby incorporated by reference in their entirety in this application, see 37 C.F.R. § 1.57(c), and shall be treated as if the entirety thereof forms a part of this application. Such references are provided for their disclosure of technologies as may be required to enable practice of the present invention, to provide written description for claim language, to make clear applicant's possession of the invention with respect to the various aggregates, combinations, permutations, and sub-combinations of the respective disclosures or portions thereof (within a particular reference or across multiple references) in conjunction with the combinations, permutations, and sub-combinations of various disclosure provided herein, to demonstrate the non-abstract nature of the technology, and for any other purpose. Except as expressly indicated, the scope of the invention is inclusive, and therefore the disclosure of a technology or teaching within these incorporated materials is intended to encompass that technology or teaching as being an option of, or an addition to, other disclosure of the present invention. Likewise, the combination of incorporated teachings consistent with this disclosure is also encompassed. The citation of references is intended to be part of the disclosure of the invention, and not merely supplementary background information. While cited references may be prior art, the combinations thereof and with the material disclosed herein is not admitted as being prior art.

The incorporation by reference does not extend to teachings which are inconsistent with the invention as expressly described herein as being essential. The incorporated references are rebuttable evidence of a proper interpretation of terms, phrases, and concepts employed herein by persons of ordinary skill in the art. No admission is made that any incorporated reference is analogous art to the issues presented to the inventor, and the selection, combination, and disclosure of these disparate teachings is itself a part of the invention herein disclosed.

BACKGROUND OF THE INVENTION

Autonomous driving technologies have the great potential of reshaping urban mobility in people's daily life [1], [2], [3]. To be deemed useful, autonomous vehicles (hereinafter "vehicles") must be time-efficient in accomplishing service tasks, which frequently requires symbolic actions such as "Merge left, go straight, turn left, and park right", while at the same time ensuring safety in executing such actions on the road [4], [5], [6].

Generally, autonomous vehicles need to plan at the task level to compute a sequence of symbolic actions toward fulfilling service requests from people. In this process, how the actions are implemented in the real world is out of consideration at the task level. At the same time, vehicles must plan at the motion level to compute continuous trajectories, and desired control signals (e.g., for steering, accelerating, and braking) to implement the symbolic actions. While the task planner hopes that all the symbolic actions can be implemented by the vehicles, there is the safety concern that must be considered at the motion level. For instance, lane-changing behaviors can be dangerous in heavy traffic. FIGS. 1A and 1B show two situations for a vehicle that are dangerous and safe, respectively. FIG. 1A shows a risky situation for the vehicle (blue) to merge left due to the busy traffic. FIG. 1B shows a safe situation exists for the vehicle to merge left. The goal of TMPUD is to enable the motion level to take symbolic actions from, and communicate safety to the task level toward efficient and safe autonomous driving behaviors.

Although task planning (frequently referred to as behavior planning in autonomous driving [7]) and motion planning have been individually conducted in autonomous driving, there is little research from the literature focusing on the interaction between task and motion levels. There is the critical need of developing algorithms to bridge the gap between task planning and motion planning to help vehicles improve the task-completion efficiency while ensuring the safety of driving behaviors.

The robotics community has studied the integration of task and motion planning, mostly in manipulation domains [8], [9], [10], [11]. In comparison to those domains, autonomous driving algorithms must consider the uncertainty from the ego vehicle, and the surrounding objects (including other vehicles) on the road. The uncertainty must be quantitatively evaluated at the motion level, and taken into consideration for planning at the task level. For instance, when the left lane is busy and missing the next crossing does not introduce much extra distance, the task planner should avoid forcing the vehicle to merge left. Such behaviors are possible, only if the interactions between task and motion levels are enabled.

Motion-Level Planning for Autonomous Driving: Safety is of the most importance at the motion level, and highly relies on the motion-level controllers. Early research in robotics (mostly on manipulation problems) has developed a "safe set" algorithm to avoid unsafe situations in human-robot interactions [14], where it offers a theoretical guarantee of safety. That algorithm has been improved to further account for the uncertainty from the real world [15], where both efficiency and safety were modeled in human-robot interface scenarios. Those methods focused on robot manipulation domains, where it is frequently assumed the acting agent being the only one that makes changes in the world, and hence are not applicable to autonomous driving domains.

Within the autonomous driving context, researchers have developed a series of learning and decision-making methods to enable motion planners to learn safe behaviors [16], [17], [18], [19], [20], [21]. The above-mentioned methods (in robotics and autonomous driving) mainly focus on motion-level behaviors, and do not look into how motion-level behaviors can be sequenced at the task level to accomplish complex driving tasks.

Task-Level Planning for Autonomous Driving: Task planning has been applied to autonomous driving. For instance, one of the earliest works on this topic demonstrated that task planning techniques enable vehicles to complete complex tasks, such as to avoid temporary roadblocks [13]. However, their work did not consider costs of driving behaviors, and hence performs poorly in task-completion efficiency. Similarly, task planners in [22], [23], [24] have no interaction with the motion planner, and safety was not modeled in generating the driving behaviors.

More recent research has enabled vehicles to periodically verify the task sequences and motion trajectories against the actual traffic situation [25]. In case of possible dangers detected at the motion level, re-planning is triggered at the task level. The main limitation of this is that the triggering is deterministic, and highly depends on a safety threshold. The threshold must be set beforehand to ensure safety, which frequently produces over-conservative behaviors, and significantly reduces the task-level efficiency.

Task and Motion Planning: Researchers have integrated task and motion planning in robotics, where the primary domain is robot manipulation [26], [27], [28], [29], [8]. Research on manipulation is mostly concerned with the motion-level feasibility, e.g., in grasping and ungrasping behaviors, and accomplishing high-level tasks, such as stacking objects. Those methods did not consider the uncertainty from other agents (e.g., vehicles on the road). As a result, their systems produce over-optimistic (and hence risky) behaviors, assuming no other agents making changes in the world, and are not applicable to autonomous driving domains.

Further work has surveyed frameworks for autonomous driving [7], including works that plan at both task and motion levels. However, their motion planners do not provide any feedback to the task level, except for infeasible actions.

SUMMARY OF THE INVENTION

The present invention provides a system and method for task and motion planning for urban driving, which is useful for both real-time guidance and autonomous vehicles.

Autonomous vehicles need planning capabilities at two separate levels. On the one hand, at the task level, the vehicle needs to compute a sequence of actions to accomplish human-specific goals (say to buy groceries and add gasoline before going home) using action knowledge provided by domain experts. This so-called task planning problem is traditionally a problem studied in the AI community. On the other hand, the vehicle needs to compute motion trajectories that connect current and goal locations. At the motion level, the vehicle needs to consider its surrounding vehicles to ensure safety. Motion planning is traditionally a robotics problem.

The present technology brings task planning and motion planning together, and applies the integrated system onto autonomous driving scenarios. As a result, an approach, called Task-Motion Planning for Urban Driving (TMPUD), enables efficient task-level behaviors, while ensuring motion-level safety guarantees. See:

Ding, Yan, Xiaohan Zhang, Xingyue Zhan, and Shiqi Zhang. "Task-motion planning for safe and efficient urban driving." In 2020 IEEE/RSJ International Conference on Intelligent Robots and Systems (IROS), pp. 2119-2125. IEEE, 2020;

Zhang, Xiaohan, Yifeng Zhu, Yan Ding, Yuke Zhu, Peter Stone, and Shiqi Zhang. "Visually Grounded Task and Motion Planning for Mobile Manipulation." arXiv preprint arXiv:2202.10667 (2022).

Ding, Yan, Xiaohan Zhang, Xingyue Zhan, and Shiqi Zhang. "Learning to Ground Objects for Robot Task and Motion Planning." arXiv preprint arXiv:2202.06674 (2022).

Phiquepal, Camille, and Marc Toussaint. "Combined task and motion planning under partial observability: An optimization-based approach." In 2019 International Conference on Robotics and Automation (ICRA), pp. 9000-9006. IEEE, 2019.

Woods, Grayson Landis. "Evaluation of Local Kinematic Motion Planning Algorithms for a Truck and Trailer System." PhD diss., 2020.

He, Zichen, Jiawei Wang, and Chunwei Song. "A review of mobile robot motion planning methods: from classical motion planning workflows to reinforcement learning-based architectures." arXiv preprint arXiv:2108.13619 (2021).

An existing task planning (an Answer Set Programming, or ASP), approach, and motion planning algorithms (provided by the CARLA simulator), are used. See, Lifschitz, Vladimir. Answer set programming. Berlin: Springer, 2019.

Brewka, Gerhard, Thomas Eiter, and Miroslaw Truszczynski. "Answer set programming at a glance." Communications of the ACM 54, no. 12 (2011): 92-103.

Eiter, Thomas, Giovambattista Ianni, and Thomas Krennwallner. "Answer set programming: A primer." In Reasoning Web International Summer School, pp. 40-110. Springer, Berlin, Heidelberg, 2009.

Erdem, Esra, Michael Gelfond, and Nicola Leone. "Applications of answer set programming." AI Magazine 37, no. 3 (2016): 53-68.

Lifschitz, Vladimir. "Answer set planning." In International Conference on Logic Programming and Nonmonotonic Reasoning, pp. 373-374. Springer, Berlin, Heidelberg, 1999.

Gebser, Martin, Torsten Schaub, and Sven Thiele. "Gringo: A new grounder for answer set programming." In International Conference on Logic Programming and Non-monotonic Reasoning, pp. 266-271. Springer, Berlin, Heidelberg, 2007.

Lifschitz, Vladimir. "Answer set programming and plan generation." Artificial Intelligence 138, no. 1-2 (2002): 39-54.

Bonatti, Piero, Francesco Calimeri, Nicola Leone, and Francesco Ricca. "Answer set programming." A 25-year perspective on logic programming (2010): 159-182.

Gebser, Martin, Roland Kaminski, and Torsten Schaub. "Complex optimization in answer set programming." Theory and Practice of Logic Programming 11, no. 4-5 (2011): 821-839.

Niemela, Ilkka, Patrik Simons, and Tommi Syrjanen. "Smodels: a system for answer set programming." arXiv preprint cs/0003033 (2000).

Liu, Guohua, Tomi Janhunen, and Ilkka Niemela. "Answer set programming via mixed integer programming." In Thirteenth International Conference on the Principles of Knowledge Representation and Reasoning. 2012.

Brewka, Gerhard, Thomas Eiter, and Miroslaw Truszczynski. "Answer set programming: An introduction to the special issue." AI Magazine 37, no. 3 (2016): 5-6.

Eiter, Thomas, Giovambattista Ianni, Roman Schindlauer, and Hans Tompits. "A uniform integration of higher-order reasoning and external evaluations in answer-set programming." In IJCAI, vol. 5, pp. 90-96. 2005.

Toni, Francesca, and Marek Sergot. "Argumentation and answer set programming." Logic Programming, Knowledge Representation, and Nonmonotonic Reasoning (2011): 164-180.

US Patent and Patent Application Nos. 20220027737; 20210304066; 20210232915; 20210173831; 20210086370; 20210065027; 20200174765; 20200142732; 20200117575; 20200110835; 20200073739; 20190354911; 20190333164; 20190318411; 20190073426; 20190028370; 20180204122; 20180005123; 20150339355; 20150253768; 20140278683; 20140278682; 20140214582; 20140214581; 20140214580; 20140214487; 20140214474; 20120050787; 20100225954; 20090182786; 11,170,300; 11,165,783; 11,074,103; 11,055,200 11,036,774; 10,977,111; 10,832,141; 10,706,480; 10,705,814; 10,373,268; 10,305,765; 9,925,462; 9,584,535; 9,450,975; 9,135,432; 9,117,201; 9,110,905; 9,100,363; 9,059,960; 9,055,094; 8,990,387; 8,677,486; 8,671,182; 8,601,034; 8,578,002; 8,576,430; 8,474,043; 8,433,790; 8,289,882; 8,272,055; 8,127,353; 7,440,942; 7,219,350; and 7,197,699.

The simulation platform is provided by the autonomous driving community—CARLA, see CARLA.org. It simulates the ego vehicle's behaviors, as long as how the surrounding vehicles respond to the ego vehicle's behaviors. github.com/carla-simulator/carla/blob/dev/LICENSE. See also, US 20220042258; 20210390725; 20210326606; and 20200226377.

Gómez-Hudlamo, Carlos, Javier Del Egido, Luis M. Bergasa, Rafael Barea, Elena López-Guillén, Felipe Arango, Javier Araluce, and Joaquin López. "Train here, drive there: Simulating real-world use cases with fully-autonomous driving architecture in carla simulator." In Workshop of Physical Agents, pp. 44-59. Springer, Cham, 2020.

Niranjan, D. R., and B. C. VinayKarthik. "Deep Learning based Object Detection Model for Autonomous Driving Research using CARLA Simulator." In 2021 2nd International Conference on Smart Electronics and Communication (ICOSEC), pp. 1251-1258. IEEE, 2021.

Deschaud, Jean-Emmanuel. "KITTI-CARLA: a KITTI-like dataset generated by CARLA Simulator." arXiv preprint arXiv:2109.00892 (2021).

Stević, Stevan, Momćilo Krunić, Marko Dragojevid, and Nives Kaprocki. "Development and validation of ADAS perception application in ROS environment integrated with CARLA simulator." In 2019 27th Telecommunications Forum (TELFOR), pp. 1-4. IEEE, 2019.

Zhang, Wei, Siyu Fu, Zixu Cao, Zhiyuan Jiang, Shunqing Zhang, and Shugong Xu. "An SDR-in-the-loop Carla simulator for C-V2X-based autonomous driving." In IEEE INFOCOM 2020-IEEE Conference on Computer Communications Workshops (INFOCOM WKSHPS), pp. 1270-1271. IEEE, 2020.

TMPUD does not depend on any particular simulation platform, vehicle model, or the selections of task and motion planners. From the simulation perspective, as long as the simulation platform is able to provide how the ego vehicle and environment respond to the ego vehicle's behaviors, they can be used for prototyping and evaluation purposes. TMPUD provides a generic way of computing task-motion plans. CARLA was selected as the evaluation platform because it well supports the simulation of sensors, traffic lights, weathers, and road conditions. However, one can easily implement TMPUD using other popular simulators, such as AirSim (github.com/microsoft/AirSim) and Gazebo (github.com/osrf/gazebo). There are a number of such open-source simulation platforms, and many more that are not open-source.

The technology operates at two different levels; a high level task planning which permits determines goals and intermediate waypoints, for example, as well as low level motion planning which makes short-time scale decisions regarding movement options to achieve the same overall objectives. In general, the high level (long term, prospective, goal oriented) and low level (short term, concurrent, operations-oriented) planning must be both efficient and safe, and these disparate themes are combined using a cost-function. When the motion planner causes a deviation from a nominal task plan, the task planner then re-executes in order to replan the task based on the deviation. One way to consider the task planner and the motion planner is that the former is operative proactively based on predicted states and initial conditions to achieve a plan for a future action, while the motion planner is responsive to initial conditions and real time (sensor) data to plan a current action than as achieved nearly simultaneously with the planning.

Task-Motion Planning for Urban Driving (TMPUD) is thus provided for efficient and safe autonomous urban driving. TMPUD enables the interaction between task and motion planners through enabling the motion-level safety estimation and task-level replanning capabilities.

TMPUD has been evaluated using CARLA, an autonomous driving platform for simulating urban driving scenarios. [12] suggest TMPUD improves both safety and efficiency, in comparison to two baseline methods from the literature [13], [8]. TMPUD supports the interaction between task and motion levels, and aims at improving both safety and efficiency of autonomous driving behaviors. The TMPUD algorithm supports motion-level safety evaluation, and enables the task planner to dynamically adjust high-level plans to account for current road conditions toward accomplishing long-term driving tasks.

Task Planning

A task planning domain is specified by $D^t$, including a set of states, S, and a set of actions, A. A factored state space is assumed such that each state $s \in S$ is defined by the values of a fixed set of variables; each action $a \in A$ is defined by its preconditions and effects. A utility function maps the state transition to a real number, which takes both cost function Cost(s,a,s') and safety function Safe(s,a,s') into account. Specifically, the cost and safety functions respectively reflect the cost and safety of conducting action a in state s.

Given domain $D^t$ and a task planning problem, a plan $p \in P$ is computed, starting from an initial state $s^{init} \in S$ and finishing in a goal state $s^g \in S$. A plan p consists of a sequence of transitions that can be represented as: $p = \langle s_0, a_0, \ldots, s_{N-1}, a_{N-1}, s_N \rangle$, where $s_0 = s^{init}$, $s^N = s^g$ and P denotes a set of satisfactory plans. Task planner $P^t$ can produce an optimal plan p* among all satisfactory plans, where $\gamma$ is a constant coefficient and $\gamma > 0$ $$p^* = \operatorname*{argmin}_{p \in P} \sum_{\langle s, a, s' \rangle \in p} \left[ \operatorname{Cost}(\langle s, a, s' \rangle) + \frac{\gamma}{1 + e^{\operatorname{Safe}(\langle s, a, s' \rangle) - 1}} \right].$$

Motion Planning

A motion planning domain is specified by $D^m$, where a search is conducted directly in 2D space constrained by the urban road network. Some parts of the space are designated as free space, and the rest are designated as obstacles. The 2D space is represented as a region in Cartesian space such that the position and orientation of the vehicle can be uniquely represented as a pose, denoted by x.

It is noted that the technology is not limited to operation in a 2D space, and rather is also applicable to higher dimensional spaces, e.g., 3D spaces (such as for aerial autonomous vehicles), and ~1D spaces (such as railroad or other constrained path travel).

Given domain $D^m$, a motion planning problem can be specified by an initial pose $x^i$ and a goal pose $x^g$. The motion planning problem is solved by a motion planner $P^m$ consisting of path planner and tracking planner into two phases. In the first one, a path planner computes a collision-free trajectory $\xi$ connecting pose $x^i$ and pose $x^g$ taking into account any motion constraints on the part of the vehicle with minimal trajectory length. In the second one, a tracking controller computes desired control signals to drive the vehicle to follow the computed trajectory. Due to the fundamental difference between representations at task and motion levels, in line with past research [26], [29], [8], [11], a state mapping function, $f:X=f(s)$, is used to map the symbolic state s into a set of feasible poses X in continuous space, for motion planner to sample from. Availability of at least one pose $x \in X$ is assumed in each state s, such that the vehicle is in the free space of $D^m$. If it is not the case, the state s is declared infeasible.

Safety Estimation

Safety estimation aims at computing the safety level, Safe($\langle s,a,s' \rangle$), of the motion-level implementation of a symbolic action $\langle s,a,s' \rangle$. The goal of computing the safety value is to enable the task planner to incorporate the road condition into the process of sequencing high-level actions toward accomplishing complex driving tasks.

To perform symbolic action $\langle s,a,s' \rangle$, a motion planner is used to compute a sequence of continuous control signals, i.e., acceleration $\delta \in \Delta$ and steering angle $\theta \in \Theta$, to drive the vehicle following the planned trajectory, while ensuring no collision on the road. Sets $\Delta$ and $\Theta$ denote the operation specification of the controller, which generally depends on the adopted motion planner and the ego vehicle itself. Let $U_s(t)$ (mathematically $U_s(t) \subset \Delta \times \Theta$) specify a safe control set at time t, in which all elements, denoted by $u(t) = \langle \delta, \theta \rangle$, are safe for an ego vehicle to perform at time t. Intuitively, the size of safe control set $U_s$ reflects the safety level. For instance, when $|U_s|$ is very small, meaning that very few control signals are safe, the vehicle can only be operated in very particular ways, indicating the safety level in general is low. Accordingly, the probability of elements sampled from set $\Delta \times \Theta$ being located in the safe set $U_s$ is to represent the safety value of action $\langle s,a,s' \rangle$.

Safety Estimation Algorithm

Algorithm 1 summarizes the procedure of the safety estimation algorithm. The input includes symbolic action $\langle s,a,s' \rangle$, stating mapping function $f$, motion planner $P^m$ consisting of path planner and tracking controller, and the controller's operation specification sets $\Delta$ and $\Theta$. The output is the estimated safety value Safe($\langle s,a,s' \rangle$) $\in$ [0.0,1.0].

In algorithm 1, lines 1-3 aim to obtain the short-period trajectories of the ego and surrounding vehicles, where $V_i, i \in [1, \ldots, N]$ is the ith vehicle within the ego vehicle's sensing range. More specifically, a first sample of a pair of feasible initial and goal poses for the symbolic actions using the state mapping function (Line 1). Taking these two poses as input, the motion planner then computes a continuous trajectory for the ego vehicle for a short period of time $[t_1, t_2]$ (Line 2), where $t_1$ is the current time, and $t_2 = t_2 + T$ indicates the time horizon of the ego vehicle. Surrounding vehicles' trajectories are predicted, assuming their linear and angular speeds being stationary (Line 3), though there are more advanced methods [30], [31].

Lines 4-8 of algorithm 1 present a control loop that computes the safety estimation between the ego vehicle and the surrounding vehicles $V_i$, where $i \in [1, \ldots, N]$, given that the ego vehicle is performing action $\langle s,a,s' \rangle$ at the motion level. A safe control set $U_i^s(t)$ is computed, similar to [19], that includes all safe control signals with regard to vehicle $V_i$ at time t (Line 5). Parameter $\omega$ controls the sampling interval.

In Line 6 of algorithm 1, M elements are randomly sampled from the set $\Delta \times \Theta$, and compute probability $o_i(t)$ of the sampled elements falling in set $U_i^s(t)$. A list of values of safety estimation $\{o_i(t)\}$ is converted into a single value $o^*_i$ using eqn. 1, where max and mean are two functions to calculate the maximum and mean value of a list, respectively (Line 7). Although all surrounding vehicles can potentially introduce risks to the ego vehicle, the ego vehicle is assumed to only consider the most dangerous vehicle. Accordingly, Line 9 is used for selecting the minimum value, $o^*_i, i \in [1, \ldots, N]$, as the overall safety value:

$$o_i^* = \frac{\max_{t \in T}\{o_i(t)\} + \text{mean}_{t \in \mathcal{T}}\{o_i(t)\}}{2} \quad (1)$$

Where $\mathcal{T} = t_1 + \omega \times i$, $0 \le i \le \frac{(t_2 - t_2)}{\omega}$ Algorithm 1 Safety Estimation Input: Symbolic action $\langle s,a,s' \rangle$, state mapping function $f$, motion planner $P^m$, control operation sets $\Delta$ and $\Theta$ 1: Sample initial and goal poses, $x \leftarrow f(s)$ and $x' \leftarrow f(s')$, given action $\langle (s,a,s') \rangle$, and $f$.
2: Compute a collision-free trajectory, $\xi^E$, using $P^m$, where $\xi^E(t_1) = x, \xi(t_2) = x'$; and $[t_1, t_2]$ is the horizon
3: Predict trajectory $\xi_i^s$ for the ith surrounding vehicle, where $i \in [1, \ldots, N]$, and $[t_1, t_2]$ is the horizon
4: while for each vehicle $V_i$ do
5: Compute safe control set $U_i^s(t)$ between the ego vehicle and vehicle $V_i$ at time $t \in [t_1, t_2]$, where $U_i^s(t) \in \Delta \times \Theta$ and $$t = t_1 + \omega \times i, i \le \frac{(t_2 - t_2)}{\omega}$$

6: Sample M elements $\langle \delta, \theta \rangle$ randomly from set $\Delta \times \Theta$ and compute the probability $o_i(t)$ of the elements falling in set $U_i^s(t)$
7: Convert a list of estimated safety values, $\{o_i(t)\}$, into a scalar value $o^*_i$ using Eqn. 1
8: end while
9: return min$\{o^*_i, i=1, \ldots, N\}$

TMPUD

The motion planner $P^m$ computes both costs (trajectory lengths) and safety values of the ego vehicle's navigation actions.

$s^{init}$ is used to represent the initial state of the ego vehicle, and the goal (service request from people) is specified using $s^g$. The task planner $P^t$ computes a sequence of symbolic actions, and it requires two functions that are initialized and updated within the algorithm, including cost function Cost, and safety estimation function Safe. Motion planner $P^m$ is used for computing motion trajectories, and generating control signals to move the ego vehicle. The state mapping function $f$ is used for mapping symbolic states to 2D coordinates in continuous spaces.

The TMPUD Algorithm

Algorithm 2 summarizes the procedure of TMPUD. It starts by initializing the cost and safety estimation functions (Lines 1 and 2 of algorithm 2). Cost function Cost is initialized using the A* algorithm provided by CARLA, as shown in Line 1 of algorithm 2. In Line 2 of algorithm 2, TMPUD optimistically initializes the safety estimation function by setting 1.0 to all actions, indicating all task-level actions are completely safe. After that, an optimal task plan, $p^* = \langle s^{init}, a_0, s_1, \ldots, s^g \rangle$ is computed in Line 3 of algorithm 2. The head and tail elements of the plan, $s^{init}$ and $s^g$, correspond to the initial and goal poses respectively.

Lines 4-19 of algorithm 2 form TMPUD's main control loop that enables the interaction between task and motion planners. The loop's termination condition is the task-level plan being empty, i.e., the goal has been achieved (Line 4 of algorithm 2). Specifically, TMPUD estimates the safety level, $\mu$, of action $\langle s,a,s' \rangle$ (Line 5 of algorithm 2). Functions Safe and Cost are updated using $\mu$ and A* search in Line 6 of algorithm 2. Then a new optimal plan p' is computed in Line 7 of algorithm 2. Lines 8-18 of algorithm 2 is for plan monitoring and action execution. If the task planner suggests the same plan (Line 8 of algorithm 2), the vehicle will continue to execute action a at the motion level. The goal state is sampled from state mapping function in Line 9 of algorithm 2. Lines 10-14 of algorithm 2 is a loop to execute the action. Specifically, the motion planner will compute and execute a desired control signal $\langle \delta,\theta \rangle$ repeatedly until the vehicle reaches the goal pose (Line 10 of algorithm 2). The vehicle's current pose x will be updated after each execution (Line 13 of algorithm 2). After completing the operation, the tuple $\langle s,a \rangle$ will be removed from the plan p (Line 15 of algorithm 2). On the contrary, if the task planner suggests a new plan p' different from the plan p, the currently optimal p' will replace the non-optimal plan p (Line 17 of algorithm 2).

Algorithm 2 TMPUD algorithm

Input: Initial state $s^i$, goal specification $s^g$, task planner $P^t$, state mapping function $f$, motion planner $P^m$, and safety estimator (Algorithm 1)

1: Initialize cost function Cost with sampled poses
   $x \in f(s): \text{Cost}(\langle s,a,s' \rangle) \leftarrow A^*(x,x')$
2: Initialize safety estimation $\text{Safe}(s,a,s') \leftarrow 1.0$
3: Compute an optimal task plan p using Cost and Safe functions:

$p \leftarrow P^t(s^{init}, s^g, \text{Cost}, \text{Safe})$, where $p =$
   $\langle s^{init} \rightarrow a_0, s_1, a_1, \ldots, s^g \rangle$ 4: while Plan p is not empty do
5:   Extract the first action of p'(s,a,s') and compute safety value p using Algorithm 1
6:   Update Safe function: $\text{Safe}(\langle \in a, s' \rangle) \leftarrow \mu$ and Cost function:

$\text{Cost}(\langle s,a,s' \rangle) \leftarrow A^*(x,x')$

7:   Generate a new plan: $p' \leftarrow P^t(s, s^g, \text{Cost}, \text{Safe})$
8:   if p'==p then
9:     $x' \leftarrow f(s')$
10:    while x!=x' do
11:      Call motion planner $\langle \delta,\theta \rangle \leftarrow P^m(x,x')$
12:      Execute the control signal $\langle \delta,\theta \rangle$
13:      Update the vehicle's current pose x
14:    end while
15:    Remove the tuple $\langle s, a \rangle$ from plan p
16:  else
17:    Update current plan $p \leftarrow p'$
18:  end if
19: end while Task Planner The task planner $P^t$ is implemented using Answer Set Programming (ASP), which is a popular declarative language for knowledge representation and reasoning, and ASP has been used for task planning [32], [33], [11], [34]. For example, predicate leftof(La1,La2) can be used to specify lane La1 being on the left of lane La2. Five driving actions are modelled, including mergeleft, mergeright, forward, turnleft, and turnright. For instance, action mergeright can be used to help the vehicle merge to the right lane, where constraints, such as "changeright" is allowed only if there exists a lane on the right, have been modeled as well.

Motion Planner

At the motion level, path planner firstly generates a desired continuous trajectory with the minimal traveling distance using A* search. The trajectory includes a set of waypoints (each in the form of a pair of x-y coordinate and orientation), and the trajectory is delivered to the tracking controller, along with the vehicle's current pose and speed. The controller uses a proportional-integral-derivative (PID) controller [35] to generate control signals, e.g., for steering, throttle, and brake. PID controller is very popular due to its simplicity, flexibility, and robustness.

CARLA, an open-source 3D urban driving simulator [12] was been developed to support development, training, and validation of autonomous driving systems. Compared to other simulation platforms, e.g., [36], [37], see, U.S. Pat. Nos. 11,150,655; 11,030,476; 10,997,467; 10,596,339; 9,662,068; 11,150,658; 10,588,033; 10,425,954; 20210394788; 20210311504; 20210278854; 20210271253; 20210133502; 20210117730; 20190004518; 20220058815; 20220057804; 20220055215; 20210287556; 20210247781; 20210088337; 20200310444; 20200293053; 20200293052; 20200293051; 20190053074; and 20180288774, CARLA provides open digital assets (urban layouts, buildings, vehicles) that were created for this purpose and can be used freely.

See also:

Bondi, Elizabeth, Debadeepta Dey, Ashish Kapoor, Jim Piavis, Shital Shah, Fei Fang, Bistra Dilkina et al. "Airsim-w: A simulation environment for wildlife conservation with uavs." In Proceedings of the 1st ACM SIGCAS Conference on Computing and Sustainable Societies, pp. 1-12. 2018.

Shah, Shital, Debadeepta Dey, Chris Lovett, and Ashish Kapoor. "Airsim: High-fidelity visual and physical simulation for autonomous vehicles." In Field and service robotics, pp. 621-635. Springer, Cham, 2018.

Nguyen, Justin, Peter K. Nguyen, and Mujahid Abdulrahim. "Development of an Unmanned Traffic Management Simulation with Robot Operating System and Gazebo." In AIAA SCITECH 2022 Forum, p. 1918. 2022.

Mehrooz, Golizheh, Emad Ebeid, and Peter Schneider-Kamp. "System design of an open-source cloud-based framework for internet of drones application." In 2019 22nd Euromicro Conference on Digital System Design (DSD), pp. 572-579. IEEE, 2019.

Zhu, Donglin, Guanghui Xu, Xiaoting Wang, Xiaogang Liu, and Dewei Tian. "PairCon-SLAM: Distributed, Online, and Real-Time RGBD-SLAM in Large Scenarios." IEEE Transactions on Instrumentation and Measurement 70 (2021): 1-14.

Nikolenko, Sergey I. "Synthetic Simulated Environments." In Synthetic Data for Deep Learning, pp. 195-215. Springer, Cham, 2021.

de Figueiredo, Rui Pimentel, Jonas le Fevre Sejersen, Jakob Grimm Hansen, Martim Brandao, and Erdal Kayacan. "Real-Time Volumetric-Semantic Exploration and Mapping: An Uncertainty-Aware Approach." In 2021 IEEE/RSJ International Conference on Intelligent Robots and Systems (IROS), pp. 9064-9070. IEEE, 2021.

Yoon, Sugjoon, Dongcho Shin, Younghoon Choi, and Kyungtae Park. "Development of a flexible and expandable UTM simulator based on open sources and platforms." Aerospace 8, no. 5 (2021): 133.

The CARLA software provides two functionalities: First, it enables an ego vehicle to evaluate the safety level based on its surrounding vehicles' locations and speeds. Second, it computes task-level plans (a sequence of symbolic actions), and motion-level plans (a trajectories in continuous space) at the same time.

An autonomous vehicle (AV) (e.g., a driverless car, a driverless auto, a self-driving car, a robotic car, etc.) is a vehicle that is capable of sensing an environment of the vehicle and traveling (e.g., navigating, moving, etc.) in the environment without human input. An AV uses a variety of techniques to detect the environment of the AV, such as radar, laser light, lidar, Global Positioning System (GPS), odometry, and/or computer vision. In some instances, an AV uses a control system to interpret information received from one or more sensors, to identify a route for traveling, to identify an obstacle in a route, and to identify relevant traffic signs associated with a route.

The AV includes a processor, which may be local to the AV, remote from the AV at a data center, for example, or distributed through a variety of predetermined or ad hoc computing resources. Often, it is useful to implement artificial intelligence and/or machine learning to help manage the extremely high dimensionality of the sensor dataset, rule base, and control options. The processor may include reduced instruction set computing (RISC) processors, complex instruction set processors (CISC), single instruction-multiple data (SIMD) processors or other parallel processing systems, artificial neural network (ANN) processors or implementations, field programmable gate arrays (FPGA), application-specific integrated circuits (ASIC) and the like, and typically will include multiple processors, with some dedicated to particular tasks.

An autonomous vehicle (AV) map of a geographic location may be used for determining nominal driving paths on lanes of roadways (e.g., roadway segments) in the map on which an AV may operate (e.g., route, travel, or perform one or more autonomous operations). For example, a nominal driving path including one or more lanes on one or more roadway segments is determined by generating a center line through lane boundaries of a lane. However, a nominal driving path may not describe a proper driving path through lanes on roadway segments over which an AV can travel. For example, nominal driving paths may include inconsistencies associated with the lane boundaries of the roadway. As an example, a centerline of lane boundaries may provide inaccuracies for AV travel, based on different markings from a first lane to a second lane in a roadway where the width of the lane boundaries are determined. Additionally or alternatively, an AV of a first size may not operate on a nominal driving path, the same as an AV of a second size on the same nominal path. For example, a large sized AV may be limited (e.g., constrained) in movement as compared to a smaller sized AV when traversing a nominal driving path based on the lane boundaries in the roadway of the AV map. Additionally or alternatively, a nominal driving path may be inefficiently determined from aspects of a lane polygon that requires additional storage of points on the polygon and/or additional computations. In this way, a nominal driving path may be less complete and/or result in less efficient processing for operating and/or routing the AV. In addition, a map may be generated that provides an AV fewer operating options and/or driving options, may not account for the proper structure of lanes, and/or may implement additional processing functions to modify or augment the AV map for lanes with incomplete or incorrect physical markings. Therefore, while maps are useful, and permit geographic reference of structures and events, they typically cannot be relied upon for safe traverse during operation of the AV, and sensor data and real-time processing is required for safety and reliability. Further, the limitations on the data available before a task is begun, or before a portion of a task is implemented, impose limits on task planning.

Therefore, an AV should have processing capability for both safe motion planning and task planning available during operation.

A map generation system may contain or receive map data associated with a map of a geographic location, wherein the map data is associated with a roadway or traverse passage in the geographic location. The map generation system determines a general motion path including one or more trajectories for an AV, and the map data may be acquired by various means, and preferably based on one or more traversals of the path by one or more vehicles. The map generation system may generate driving path information based on one or more trajectory points in the one or more trajectories of the driving path. In this way, the map generation system provides and/or generates the driving path data associated with the driving path to an AV for controlling travel of the AV.

A vehicle computing system of an AV may receive driving path data associated with a desired path, including one or more trajectories (or ranges or limits on the available trajectories) that an AV can traverse. For example, the actual travel path and trajectory may be dependent on vehicle speed, traffic, obstacles or hazards, uncontrolled excursions from the desired path (e.g., skids), weather, and other factors.

The AV will therefore typically plan a route in advance of travel, and then make decisions during travel for particular path options dependent on real-time calculations. In this case, a real time calculation is meant to encompass calculations that occur between receipt of sensor data and when the AV must respond to the sensor data to avoid adverse effect. For example, an adaptive suspension may require millisecond scale response times, while a path planning system responsive to a posted traffic signal observed by a camera may have seconds of planning time.

The AV computing system can determine at least one feature of the environment or roadway in the intended (or avoided) path based on the map data, non-real time data (such as historical or old traffic data) and real-time data. In some cases, the vehicle computing system can determine a lateral constraint associated with lateral movement of the AV based on the driving path data associated with the trajectory. Accordingly, the map enables the vehicle computing system to generate and/or traverse a route in a more efficient manner with less processing delays and/or routing for the AV to be performed by the vehicle processing system (e.g., completely by the vehicle processing system).

The map generation system and/or the AV may include one or more devices capable of receiving, storing, and/or providing map data associated with a map of a geographic location (e.g., a country, a state, a city, a portion of a city, a township, a portion of a township, etc.). For example, AV maps are used for routing an AV on a roadway specified in the AV maps. The map data may include data associated with a road (e.g., an identity and/or a location of a roadway of a road, an identity and/or location of a segment of a road, etc.), data associated with features of a road, such as an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. A map of a geographic location may include one or more routes that include one or more roadways. Map data associated with a map of the geographic location may associate each roadway of the one or more roadways with an indication of whether an AV can travel on that roadway. Features of a road may be based on data collected by and/or received from one or more sensors located on an AV as the AV travels on one or more roads in a geographic location.

The map may include dynamic information, such as traffic light timing, diurnal/weekly/monthly/annual traffic density patterns and changes, correlations between patterns at different locations, etc. Further, to the extent that the map is available for use by a human occupant of the AV, the map may also include points of interest, sponsored points of interest (location-based advertising), promotions, and the like. Further, the map may include locations of electric vehicle (EV) charging stations, to allow planning energy availability and replenishment, in addition to endpoint route.

A road refers to a paved or otherwise improved path between two places that allows for travel by a vehicle (e.g., an AV). Additionally or alternatively, a road includes a roadway and a sidewalk in proximity to (e.g., adjacent, near, next to, touching, etc.) the roadway. A roadway may include a portion of road on which a vehicle is intended to travel and is not restricted by a physical barrier or by separation so that the vehicle is able to travel laterally. Additionally or alternatively, a roadway includes one or more lanes, such as a travel lane (e.g., a lane upon which a vehicle travels, a traffic lane, etc.), a parking lane (e.g., a lane in which a vehicle parks), a bicycle lane (e.g., a lane in which a bicycle travels), a turning lane (e.g., a lane in which a vehicle turns from), and/or the like. A roadway may be connected to another roadway, for example a lane of a roadway may be connected to another lane of the roadway and/or a lane of the roadway may be connected to a lane of another roadway.

Note that the present technology is not limited to on-road automobiles, and rather may be used for off-road, unmanned autonomous vehicles (UAV), pedestrians, bicycles, mopeds, motorcycles, snowmobiles, and other types of vehicles or travel situations. The present technology in general seeks to optimize the task planning with the motion planning in a safe and efficient manner. Note that safety is often a statistical consideration, and what is managed is the margin of safety or predicted margin of safety, since other than in extreme cases, operation in a designated unsafe manner is undesirable. On the other hand, in certain sports or emergencies, operation outside of safe ranges is desired, and this can also be accommodated within the paradigm. Likewise, efficiency is typically desired, but the metric may be designed based on various cost functions. Thus, where time is of the essence, a high weighting of time maty lead to an optimal path which would otherwise be considered inefficient or unsafe, or both. More generally, by combining the various considerations of efficiency and safety into a combined determination, hard constraints are avoided, and therefore more options are available during motion to achieve an optimal result.

A map generation system may include one or more devices capable of receiving map data, determining a driving path for an AV including one or more trajectories in a lane of the roadway based on one or more traversals of the roadway by one or more vehicles, generating driving path information based on one or more trajectory points in the one or more trajectories of the driving path in the roadway, and/or providing driving path data associated with the driving path for controlling the AV. For example, the map generation system can include one or more computing systems including one or more processors (e.g., one or more servers, etc.).

AVs may include one or more devices capable of receiving driving path data and determining a route in a lane including a driving path based on the driving path data. The AV may include one or more devices capable of controlling travel, operation, and/or routing of the AV based on the driving path data. For example, the one or more devices may control travel and one or more functionalities associated with the fully autonomous mode of the AV in a lane on the driving path, based on the driving path information including feature information associated with the driving path, for example, by controlling the one or more devices (e.g., a device that controls acceleration, a device that controls steering, a device that controls braking, etc.) of AV based on sensor data, position data, and/or map data associated with determining the features in the lane. The AV may include one or more devices capable of receiving map data, determining a route in a lane that includes the driving path for an AV, including one or more trajectories in a roadway based on one or more traversals of the roadway by one or more vehicles, generating driving path information based on one or more trajectory points in the one or more trajectories of the driving path in the roadway, and/or providing driving path data associated with the driving path for controlling the AV. For example, AV can include one or more computing systems including one or more processors (e.g., one or more servers, etc.).

The map generation system and/or AV may include one or more devices capable of receiving, storing, and/or providing map data (e.g., map data, AV map data, coverage map data, hybrid map data, submap data, etc.) associated with a map (e.g., a map, a submap, an AV map, a coverage map, a hybrid map, etc.) of a geographic location (e.g., a country, a state, a city, a portion of a city, a township, a portion of a township, etc.). For example, maps are used for routing AV on a roadway specified in the map.

The network may include one or more wired and/or wireless networks. For example, the network may include a cellular network (e.g., a long-term evolution (LTE) network, a third generation (3G) network, a fourth generation (4G) network, a fifth generation (5G) network, a sixth generation (6G) network, a WiFi network (e.g., within IEEE-802.11 series of standards, e.g., WiFi 5, WiFi 6, WiFi 6E, WiFi 7), a low earth orbiting satellite network, Starlink, WiMax, etc.), a local area network (LAN), a wide area network (WAN), a metropolitan area network (MAN), an ad hoc network, the Internet, a fiber optic-based network, a cloud computing network, and/or the like, and/or a combination of these or other types of networks.

The AV computing system may include vehicle command system, perception system, prediction system, task planning system, and motion planning system that cooperate to perceive a surrounding environment of AV, determine a motion plan and control the motion (e.g., the travel vector and parameters) of AV accordingly.

The AV computing system may be is connected to or include a positioning system. The positioning system may determine a position (e.g., a current position, a past position, etc.) of AV, and typically includes a geographic positioning system (GPS) and/or inertial guidance system. The positioning system may determine a position of AV based on an inertial sensor, a satellite positioning system, triangulation based on network components (e.g., network access points, cellular towers, Wi-Fi access points, etc.), and/or proximity to network components, and/or the like.

The AV computing system may receive sensor data from one or more sensors that are coupled to or otherwise included in AV. For example, one or more sensors may include a Light Detection and Ranging (LIDAR) system, a Radio Detection and Ranging (RADAR) system, one or more cameras (e.g., visible spectrum cameras, infrared cameras, etc.), and/or the like. The sensor data may include data that describes a location of objects within the surrounding environment of the AV. One or more sensors may collect sensor data that includes data that describes a location (e.g., in three-dimensional space relative to the AV) of points that correspond to objects within the surrounding environment of AV.

The sensor data may include a location (e.g., a location in three-dimensional space relative to the LIDAR system) of a number of points (e.g., a point cloud) that correspond to objects that have reflected a ranging laser. The LIDAR system may measure distances by measuring a Time of Flight (TOF) that a short laser pulse takes to travel from a sensor of the LIDAR system to an object and back, and the LIDAR system calculates the distance of the object to the LIDAR system based on the known speed of light. Map data may include LIDAR point cloud maps associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

The sensor data may include a location (e.g., a location in three-dimensional space relative to the RADAR system) of a number of points that correspond to objects that have reflected a ranging radio wave. Radio waves (e.g., pulsed radio waves or continuous radio waves) transmitted by the RADAR system can reflect off an object and return to a receiver of the RADAR system. The RADAR system can then determine information about the object's location and/or speed. The RADAR system may provide information about the location and/or the speed of an object relative to the RADAR system based on the radio waves. Multipath exploitation RADAR may be used to detect non-line of sight features.

Image processing techniques (e.g., range imaging techniques, such as, for example, structure from motion, structured light, stereo triangulation, etc.) can be performed by the system to identify a location (e.g., in three-dimensional space relative to the one or more cameras) of a number of points that correspond to objects that are depicted in images captured by one or more cameras. Other sensors can identify the location of points that correspond to objects as well. Sensor fusion may be used to merge related data, such as from a time-of-flight (TOF) sensor to provide additional data and analysis.

The map database may provide detailed information associated with the map, features of the roadway in the geographic location, and information about the surrounding environment of the AV for the AV to use while driving (e.g., traversing a route, planning a route, determining a motion plan, controlling the AV, etc.).

The vehicle computing system may receive a vehicle pose from localization system based on one or more sensors that are coupled to or otherwise included in AV. The localization system may include a LIDAR localizer, a low-quality pose localizer, and/or a pose filter. For example, the localization system may employ a pose filter that receives and/or determines one or more valid pose estimates (e.g., not based on invalid position data, etc.) from the LIDAR localizer and/or a low-quality pose localizer, for determining a map-relative vehicle pose. For example, the low-quality pose localizer determines a low quality pose estimate in response to receiving position data from positioning system for operating (e.g., routing, navigating, controlling, etc.) the AV under manual control (e.g., in a coverage lane). The LIDAR localizer may determine a LIDAR pose estimate in response to receiving sensor data (e.g., LIDAR data, RADAR data, etc.) from sensors for operating (e.g., routing, navigating, controlling, etc.) the AV under autonomous control (e.g., in a coverage lane).

A vehicle command system may include a navigation system, and a lane association system that cooperate to route and/or navigate the AV in a geographic location. The vehicle command system may track a current objective of the AV, including a current service, a target pose, and/or a coverage plan (e.g., development testing, etc.). The navigation system may determine and/or provide a route plan (e.g., a task plan) for the AV based on the current state of the AV, map data (e.g., lane graph, etc.), and one or more vehicle commands (e.g., a target pose). For example, navigation system may determine a route plan (e.g., plan, re-plan, deviation, etc.) including one or more lanes (e.g., current lane, future lane, etc.) in one or more roadways the AV may traverse on a route to a destination (e.g., target, trip drop-off, etc.).

The navigation system may determine a route plan based on one or more lanes received from lane association system. The lane association system may determine one or more lanes of a route in response to receiving a vehicle pose from the localization system. For example, the lane association system determines, based on the vehicle pose, that the AV is on a coverage lane, and in response to determining that the AV is on the coverage lane, determines one or more candidate lanes (e.g., routable lanes) within a distance of the vehicle pose associated with the AV. For example, the lane association system determines, based on the vehicle pose, that the AV is on an AV lane, and in response to determining that the AV is on the AV lane, determines one or more candidate lanes (e.g., routable lanes) within a distance of the vehicle pose associated with the AV. The navigation system generates a cost function for each of one or more candidate lanes the AV may traverse on a route to a destination. For example, navigation system generates the cost function that describes a cost (e.g., a cost over a time period) of following (e.g., adhering to) one or more lanes to reach a target pose.

The perception system may detect and/or track objects (e.g., vehicles, pedestrians, bicycles, and/or the like) that are proximate to (e.g., in proximity to the surrounding environment of) the AV over a time period. The perception system can retrieve (e.g., obtain) map data from map database that provides detailed information about the surrounding environment of the AV. For example, the perception system may determine differences between the map data and a current sensor stream, and thereby infer mobile or dynamically changing elements and static elements. This, in turn, permits a risk assessment with respect to change of position or orientation of objects and their potential interaction with the AV during travel.

The perception system may determine one or more objects that are proximate to AV based on sensor data received from one or more sensors and/or map data from the map database. For example, the perception system determines, for the one or more objects that are proximate, state data associated with a state of such object. The state data associated with an object includes data associated with a location of the object (e.g., a position, a current position, an estimated position, etc.), data associated with a speed of the object (e.g., a magnitude of velocity of the object), data associated with a direction of travel of the object (e.g., a heading, a current heading, etc.), data associated with an acceleration rate of the object (e.g., an estimated acceleration rate of the object, etc.), data associated with an orientation of the object (e.g., a current orientation, etc.), data associated with a size of the object (e.g., a size of the object as represented by a bounding shape such as a bounding polygon or polyhedron, a footprint of the object, etc.), data associated with a type of the object (e.g., a class of the object, an object with a type of vehicle, an object with a type of pedestrian, an object with a type of bicycle, etc.), and/or the like.

The perception system may determine state data for an object over a number of iterations of determining state data. For example, perception system may update the state data for each object of a plurality of objects during each iteration.

The prediction system may receive the state data associated with one or more objects from perception system. The prediction system may predict one or more future locations for the one or more objects based on the state data. For example, the prediction system may predict the future location of each object of a plurality of objects within a time period (e.g., 0.5 second, 1 second, 2, seconds, 3 seconds, 4 seconds, 5 seconds, 10 seconds, 20 seconds, etc.). The prediction system may predict that an object will adhere to the object's direction of travel according to the speed of the object. The prediction system may use machine learning techniques or modeling techniques to make a prediction based on state data associated with an object.

The motion planning system may determine a motion plan for AV based on a prediction of a location associated with an object provided by the prediction system and/or based on state data associated with the object provided by the perception system. For example, the motion planning system may determine a motion plan (e.g., an optimized motion plan) for the AV that causes AV to travel relative to the object based on the prediction of the location for the object provided by the prediction system and/or the state data associated with the object provided by the perception system.

The motion planning system may receive a route plan as a command from the navigation system. The motion planning system may determine a cost function for each of one or more motion plans of a route for AV based on the locations and/or predicted locations of one or more objects. The cost function includes such parameters as time, objective, energy cost, safety risk, event cost, vehicle operation cost (e.g., tires, brakes, fuel/electricity), etc.

For example, the motion planning system determines the cost function that describes a cost (e.g., a cost over a time period) of following (e.g., adhering to) a motion plan (e.g., a selected motion plan, an optimized motion plan, etc.) as well as a predicted risk and associated costs of the predicted risks. The cost associated with the cost function increases and/or decreases based on elements of a motion plan (e.g., a selected motion plan, an optimized motion plan, a preferred motion plan, etc.).

For example, while a non-risk adjusted cost function increases and/or decreases based on the AV deviating from the motion plan to avoid a collision with an object, a risk adjusted cost function would generally decreased as a result of properly executed collision avoidance maneuvers. More generally, the risks are less discrete. Any time an AV changes lanes, there is a potential risk, though in some cases, the risk of changing lanes is lower than the risk or cost-compensated risk of remaining in the same lane. That is, the collision or adverse event is a low probability, but not zero, and the risk probability is generally included in the motion plan to mitigate unnecessary risks that do not substantially improve task efficiency. However, where task efficiency value of an action is substantial, and exceeds the risk-adjusted cost of the action, then the system should take the action.

The motion planning system may determine a cost of following a motion plan. For example, motion planning system determines a motion plan for AV based on one or more cost functions. The motion planning system determines a motion plan (e.g., a selected motion plan, an optimized motion plan, a preferred motion plan, etc.) that minimizes a risk-adjusted cost function. The motion planning system may provide a motion plan to vehicle controls (e.g., a device that controls acceleration, a device that controls steering, a device that controls braking, an actuator that controls gas flow, etc.) to implement the motion plan. Alternately, the motion planner may be integrated into the motion controller, and the plan need not be a separate and discrete communication.

Each main process within the system may be associated with its physical processor, instructions, memory, data communication interface, etc., or multiple functions may be combined in a single hardware platform. Typically, in order to guaranty deterministic performance, assist in achieving fault tolerance, provide opportunity for diagnostics, repair, and upgrades, separate hardware is provided for specific tasks, and the communications between the modules is discrete.

In a typical module, a bus permits communication among the components. The processor is implemented in hardware, firmware, or a combination of hardware and software. For example, processor includes one or more processing elements (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. A memory may include random access memory (RAM), read only memory (ROM), and/or another type of dynamic or static storage device (e.g., flash memory, magnetic memory, optical memory, etc.) that stores information and/or instructions for use by the processor.

A storage component stores information and/or software related to the operation and use of device. For example, the storage component includes a solid state mass storage device such as a NVMe®, PCIe 3.0 or PCIe 4.0 storage device.

An input component may include a component that permits the device to receive information, such as via user input (e.g., a touch screen display, a keyboard, a keypad, a mouse, a button, a switch, a microphone, etc.). Additionally, or alternatively, the input component includes a sensor for sensing information (e.g., a global positioning system (GPS) component, an accelerometer, a gyroscope, an actuator, etc.).

An output component may include a component that provides output information from the device (e.g., a display, a speaker, one or more light-emitting diodes (LEDs), etc.).

A communication interface may include a transceiver-like component (e.g., a transceiver, a separate receiver and transmitter, etc.) that enables the device to communicate with other devices, such as via a wired connection, a wireless connection, or a combination of wired and wireless connections. The communication interface can permit the device to receive information from another device and/or provide information to another device. For example, the communication interface may include an Ethernet interface, an optical interface, a coaxial interface, an infrared interface, a radio frequency (RF) interface, a universal serial bus (USB) interface, a Wi-Fi interface, a cellular network interface, and/or the like.

The device can perform one or more processes described herein, e.g., by executing software instructions stored by a computer-readable medium, such as a memory and/or the storage component. A computer-readable medium (e.g., a non-transitory computer-readable medium) is defined herein as a non-transitory memory device. A memory device includes memory space located inside of a single physical storage device or memory space spread across multiple physical storage devices. Software instructions can be read into the memory and/or storage component from another computer-readable medium or from another device via communication interface. When executed, software instructions stored in the memory and/or storage component cause the processor to perform one or more processes described herein. Additionally, or alternatively, hardwired circuitry can be used in place of or in combination with software instructions to perform one or more processes described herein. Thus, embodiments described herein are not limited to any specific combination of hardware circuitry and software.

The roadway may be associated with map data (e.g., map data, AV map data, coverage map data, hybrid map data, submap data, route data, etc.) that defines one or more attributes of (e.g., metadata associated with) the roadway (e.g., attributes of a roadway in a geographic location, attributes of a segment of a roadway, attributes of a lane of a roadway, attributes of an edge of a roadway, etc.). An attribute of a roadway may include a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

The lane (and/or a roadway segment or extent) may have one or more ends. For example, an end of a lane (and/or a roadway segment or extent) is associated with or corresponds to a geographic location at which map data associated with the lane (and/or the roadway segment or extent) ends (e.g., is unavailable). As an example, an end of a lane can correspond to a geographic location at which map data for that lane ends.

The map data may include a link (e.g., a connection) that connects or links a lane (and/or a roadway segment or extent) to another lane (and/or to another roadway segment or extent). As an example, the map data includes a unique identifier for each lane (and/or roadway segment or extent), and the unique identifiers are associated with one another in the map data to indicate a connection or link of a lane to another lane (or a connection or link of a roadway segment or extent to another roadway segment or extent). For example, the unique identifiers can be associated with one another in the map data to indicate that a lane (and/or a roadway segment or extent) is a predecessor lane or a successor lane to another lane (and/or a predecessor or successor roadway segment or extent to another roadway segment or extent). As an example, a heading of travel (e.g., direction) of a predecessor lane to another lane is from the predecessor lane to another lane, and a heading of travel of a successor lane to another lane is from another lane to the successor lane.

The process includes determination of a driving path including one or more trajectories. The map generation system may determine a driving path including one or more trajectories for an AV in a roadway based on one or more traversals of the roadway by one or more vehicles. For example, the map generation system may determine a driving path in the roadway to represent an indication of a centerline path in at least one lane of the roadway for controlling the AV during operation (e.g., follow) on the driving path. As an example, map generation system may determine the centerline path based on the lane markings on the road and/or based on one or more traversals of the roadway by one or more vehicles and/or a determination of where a vehicle will drive in a lane of the roadway. The map generation system may determine a driving path that includes feature information based on features of the roadway (e.g., section of curb, marker, object, etc.) for controlling an AV to autonomously determine objects in the roadway. For example, the map generation system determines a driving path that includes the left and right edges of a lane in the roadway; in this way, the map generation system determines a driving path to control the AV in a roadway that includes a position of features (e.g., a portion of the feature, a section of the feature) in the roadway, while road edges and control measures may remain unchanged. As an example, the map generation system determines a driving path including feature information associated with lateral regions, for example, by determining the features of the roadway in the lateral regions. The map generation system may determine an entry point and end point of the driving path that is associated with entry information and/or end (e.g., exit) information for traversing the driving path, the entry and/or end information comprising at least one of heading information, curvature information, and acceleration information of the driving path.

The map generation system may determine a driving path in a lane in the geographic location that includes a first trajectory (e.g., a spline, a polyline, etc.); as an example, the map generation system may determine a single trajectory for a driving path in the roadway and/or a plurality of trajectories (e.g., a spline, a polyline, etc.) for a driving path in the roadway. As an example, the map generation system determines at least one trajectory of a driving path based on features in the roadway and/or traversals of the roadway by one or more vehicles (e.g., straightaways where paint lines are present, straight through intersections, straightaways where paint lines are not present, placement informed by average vehicle paths data, etc.) and/or the like. The map generation system may determine a trajectory for a driving path based on information obtained from a vehicle (e.g., autonomous vehicles, non-autonomous vehicles, etc.) representing a path in the roadway. For example, the map generation system may obtain information for determining a driving path based on one or more trajectories of the roadway associated with one or more traversals of the roadway by one or more vehicles (e.g., autonomous vehicles, non-autonomous vehicles, etc.), a number of traversals of the roadway by one or more vehicles, a position of the vehicle associated with one or more traversals, interventions associated with one or more traversals of the roadway by one or more vehicles, a number of objects (e.g., a number of hazards, a number of bicycles, a railway track in proximity to the roadway, etc.) associated with one or more traversals of the roadway by one or more vehicles, a distance and/or position (e.g., a vehicle pose, an average distance to a vehicle pose, a mileage, etc.) associated with one or more traversals of the roadway by one or more vehicles (e.g., a distance until a detection of an event, a distance until detection of a potentially harmful or a harmful event to an AV, to a rider of the AV, to a pedestrian, a distance between a first detection of an event and a second detection of an event, miles per event, etc.), one or more traffic controls of the roadway associated with one or more traversals of the roadway by one or more AVs, one or more aspects of the roadway (e.g., a dimension of one or more lanes of the roadway, a width of one or more lanes of the roadway, a number of bicycle lanes of the roadway, etc.) associated with one or more traversals of the roadway by one or more AVs, a speed of one or more AVs associated with one or more traversals of the roadway by the one or more AVs, and/or the like.

The map generation system may determines a single trajectory for at least one lane in the roadway and/or a driving path based on information including LIDAR point cloud maps (e.g., map point data, etc.) associated with a geographic location (e.g., a location in three-dimensional space relative to the LIDAR system of a mapping vehicle) of a number of points (e.g., a point cloud) that correspond to objects that have reflected a ranging laser of one or more mapping vehicles at the geographic location. As an example, a map can include a LIDAR point cloud layer that represents objects and distances between objects in the geographic location of the map.

The map generation system may include a driving path that includes a primary path in the driving path, the primary path including a first trajectory of the driving path. For example, map generation system may determine a primary path in the driving path by identifying that the primary path satisfies a threshold indicating a driving path for controlling the AV in an autonomous mode. For example, the primary path may be based on information indicating a path for an AV to autonomously follow. The map generation system may determine a secondary path in the driving path. For example, the map generation system may determine a secondary path identifying a trajectory in the driving path that may not satisfy a threshold indicating a driving path for controlling the AV to traverse the path autonomously (lanes where a driving path does not need to be clearly defined, turning lanes in intersections, defined turns in intersections, diverging/converging lanes, etc.).

For example, the map generation system may determine a secondary driving path that AV cannot operate on (e.g., drive) under the fully-autonomous mode. For example, map generation system may determine the secondary path in the driving path as an estimate of where an AV may drive. The proposal of a primary path or secondary path may be dependent on a safety factor, and therefore the safety determination is not limited to autonomous modes only, and rather may also predict manual or semi-automated safety parameters.

The map generation system may determine a driving path linking a first and a second driving path (e.g., a primary path to a primary path, a primary path to a secondary path, a secondary path to a primary path, etc.). For example, the first trajectory and second trajectory in the primary path each include an end point that is linked (e.g., logically connected) by the map generation system. The map generation system may determine a link for the first trajectory based on attributes of the point (e.g., an entry point of the trajectory, an end point of the trajectory), for example a position of a point, a heading of the trajectory at a point, an acceleration at a point (e.g., an entry point of the trajectory, an end point of the trajectory), and/or a curvature at a point (e.g., an entry point of the trajectory, an end point of the trajectory), and/or the like. For example, map generation system may determine a driving path that includes a first trajectory in a primary path linked to a second trajectory in a primary path, as a predecessor driving path (e.g., trajectory) to a successor driving path (e.g., trajectory), the link having continuity to generate the logical connection between the primary and secondary lane, in this way, providing continuity for one or more of a position of the endpoint, a heading of the trajectory at the end point, an acceleration at the end point, and a curvature at the end point. The map generation system may determine a link (e.g., logical connection) including continuity of a heading and/or a curvature associated with an entry point of the secondary path in the driving path for the heading and curvature associated with an end point of the primary path. In another example, the map generation system may determine a link (e.g., logical connection) that includes continuity of a heading and/or a curvature associated with an entry point of the primary path in the driving path to the heading and curvature associated with an end point of the secondary path. The map generation system may determine a primary driving path to include not more than one predecessor primary driving path linked to one successor primary driving path. The map generation system may determine continuity to provide a transition between a first driving path and a second driving path. The map generation system may determine a link between a first point and a second point, based on one or more attributes, for example, to provide logical connections to enhance the transition (e.g., smooth) across the link.

See, US 20200401145. See also, U.S. Pat. Nos. 4,296,901; 4,833,469; 4,940,925; 5,281,901; 5,341,130; 5,375,059; 5,390,125; 5,402,355; 5,438,517; 5,548,516; 5,610,815; 5,612,883; 5,629,855; 5,640,323; 5,646,843; 5,650,703; 5,657,226; 5,680,306; 5,684,696; 5,747,683; 5,838,562; 5,938,710; 5,995,882; 6,069,420; 6,122,572; 6,151,539; 6,269,763; 6,351,697; 6,393,362; 6,442,456; 6,799,100; 6,804,607; 7,047,888; 7,302,316; 7,335,067; 7,343,232; 7,494,090; 7,496,226; 7,542,828; 7,591,630; 7,693,624; 7,737,878; 7,844,396; 7,911,400; 7,949,541; 7,979,172; 7,979,173; 7,991,505; 8,060,271; 8,068,949; 8,103,398; 8,109,223; 8,126,642; 8,255,092; 8,280,623; 8,301,326; 8,355,834; 8,364,334; 8,412,449; 8,437,875; 8,437,890; 8,442,713; 8,577,538; 8,583,313; 8,606,589; 8,612,084; 8,706,394; 8,744,648; 8,751,143; 8,755,997; 8,755,999; 8,768,555; 8,784,034; 8,798,828; 8,843,244; 8,880,287; 8,935,071; 8,947,531; 8,948,955; 8,954,194; 8,988,524; 9,097,800; 9,120,484; 9,120,485; 9,139,363; 9,140,814; 9,199,667; 9,201,421; 9,201,424; 9,202,382; 9,208,456; 9,223,025; 9,234,618; 9,261,590; 9,265,187; 9,288,938; 9,298,186; 9,327,734; 9,349,055; 9,373,149; 9,373,262; 9,383,752; 9,383,753; 9,384,666; 9,392,743; 9,423,498; 9,432,929; 9,434,309; 9,435,652; 9,451,020; 9,494,439; 9,494,940; 9,494,943; 9,507,346; 9,508,260; 9,510,316; 9,513,632; 9,517,767; 9,523,984; 9,523,986; 9,535,423; 9,536,427; 9,545,995; 9,547,309; 9,547,986; 9,547,989; 9,557,736; 9,559,804; 9,561,941; 9,563,199; 9,581,460; 9,598,239; 9,599,989; 9,603,158; 9,606,539; 9,612,123; 9,630,619; 9,632,502; 9,645,578; 9,669,904; 9,672,446; 9,674,759; 9,679,191; 9,679,206; 9,688,396; 9,693,297; 9,702,098; 9,702,443; 9,707,966; 9,710,710; 9,718,471; 9,720,412; 9,720,415; 9,721,397; 9,733,378; 9,734,455; 9,739,881; 9,740,205; 9,746,444; 9,754,490; 9,760,092; 9,761,136; 9,766,333; 9,783,075; 9,783,262; 9,788,282; 9,798,329; 9,802,661; 9,802,759; 9,804,594; 9,804,599; 9,804,601; 9,805,605; 9,821,801; 9,821,807; 9,833,901; 9,834,224; 9,836,973; 9,857,795; 9,857,798; 9,862,391; 9,864,378; 9,868,332; 9,874,871; 9,878,664; 9,884,630; 9,891,333; 9,896,100; 9,898,005; 9,902,396; 9,904,286; 9,910,434; 9,910,441; 9,911,030; 9,913,240; 9,915,950; 9,916,538; 9,916,703; 9,921,065; 9,933,779; 9,939,817; 9,940,651; 9,944,291; 9,946,531; 9,946,890; 9,947,224; 9,948,917; 9,949,228; 9,950,568; 9,955,436; 9,958,379; 9,958,864; 9,958,875; 9,959,754; 9,963,143; 9,964,952; 9,964,954; 9,967,815; 9,969,285; 9,969,326; 9,969,481; 9,977,430; 9,981,669; 9,983,305; 9,988,055; 9,989,645; 10000124; 10000338; 10007264; 10007271; 10012981; 10012990; 10019002; 10019008; 10019011; 10030418; 10031521; 10031526; 10037553; 10040632; 10048683; 10049328; 10053091; 10054945; 10055653; 10061313; 10061325; 10065638; 10065654; 10073456; 10073462; 10074223; 10083604; 10086782; 10089116; 10095236; 10096067; 10109195; 10118577; 10118639; 10122736; 10123473; 10126136; 10126742; 10126749; 10127465; 10127818; 10133275; 10134278; 10137896; 10137903; 10139237; 10139818; 10139823; 10139828; 10140468; 10143040; 10152891; 10156845; 10156848; 10156849; 10156850; 10157423; 10160378; 10160457; 10160484; 10162354; 10163139; 10166994; 10168703; 10171967; 10173679; 10179700; 10187751; 10188024; 10191493; 10197407; 10198619; 10202117; 10203697; 10205457; 10209715; 10214240; 10216196; 10220705; 10220857; 10222211; 10222462; 10222798; 10223479; 10223916; 10225348; 10227075; 10228690; 10229590; 10233021; 10234863; 10235881; 10241509; 10241516; 10243604; 10245993; 10246097; 10248119; 10248120; 10248124; 10249109; 10253468; 10254763; 10256890; 10259514; 10260898; 10261514; 10262217; 10266180; 10267634; 10267635; 10268200; 10272778; 10272924; 10284777; 10288439; 10289110; 10293932; 10295363; 10296003; 10296004; 10298910; 10303171; 10303174; 10303182; 10303183; 10303959; 10308430; 10309777; 10309778; 10309792; 10310499; 10310500; 10310514; 10310515; 10310517; 10311731; 10317231; 10317899; 10317911; 10317912; 10317913; 10319224; 10324463; 10327160; 10331127; 10331133; 10331136; 10331138; 10331141; 10332320; 10334050; 10336321; 10338594; 10342067; 10343559; 10343685; 10343698; 10345808; 10345809; 10345810; 10349011; 10351261; 10353390; 10353393; 10353694; 10353931; 10354157; 10358147; 10359783; 10360021; 10364027; 10365654; 10365657; 10369974; 10372129; 10372130; 10372141; 10373097; 10379538; 10380890; 10386192; 10386856; 10388155; 10388162; 10392025; 10394245; 10395285; 10395332; 10397019; 10399458; 10401852; 10401867; 10405215; 10407076; 10409279; 10410250; 10410747; 10416670; 10416671; 10416677; 10421460; 10421463; 10423162; 10429194; 10429849; 10430653; 10431018; 10433243; 10433015; 10435242; 10436595; 10436885; 10437247; 10437256; 10438493; 10440547; 10444759; 10446031; 10446037; 10449957; 10451514; 10452065; 10452070; 10459441; 10459444; 10466712; 10467581; 10467915; 10469282; 10469753; 10471976; 10473780; 10474149; 10474157; 10474159; 10474160; 10474161; 10474164; 10474916; 10477449; 10489529; 10489686; 10490068; 10493622; 10493936; 10496098; 10496099; 10496766; 10498600; 10501014; 10503165; 10503172; 10504306; 10506509; 10507787; 10508986; 10509947; 10513161; 10514690; 10514692; 10514700; 10514709; 10518770; 10520319; 10527417; 10527450; 10527720; 10527734; 10528048; 10528059; 10528836; 10529027; 10531004; 10532885; 10534364; 10536497; 10543838; 10543844; 10545024; 10545029; 10545507; 10546560; 10549752; 10554527; 10554901; 10558222; 10558864; 10562538; 10563993; 10564643; 10567650; 10569651; 10569663; 10569773; 10571916; 10571922; 10572514; 10572717; 10573178; 10576966; 10576991; 10579054; 10579065; 10579070; 10584971; 10586458; 10591608; 10591910; 10591912; 10593042; 10595175; 10598489; 10599141; 10599546; 10606270; 10606274; 10606278; 10606786; 10607293; 10611384; 10611389; 10613489; 10613547; 10613550; 10618519; 10621860; 10627810; 10627830; 10629080; 10635108; 10635109; 10636297; 10642275; 10645848; 10647250; 10647333; 10649453; 10649458; 10649462; 10649469; 10654476; 10656657; 10659975; 10664918; 10668925; 10670411; 10670416; 10671075; 10671076; 10671077; 10671082; 10671961; 10674332; 10678234; 10678253; 10679497; 10683012; 10685244; 10685403; 10691126; 10691127; 10691130; 10691138; 10692371; 10698407; 10698409; 10698414; 10699579; 10705220; 10705525; 10705534; 10705536; 10705539; 10708823; 10710592; 10710633; 10712745; 10712746; 10712750; 10719886; 10720059; 10725469; 10726379; 10726498; 10726499; 10730365; 10730531; 10732639; 10732645; 10733673; 10733761; 10735518; 10739768; 10739774; 10739775; 10739776; 10739780; 10740850; 10740988; 10743159; 10745003; 10745011; 10747234; 10747597; 10748218; 10753754; 10753758; 10754341; 10754348; 10755581; 10756909; 10761542; 10762396; 10768620; 10768621; 10768626; 10769947; 10773597; 10775184; 10775488; 10775790; 10775792; 10775801; 10780880; 10782687; 10782693; 10782694; 10782699; 10782703; 10788839; 10788841; 10795360; 10795367; 10795375; 10796174; 10796204; 10796402; 10796562;

10800606; 10801845; 10802477; 10803325; 10807599; 10809081; 10809722; 10809726; 10809736; 10810872; 10812996; 10813074; 10814882; 10816346; 10816984; 10816995; 10818035; 10818105; 10818187; 10821971; 10823575; 10824144; 10824145; 10824153; 10824170; 10824415; 10828999; 10829063; 10829149; 10831188; 10831191; 10831196; 10831202; 10831204; 10831210; 10831212; 10832066; 10832502; 10836395; 10836405; 10837788; 10838426; 10839234; 10839340; 10839426; 10839473; 10841496; 10843722; 10845816; 10845820; 10852721; 10855922; 10857896; 10857994; 10859395; 10860022; 10860036; 10864920; 10866108; 10867188; 10870368; 10870437; 10872476; 10882535; 10883843; 10884422; 10885727; 10886023; 10887431; 10890912; 10891138; 10891694; 10897575; 10906558; 10908613; 10909377; 10915106; 10915116; 10915965; 10916077; 10916142; 10921135; 10921811; 10921812; 10921825; 10922556; 10928207; 10928523; 10928820; 10928829; 10932156; 20010021888; 20020143461; 20040035315; 20080027591; 20080027599; 20080059015; 20080093498; 20080161986; 20080161987; 20090306881; 20100030473; 20100076631; 20100106344; 20100106356; 20100114416; 20110153136; 20110153338; 20110288714; 20110295423; 20110295424; 20120044043; 20120046818; 20120046927; 20120046983; 20120053703; 20120053775; 20120083947; 20120095651; 20120101680; 20120166019; 20120283906; 20120316725; 20130274986; 20130321627; 20140032017; 20140067188; 20140136414; 20140195095; 20140201126; 20140214259; 20140253722; 20150081156; 20150092178; 20150153175; 20150154557; 20150177736; 20150229906; 20150298786; 20150350914; 20160011318; 20160021178; 20160036558; 20160231746; 20160236617; 20160273922; 20160280238; 20160313739; 20160320773; 20160334229; 20160334230; 20160334797; 20160339587; 20160375976; 20170003681; 20170015405; 20170017236; 20170060129; 20170083957; 20170090480; 20170120814; 20170120902; 20170123419; 20170123421; 20170123422; 20170123428; 20170123429; 20170124476; 20170124781; 20170126810; 20170132334; 20170132934; 20170136842; 20170139411; 20170160742; 20170164423; 20170166215; 20170227965; 20170235316; 20170248963; 20170248964; 20170277186; 20170284819; 20170285642; 20170294130; 20170315229; 20170316333; 20170323179; 20170329346; 20170341261; 20170351261; 20170353943; 20170371355; 20180009445; 20180011494; 20180017968; 20180023960; 20180024553; 20180024562; 20180024565; 20180024568; 20180032082; 20180033310; 20180039287; 20180045832; 20180047292; 20180050704; 20180059672; 20180061242; 20180086344; 20180086351; 20180088576; 20180088582; 20180088590; 20180093671; 20180095467; 20180107942; 20180111612; 20180114258; 20180114259; 20180127000; 20180127001; 20180129215; 20180136643; 20180136644; 20180136651; 20180141564; 20180143622; 20180143632; 20180143639; 20180143644; 20180143647; 20180143649; 20180150086; 20180154829; 20180162186; 20180162412; 20180164822; 20180164827; 20180170392; 20180170395; 20180172821; 20180173240; 20180178791; 20180183873; 20180186378; 20180186403; 20180188026; 20180188027; 20180188037; 20180188039; 20180188040; 20180188041; 20180188042; 20180188043; 20180188044; 20180188059; 20180188060; 20180188727; 20180188734; 20180188742; 20180188743; 20180189323; 20180189578; 20180189717; 20180190046; 20180196433; 20180196439; 20180196440; 20180201182; 20180203443; 20180203450; 20180204111; 20180204141; 20180208215; 20180211534; 20180216942; 20180217614; 20180224869; 20180225968; 20180233047; 20180238698; 20180247160; 20180253647; 20180257660; 20180259956; 20180259958; 20180267537; 20180275678; 20180282955; 20180284774; 20180292222; 20180292825; 20180292831; 20180297606; 20180300964; 20180304889; 20180304900; 20180307229; 20180307239; 20180307240; 20180307245; 20180312238; 20180314266; 20180321685; 20180322546; 20180327091; 20180329411; 20180330173; 20180334166; 20180335781; 20180336421; 20180341274; 20180342157; 20180348775; 20180349713; 20180349802; 20180356821; 20180356823; 20180364657; 20180364700; 20180364701; 20180364702; 20180364703; 20180364704; 20180365908; 20180370540; 20180373245; 20180373268; 20180374359; 20180375939; 20180376357; 20190004510; 20190004516; 20190004522; 20190004524; 20190004533; 20190004534; 20190004535; 20190018411; 20190018412; 20190025843; 20190035275; 20190039609; 20190049342; 20190049946; 20190050729; 20190056737; 20190056742; 20190061765; 20190066409; 20190066506; 20190068434; 20190071091; 20190071092; 20190071093; 20190072965; 20190072966; 20190072973; 20190072979; 20190078896; 20190079524; 20190080602; 20190084571; 20190086924; 20190094868; 20190105968; 20190107840; 20190113351; 20190120640; 20190120946; 20190120947; 20190120948; 20190122037; 20190122386; 20190129831; 20190130878; 20190134821; 20190137991; 20190138008; 20190146508; 20190146509; 20190147253; 20190147254; 20190147255; 20190156134; 20190156150; 20190156679; 20190161080; 20190163191; 20190168769; 20190171912; 20190174276; 20190176684; 20190179311; 20190179979; 20190185018; 20190186939; 20190187715; 20190187723; 20190195998; 20190196471; 20190202561; 20190204092; 20190204425; 20190204427; 20190204842; 20190204843; 20190212161; 20190212744; 20190212754; 20190220011; 20190220015; 20190220016; 20190227550; 20190227553; 20190235488; 20190235499; 20190235532; 20190243370; 20190248487; 20190250000; 20190250609; 20190250636; 20190250640; 20190258246; 20190258251; 20190265703; 20190266179; 20190266420; 20190270408; 20190271549; 20190277632; 20190278277; 20190278284; 20190278290; 20190286143; 20190286155; 20190291728; 20190295421; 20190302768; 20190310627; 20190310636; 20190310650; 20190310654; 20190315232; 20190315357; 20190317455; 20190317507; 20190317508; 20190317512; 20190317513; 20190317515; 20190317520; 20190318550; 20190324456; 20190324463; 20190325223; 20190325546; 20190329903; 20190332123; 20190332875; 20190333120; 20190346851; 20190349794; 20190359202; 20190361432; 20190361444; 20190367019; 20190367020; 20190367021; 20190367022; 20190368882; 20190369616; 20190369626; 20190371174; 20190377345; 20190377349; 20190377351; 20190378423; 20190382007; 20190382031; 20190383945; 20190384301; 20190384304; 20190385450; 20190387060; 20190391585; 20200001862; 20200001863; 20200003564; 20200004241; 20200004261; 20200013225; 20200014759; 20200019165; 20200019175; 20200019801; 20200021728; 20200023838; 20200026276; 20200026283; 20200026285; 20200026294; 20200027354; 20200031340; 20200033147; 20200033872; 20200041296; 20200042007; 20200043326; 20200050195; 20200050199; 20200051346; 20200055362; 20200064483; 20200064842; 20200064851; 20200064859; 20200064861; 20200073385; 20200074024; 20200082180; 20200089243; 20200089245; 20200101974; 20200108785; 20200111169; 20200116497; 20200116867; 20200117207; 20200120253; 20200122721; 20200122830; 20200124719; 20200125094; 20200125102; 20200130864; 20200133270; 20200134525; 20200137928; 20200139973; 20200142405; 20200142428; 20200145569; 20200149231; 20200149906; 20200150682; 20200159216; 20200159225; 20200160067; 20200172115; 20200172116; 20200174472;

20200174486; 20200175691; 20200175695; 20200180740; 20200182639; 20200182640; 20200183395; 20200191601; 20200192372; 20200192373; 20200192374; 20200192375; 20200192376; 20200192377; 20200192378; 20200192379; 20200192380; 20200192381; 20200192402; 20200193606; 20200201329; 20200201350; 20200207360; 20200207369; 20200207371; 20200207375; 20200209853; 20200209857; 20200209872; 20200225032; 20200225673; 20200231106; 20200231142; 20200233415; 20200233418; 20200233420; 20200233429; 20200240799; 20200240805; 20200241546; 20200249677; 20200250067; 20200250981; 20200262263; 20200265249; 20200272148; 20200282907; 20200282987; 20200284581; 20200285240; 20200285658; 20200290647; 20200298863; 20200301435; 20200310417; 20200310442; 20200327234; 20200331480; 20200333470; 20200333785; 20200341469; 20200341487; 20200341490; 20200342693; 20200346637; 20200348668; 20200348676; 20200348684; 20200349848; 20200356090; 20200356100; 20200356849; 20200363813; 20200371533; 20200379457; 20200379462; 20200379474; 20200383580; 20200387155; 20200388154; 20200393261; 20200393837; 20200394474; 20200402323; 20200406893; 20200408921; 20200409351; 20200409377; 20200409386; 20200410252; 20200410255; 20200410703; 20210004012; 20210009163; 20210009166; 20210018716; 20210018917; 20210018918; 20210024100; 20210024144; 20210026348; 20210026355; 20210031760; 20210031801; 20210033410; 20210034068; 20210034412; 20210035442; 20210035450; 20210039669; 20210039682; 20210039779; 20210041882; 20210042575; 20210046861; 20210046946; 20210048304; 20210048991; 20210049243; 20210049415; 20210049903; and 20210053407.

It is an object to provide a method of operating a vehicle, comprising: planning motion of the vehicle, comprising computing motion trajectories of an action to incrementally advance the vehicle toward a goal with an associated incremental utility, based on at least a safety with respect to an environment of operation of the computed motion trajectories; and planning the task for the vehicle, comprising defining the goal and a sequence of the actions to advance the vehicle toward the goal, selectively dependent an optimization of an aggregate prospective utility of the task and the safety of the motion trajectories to advance the vehicle toward the goal.

It is also an object to provide a non-transitory computer readable medium containing a program for operating a vehicle, comprising: instructions for planning motion of the vehicle, comprising computing motion trajectories of an action to incrementally advance the vehicle toward a goal with an associated incremental utility, based on at least a safety with respect to an environment of operation of the computed motion trajectories; and instructions for planning the task for the vehicle, comprising defining the goal and a sequence of the actions to advance the vehicle toward the goal, selectively dependent an optimization of an aggregate prospective utility of the task and the safety of the motion trajectories to advance the vehicle toward the goal.

It is another object to provide a system for operating a vehicle, comprising: a sensor configured to receive information about an environment of operation of the vehicle; at least one automated processor; a motion planner configured to plan a motion of the vehicle, configured to compute motion trajectories with the at least one automated processor, an action to incrementally advance the vehicle toward a goal with an associated incremental utility, based on at least a safety of the motion trajectories with respect to an environment of operation of the vehicle; and a task planner configured to plan the task for the vehicle with the at least one automated processor, comprising defining the goal and a sequence of the actions to advance the vehicle toward the goal, selectively dependent an optimization of an aggregate prospective utility of the task and the safety of the motion trajectories to advance the vehicle toward the goal.

It is a further object to provide a method of operating an autonomous vehicle, comprising: determining a safety of motion of the autonomous vehicle in an environment dependent on real-time conditions of operation; planning a route for the autonomous vehicle selectively dependent on the determined safety of motion of the autonomous vehicle in the environment and optimization of a utility of the planned route; planning the motion of the autonomous vehicle according to the planned route, comprising selecting motion options consistent with the planned route that are safe with respect to the environment dependent on real-time conditions of operation, wherein the planned route is responsive to the planned motion; and controlling the autonomous vehicle according to the planned route and planned motion.

A further object provides a method of controlling an autonomous vehicle, comprising: receiving data relating to a relationship of the autonomous vehicle with respect to the environment; determining a motion and environment-dependent safety of the autonomous vehicle within an environment of operation; continuously planning a utility-optimized route for an autonomous vehicle along a path having execution options within the route, updated dependent on the determined motion and environment-dependent safety of the autonomous vehicle; continuously planning the motion of the autonomous vehicle according to the planned utility-optimized route, comprising selection of the execution options which alter a relation of the autonomous vehicle with the environment, that meet at least one safety criterion with respect to the determined a motion and environment-dependent safety; and controlling the autonomous vehicle according to the planned utility-optimized route and planned motion, to thereby achieve safe and efficient travel of the autonomous vehicle.

Another object provides a method of operating a vehicle, comprising: planning a task for the vehicle, comprising a safe sequence of actions to accomplish goals which optimize the task; and planning motion of the vehicle, comprising computing motion trajectories that connect a current location with a goal location, based on at least safety with respect to surrounding vehicles.

It is an object of the invention to provide a method of operating a vehicle, comprising: planning motion of the vehicle, comprising computing motion trajectories that connect a current location with a goal location determined according to a planned task, based on a utility optimization of vehicle motion based on at least safety with respect to an environment of operation; and planning the task for the vehicle, comprising a sequence of actions to accomplish goals, selectively dependent on at least the safety.

It is an object to provide a non-transitory computer readable medium containing a program for operating a vehicle, comprising: instructions for planning motion of the vehicle, comprising computing motion trajectories that connect a current location with a goal location according to a planned task, based on a utility optimization of vehicle motion based on at least safety with respect to an environment of operation; and instructions for planning the task for the vehicle, comprising a sequence of actions to accomplish goals, selectively dependent in at least the safety.

It is a further object to provide a system for operating a vehicle, comprising: a motion planner configured to plan a motion of the vehicle, according to computed motion trajectories that connect a current location with a goal location, based on a utility optimization of vehicle motion based on at least safety with respect to an environment of operation; and a task planner configured to plan the task for the vehicle, to define a sequence of actions to accomplish goals selectively dependent on at least the safety.

It is a still further object to provide a method of operating an autonomous vehicle, comprising: determining a safety of operation of the autonomous vehicle in an environment dependent on real-time conditions of operation; planning a route for the autonomous vehicle selectively dependent on the determined safety of operation in the environment; planning motion of the autonomous vehicle according to the planned route, comprising selection of options consistent with the route that optimize a utility function and a safety with respect to the environment selectively dependent on the determined safety of operation in the environment, wherein the planned route is responsive to the planned motion; and controlling the autonomous vehicle according to the planned route and planned motion.

The selected options may be responsive to a cost of a maneuver, a benefit of the maneuver, and a determined safety of the maneuver.

The method may further comprise updating the planning of the route based on the planned motion in real time.

The safety of operation may be determined statistically based on a predicted risk.

The safety of operation may be determined based on a risk of collision.

It is another object to provide a method of controlling an autonomous vehicle, comprising: receiving data relating to a relationship of the autonomous vehicle with respect to the environment; determining a motion and environment-dependent safety of the autonomous vehicle within an environment of operation; continuously planning a route for an autonomous vehicle along a path having execution options within the route, updated dependent on the determined motion and environment-dependent safety of the autonomous vehicle; continuously planning motion of the autonomous vehicle according to the planned route, comprising selection of the execution options which alter a relation of the autonomous vehicle with the environment, that meet at least one utility criterion and at least one safety criterion; and controlling the autonomous vehicle according to the planned route and planned motion, to thereby achieve safe and efficient travel of the autonomous vehicle.

The safety may be determined based on various sensors, such as radar, lidar, video cameras, sonar, inertial sensors, OBD-II data stream (see, en.wikipedia.org/wiki/On-board_diagnostics, CANbus, ISO 15765-4), weather sensors, on-line social network database, real time traffic information database, and/or based on intervehicle communications, for example.

Where explicit intervehicle communications are supported, the task plan, the motion plan, or both may be coordinated between vehicles, either in a centralized or decentralized manner, using vehicle-to-vehicle communications. Further, sensor data may be relayed between vehicles to provide advance warning, especially to the task planner, though in some cases, short latency warnings and environmental conditions may have direct impact on the motion planning.

The environmental conditions may be local vehicular motion of another vehicle, weather conditions (rain, puddles, sun glare, black ice, snow, freezing conditions, tornado warning, hail, etc.), traffic, history of incidents (e.g., accidents, emergency maneuvers, law enforcement) at a location, obstacles and hazards at a location (e.g., detours, potholes, obstructed vision, pedestrians and cyclists, animals, children playing), etc.

In a typical case, the autonomous vehicle in a lane catches up to another vehicle travelling slower in the same lane. The motion planner considers the option of switching lanes, which may reduce overall travel time (i.e., increase efficiency), but may also lead to other obstructions in the lane, and incurs a collision risk dependent on other vehicles surrounding the autonomous vehicle. Therefore, both the incremental maneuver by the motion planner of changing lanes, and the larger plan of increasing efficiency according to a cost function or utility function, are each dependent on the safety of the autonomous vehicle. The motion planner is principally concerned with the safety of the autonomous vehicle during the maneuver, while the task planner is concerned with the change in safety before and after the maneuver, as well as the predicted safety during the maneuver and predicted safety after the maneuver. The task planner may, for example, consider distance and time, two likely important (but non-excusive) determinates of utility, which in some cases could lead to a selection of a completely different route. Other utility issues are fuel consumption, fuel availability, tolls, availability of services such as food and lodging for extended trips with human passengers, and the like.

The planning of the task may comprise specifying a task planning domain by $D^t$, including a set of states, S, and a set of actions, A; providing a factored state space such that each state $s \in S$ is defined by values of a fixed set of variables, and each action $a \in A$ is defined by its preconditions and effects; and defining a utility function which maps a state transition to a real number, which takes both a cost function Cost(s, a,s') and a safety function Safe(s,a,s') of conducting action a in state s into account.

The method may further comprise computing a plan $p \in P$, given domain $D^t$ and a task planning problem, is computed, starting from an initial state $s^{init} \in S$ and finishing in a goal state $s^g \in S$; representing a plan p, consisting of a sequence of transitions represented as $p = \langle s_0, a_0, \ldots, s_{N-1}, a_{N-1}, s_N \rangle$, where $s_0 = s^{init}$, $s^N = s^g$ and P denotes a set of satisfactory plans; and producing an optimal plan p* with a task planner $P^t$ among all the satisfactory plans, where $\gamma$ is a constant coefficient and $\gamma > 0$, $$p^* = \operatorname*{argmin}_{p \in P} \sum_{\langle s,a,s' \rangle \in p} \left[ \mathrm{Cost}(\langle s, a, s' \rangle) + \frac{\gamma}{1 + e^{\mathit{Safe}(\langle s,a,s' \rangle) - 1}} \right].$$

The method may further comprise conducting a search directly in a two-dimensional Cartesian space such that a position and an orientation of the vehicle is uniquely represented as a pose, denoted by x and constrained by the urban road network, wherein some parts of the space are designated as free space, and remaining parts are designated as obstacles, and a motion planning domain is specified by $D^m$, wherein given domain $D^m$, a motion planning problem is specified by an initial pose $x^i$ and a goal pose $x^g$.

The method may further comprise planning the motion by a motion planner $P^m$ consisting of a path planner and a tracking planner into two phases, wherein: in a first phase, the path planner computes a collision-free trajectory $\xi$ connecting pose $x^i$ and pose $x^g$ taking into account any motion constraints on the part of the vehicle with a minimal trajectory length; and in a second phase, computing control signals with a tracking controller to drive the vehicle to follow the computed trajectory.

The method may further comprise mapping a systolic state s with a state mapping function, $f:X=f(s)$, into a set of feasible poses X in a continuous space as available options for the motion planner, wherein availability of at least one pose $x \in X$ is assumed in each state s, such that the vehicle is in a free space of $D^m$, and if it is not in a free space of $D^m$, the state s is declared infeasible.

The method may further comprise computing a safety level, Safe($\langle s,a,s' \rangle$), of a motion-level implementation of a symbolic action $\langle s,a,s' \rangle$, wherein the safety level enables the task planner to incorporate a road condition into a process of sequencing high-level actions toward accomplishing complex driving tasks.

The method may further comprise computing a sequence of continuous control signals to perform symbolic action $\langle s,a,s' \rangle$, comprising an acceleration $\delta \in \Delta$ and steering angle $\theta \in \Theta$, to drive the vehicle following a trajectory, while ensuring no collision on the road, wherein sets $\Delta$ and $\Theta$ denote an operation specification of the tracking controller.

$U_s(t) \subset \Delta \times \Theta$ may specify a safe control set at time t, in which all elements, denoted by $u(t)=\langle \delta,\theta \rangle$, are safe for the vehicle to perform at time t, such that a probability of elements sampled from set $\Delta \times \Theta$ being located in the safe set $U_s$ represents the safety value of action $\langle s,a,s' \rangle$.

The method may further comprise:
receiving an input which includes a symbolic action $\langle s,a,s' \rangle$, stating mapping function $f$, motion planner $P^m$ consisting of path planner and tracking controller, and a tracking controller's operation specification sets $\Delta$ and $\Theta$;
obtaining short-period trajectories of the vehicle and surrounding vehicles, where $V_i, i \in [1, \ldots, N]$, is the ith vehicle within a sensing range of the vehicle;
iteratively:
  computing a safety estimation between the vehicle and the surrounding vehicles $V_i$, where $i \in [1, \ldots, N]$, given that the vehicle is performing action $\langle s,a,s' \rangle$, at a motion level;
  computing a safe control set $U_i^s(t)$ that includes all safe control signals with regard to the vehicle $V_i$ at time t;
  randomly sampling M elements from the set $\Delta \times \Theta$, and computing a probability $o_i(t)$ of the sampled elements falling in set $U_i^s(t)$;
  converting a list of values of safety estimation $\{o_i(t)\}$ into a single value $o^*_i$ according to $$o_i^* = \frac{\max_{t \in T}\{o_i(t)\} + \text{mean}_{t \in \mathcal{T}}\{o_i(t)\}}{2};$$

and
selecting a minimum value $o^*_i, i \in [1, \ldots, N]$, as an overall safety value, where $\mathcal{T} = t_1 + \omega \times i$, $$0 \le i \le \frac{(t_2 - t_2)}{\omega};$$

and
producing an output of an estimated safety value Safe($\langle s,a,s' \rangle) \in [0.0, 1.0]$.

The method may further comprise:
receiving inputs: Symbolic action $\langle s,a,s' \rangle$, state mapping function $f$, motion planner $P^m$, control operation sets $\Delta$ and $\Theta$;
sampling initial and goal poses, $x \leftarrow f(s)$ and $x' \leftarrow f(s')$, given action $\langle s,a,s' \rangle$, and $f$;
computing a collision-free trajectory, $\xi^E$, using $P^m$, where $\xi^E(t_1)=x, \xi(t_2)=x'$; and $[t_1, t_2]$ is the horizon;
predicting a trajectory $\xi_i^s$ for an ith surrounding vehicle $V_i$, where $i \in [1, \ldots, N]$, and $[t_1, t_2]$ is the horizon;
for each surrounding vehicle $V_i$:
  computing a safe control set $U_i^s(t)$ between the vehicle and vehicle $V_i$ at time $t \in [t_1, t_2]$, where $U_i^s(t) \subset \Delta \times \Theta$ and $$t = t_1 + \omega \times i, i \le \frac{(t_2 - t_2)}{\omega};$$

sampling M elements $\langle \delta, \theta \rangle$ randomly from set $\Delta \times \Theta$ and computing a probability $o_i(t)$ of the elements falling in set $U_i^s(t)$;
converting a list of estimated safety values, $\{o_i(t)\}$, into a scalar value $o^*_i$ using $$o_i^* = \frac{\max_{t \in T}\{o_i(t)\} + \text{mean}_{t \in \mathcal{T}}\{o_i(t)\}}{2};$$

and
selecting a minimum value, $o^*_i, i \in [1, \ldots, N]$, as a safety value.

A motion planner $P^m$ may compute both costs and safety values of the vehicle's navigation actions; $s^{init}$ may represent an initial state of the vehicle, and the goal of the task is specified using $s^g$; a task planner $P^t$ may compute a sequence of symbolic actions, employing a cost function Cost, and a safety estimation function Safe; a motion planner $P^m$ may be used for computing motion trajectories, and generating control signals to move the vehicle; and a state mapping function $f$ used for mapping symbolic states to 2D coordinates in continuous spaces.

The method may further comprise: initializing a cost function and a safety estimation function; computing an optimal task plan, $p^* = \langle s^{init}, a_0, s_1, \ldots, s^g \rangle$ wherein $s^{init}$ and $s^g$ correspond to initial and goal poses respectively; estimating a safety level, $\mu$, of action $\langle s,a,s' \rangle$; updating the safety estimation function using u and the cost function using $p^*$; and computing a new optimal plan p'.

A motion planner may compute and execute a desired control signal $\langle \delta, \theta \rangle$ repeatedly until the vehicle reaches the goal pose.

The method may further comprise:
receiving inputs comprising: an initial state $s^i$, goal specification $s^g$, task planner $P^t$, state mapping function $f$, motion planner $P^m$, and safety estimator;
initialize a cost function Cost with sampled poses $x \in f(s):\text{Cost}(\langle s,a,s' \rangle) \leftarrow A^*(x,x')$;
initialize a safety estimation function Safe with Safe$(s,a,s') \leftarrow 1.0$.
computing an optimal task plan p using Cost and Safe functions:
$p \leftarrow P^t(s^{init}, s^g, \text{Cost}, \text{Safe})$, where $p=(s^{init} \rightarrow a_0, s_1, a_1, \ldots, s^g)$
until plan p is not empty:

extracting a first action of p, ⟨s,a,s'⟩, and computing a safety value μ;

updating the Safe function: Safe(⟨∈a, s'⟩)←μ and the Cost function:

$$\text{Cost}(\langle s,a,s'\rangle) \leftarrow A^*(x,x')$$

generating a new plan: p'←P'(s, s^g, Cost, Safe);
if p'==p then x'←f(s'), and while x!=x', call a motion planner ⟨δ,θ⟩←P'''(x,x'), execute a control signal ⟨δ,θ⟩, and update the vehicle's current pose x;
removing a tuple ⟨s,a⟩ from plan p;
else updating current plan p←p'.

The task planner P^t may be implemented using Answer Set Programming (ASP).

The environment of operation may comprise surrounding vehicles, e.g., vehicles in motion.

The utility optimization may comprise minimizing a travel distance while maintaining a margin of safety.

It is also an object to provide a method of operating a vehicle, comprising: planning a task for the vehicle, comprising an efficient sequence of actions to accomplish goals, e.g., according to action knowledge; and planning motion of the vehicle, comprising computing motion trajectories that efficiently connect a current location with a goal location, based on at least surrounding vehicles to ensure safety.

It is a further object to provide a non-transitory computer readable medium containing a program for operating a vehicle, comprising: instructions for planning a task for the vehicle, comprising an efficient sequence of actions to accomplish goals, e.g., according to action knowledge; and instructions for planning motion of the vehicle, comprising computing motion trajectories that efficiently connect a current location with a goal location, based on at least surrounding vehicles to ensure safety.

It is a still further object to provide a system for operating a vehicle, comprising: a task planner configured to plan a task for the vehicle, to define an efficient sequence of actions to accomplish goals, e.g., according to action knowledge; and a motion planner configured to plan motion of the vehicle, according to computed motion trajectories that efficiently connect a current location with a goal location, based on at least surrounding vehicles to ensure safety.

Another object provides a method of operating a vehicle, comprising: planning a task for the vehicle, comprising a sequence of actions to accomplish goals, e.g., according to action knowledge; and planning motion of the vehicle, comprising computing motion trajectories that connect a current location with a goal location, based on a cost optimization of vehicle motion based at least safety with respect to surrounding vehicles.

A further object comprises a non-transitory computer readable medium containing a program for operating a vehicle, comprising: instructions for planning a task for the vehicle, comprising a sequence of actions to accomplish goals, e.g., according to action knowledge; and instructions for planning motion of the vehicle, comprising computing motion trajectories that connect a current location with a goal location, based on a cost optimization of vehicle motion based on at least safety with respect to surrounding vehicles.

A still further object provides a system for operating a vehicle, comprising: a task planner configured to plan a task for the vehicle, to define a sequence of actions to accomplish goals, e.g., according to action knowledge; and a motion planner configured to plan motion of the vehicle, according to computed motion trajectories that connect a current location with a goal location, based on a cost optimization of vehicle motion based on at least safety with respect to surrounding vehicles.

An object further provides a method of operating an autonomous vehicle, comprising: planning a route for the autonomous vehicle; planning motion of the autonomous vehicle according to the planned route, comprising selection of options consistent with the route that are cost efficient and safe with respect to surrounding vehicles; and controlling the autonomous vehicle according to the planned route and planned motion.

A further object provides a method of controlling an autonomous vehicle, comprising: planning a route for the autonomous vehicle along a path having execution options within the route; receiving data relating to a relationship of the autonomous vehicle with respect to other vehicles along the route; planning motion of the autonomous vehicle according to the planned route, comprising selection of options consistent with the route and which alter a relation of the autonomous vehicle with the other vehicles, that are cost efficient and safe with respect to the other vehicles; and controlling the autonomous vehicle according to the planned route and planned motion comprising a selected option.

BRIEF DESCRIPTION OF THE DRAWINGS

FIG. 3 shows an illustrative example of operation of the system, where the vehicle is tasked with driving from the very left to the top-right area.

FIGS. 4A-4D show results of an abstraction simulation which compare the overall performances of TMPUD and two baseline methods.

DETAILED DESCRIPTION OF THE PREFERRED EMBODIMENTS

Example 1

Figure 1A:
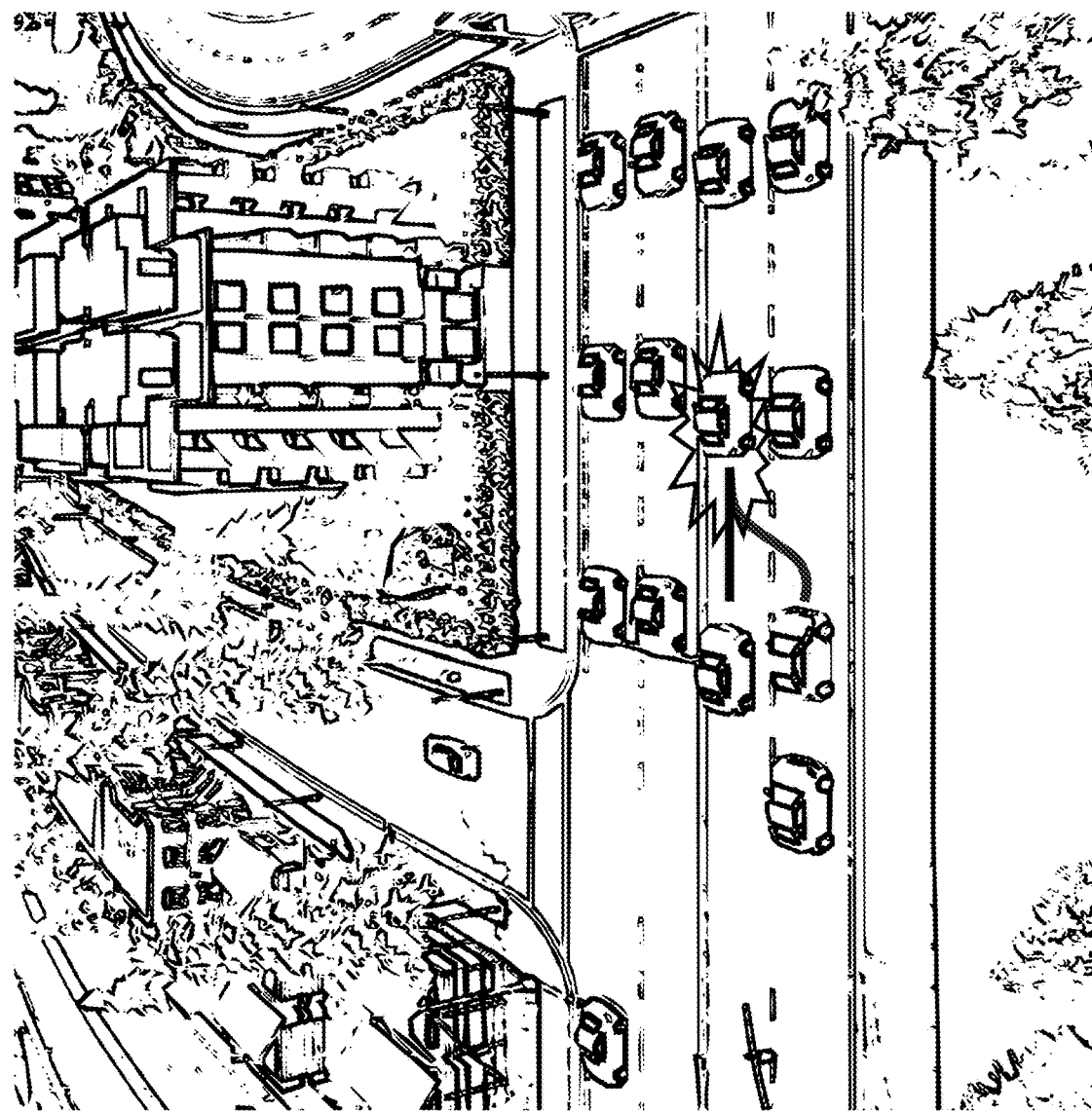
FIGS. 1A and 1B show a risky situation for the vehicle to merge left due to the busy traffic (FIG. 1A), and a safe situation for the vehicle to merge left (FIG. 1B).
Figure 1B:
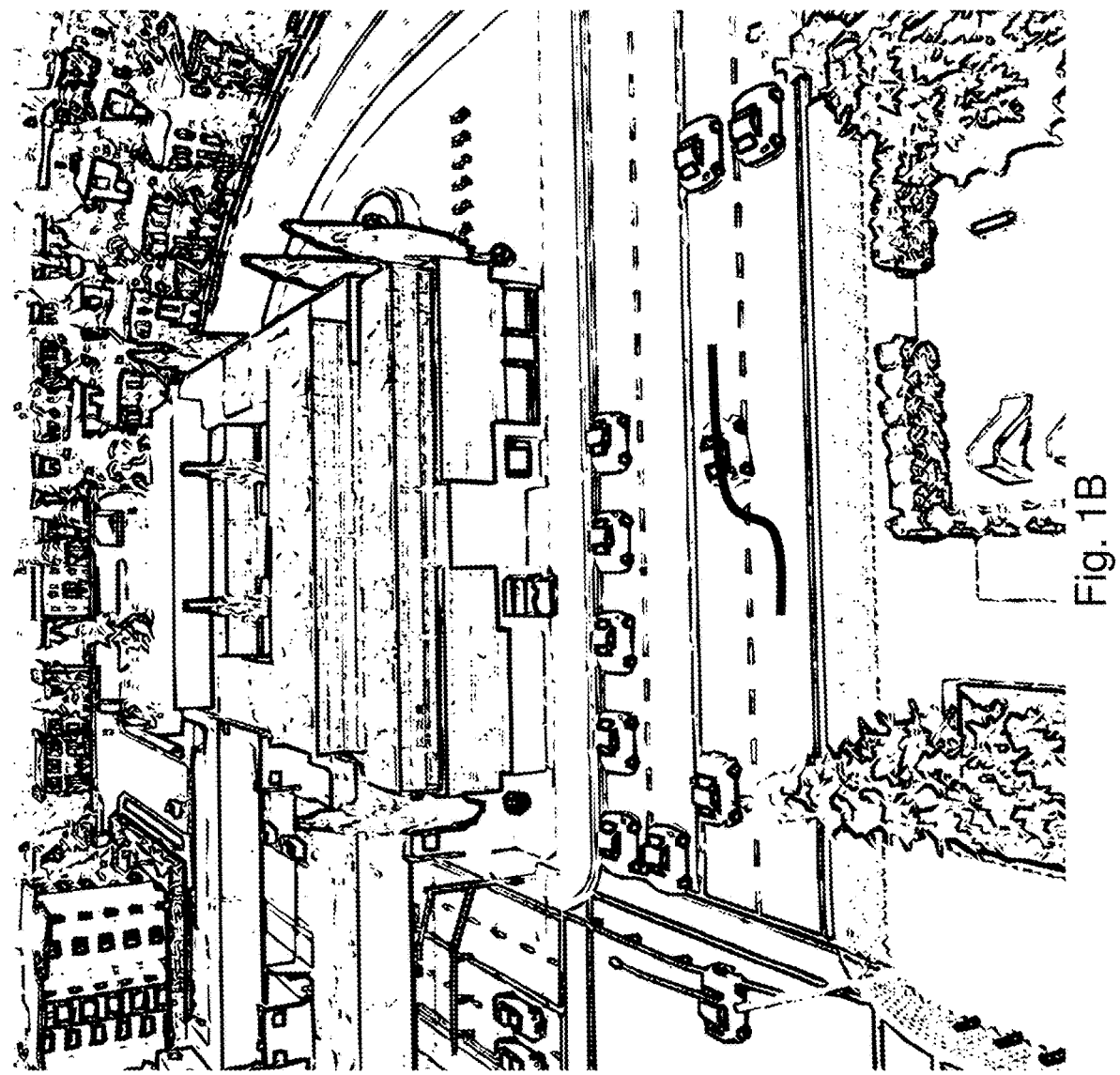
Figure 2:
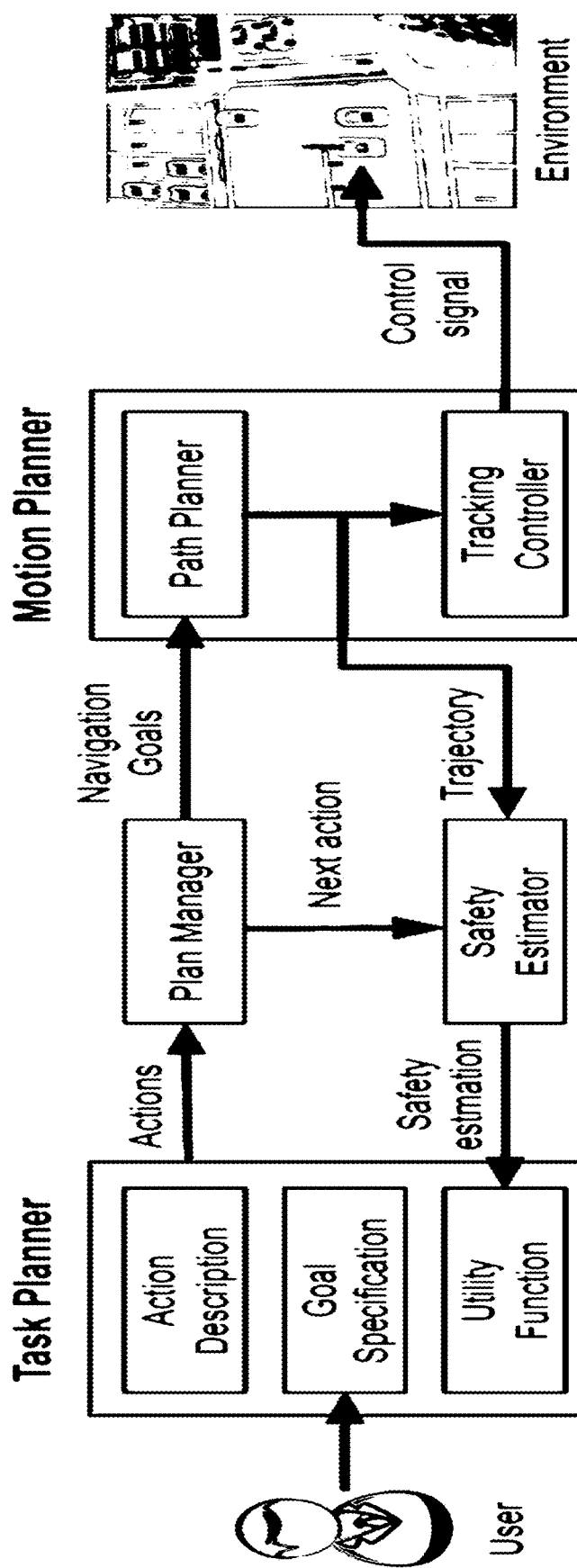
FIG. 2 shows an overview of the TMPUD algorithm that consists of four components, the task planner, plan manager, motion planner and safety estimator.

FIG. 2 shows an overview of algorithm TMPUD that consists of four components, i.e., task planner, plan manager, motion planner and safety estimator. The task planner includes components of goal specification, action description, and utility function, where users' service requests are received by the goal specification component. The task planner computes a sequence of symbolic actions that are passed to the plan manager. The plan manager generates navigation goals (i.e., a pair of two poses) to path planner, which is then used for computing a continuous trajectory for connecting 2D poses. The trajectory will be used in the two components of safety estimator and tracking controller. Safety estimator uses this trajectory to estimate actions' safety levels, and then the utility function in task planner can be updated accordingly. Tracking controller computes the desired control signals to drive the vehicle to follow the trajectory from the path planner.

FIG. 3. An illustrative example, where the vehicle is tasked with driving from the very left to the top-right area. The vehicle needs to compute plans at both task and motion levels. The vehicle starts with executing Plan A (blue color). While it is getting close to Area 1 (a red circle), the motion-level safety estimator reports a low safety value based on the local road condition. This computed safety value is incorporated into task planner's cost function. Using the updated cost function, the task planner re-computes an optimal plan (Plan B), and suggests the vehicle to go straight and merge left in Area 2. The interaction between task and motion levels, supported by TMPUD, enables the vehicle to dynamically adjust its high-level task plans to avoid unsafe behaviors.

TMPUD starts with using an optimal task planner to compute Plan A. The vehicle takes the first symbolic action from Plan A (trajectory in blue color), and executes the action using the motion planner. Getting close to Area 1, the vehicle plans to merge left. However, the safety estimator at the motion level reports a low safety value in Area 1. This computed safety value is incorporated into task planner, where the task planner integrates the safety value into its cost function, and re-computes an optimal plan, Plan B. Different from Plan A, Plan B suggests the vehicle to go straight, and merge left in Area 2. In this trial, the vehicle was able to follow Plan B all the way to the goal. TMPUD enabled the vehicle to avoid the risky behavior of merging left in Area 1 without introducing extra motion cost. See, youtu.be/8NHQYUqMyoI.

Experiments conducted in CARLA are referred as being in full simulation. All vehicles move at a constant speed (20 km/h) on average. In full simulation, ego vehicle performs the whole plan at the task level in the presence of other vehicles. Different numbers of vehicles (200 and 120) are spawned, and traffic of the two environments referred to as being heavy and normal respectively.

Running full simulation using CARLA is time-consuming, preventing conducting of large-scale experiments. For instance, results are based on tens of thousands of experimental trials, and full simulation in this scale would have required months of computation time. To conduct large numbers of experimental trials, an abstract simulation platform was developed, where action outcomes are sampled from pre-computed probabilistic world models. Parameters of the world models (for abstract simulation) are learned by repeatedly spawning the ego and surrounding vehicles in a small area, and statistically analyzing the results of the vehicles' interaction.

In particular, a large effort was made in analyzing the outcomes of "merging lane" actions due to its significant potential risks. The probabilities of the three different outcomes of "merging lane" actions were empirically computed, including "merge", "collide", and "stop". Two domain factors were introduced into the abstract simulation platform, including density and acceleration. In high-density environments, the ego vehicle is surrounded by three vehicles, while this number is reduced to one in low-density environments. In high-acceleration environments, surrounding vehicles' acceleration (in m/s2) is randomly sampled in [−1.0, 1.0], while this range is [−0.5, 0.5] in low-acceleration environments.

The goal of TMPUD is to improve task-completion efficiency (to reduce traveling distance), while guaranteeing safety. So, the two most important evaluation metrics are traveling distance and the number of unsafe behaviors, where unsafe behaviors cause either collisions or force at least one surrounding vehicle to stop (to avoid collisions).

The two baseline methods are selected from the literature, and referred to as No-communication (No-com), and Threshold-based (Th-based). The No-com baseline [13] forces the vehicle to execute all task-level actions at the motion level, while driving behaviors' safety values are not considered. The Th-based baseline [8] enables the motion planner to "reject" a task-level action when its safety value is lower than a threshold $\beta$, where a higher (lower) $\beta$ threshold makes a vehicle more conservative (aggressive). In case of an action being rejected, the task planner will compute a new plan to avoid the risky action. Three versions of the Th-based baseline were developed with different $\beta$ values (0.1, 0.3, and 0.5).

TABLE I

FULL SIMULATION: TRAVELING DISTANCE AND NUMBER OF COLLISIONS AND STOPS FOR THREE ALGORITHMS UNDER DIFFERENT TRAFFIC CONDITIONS (NORMAL AND HEAVY TRAFFIC).

| Algorithm | | Travelling Distance (m) | Num. of collisions and stops |
|---|---|---|---|
| Normal Traffic | | | |
| TMPUD | | 514 | 0 |
| Th-based | $\beta = 0.5$ | 537 | 0 |
| | $\beta = 0.3$ | 513 | 5 |
| | $\beta = 0.1$ | 478 | 24 |
| No-com | | 426 | 48 |
| Heavy Traffic | | | |
| TMPUD | | 530 | 2 |
| Th-based | $\beta = 0.5$ | 545 | 2 |
| | $\beta = 0.3$ | 528 | 7 |
| | $\beta = 0.1$ | 497 | 35 |
| No-com | | 426 | 54 |

Results from Full Simulation

Table I presents the results in comparing TMPUD to the two baseline methods. As shown in the table, in both road conditions, TMPUD achieved the lowest traveling distance, in comparison to those methods that produced compared safety levels (in terms of the number of collisions and stops). For instance, under normal traffic, only the Th-based baseline with $\beta=0.5$ was able to completely avoid collisions and stops, but it produced an average traveling distance of 537 m. In comparison, TMPUD required only 514 m, while completely avoided collisions and stops. Under heavy traffic, TMPUD (again) produced the best performance in safety (based on the number of collisions and stops), while requiring less traveling distance in comparison to the only baseline (Th-based with $\beta=0.5$) that produced comparable performance in safety. The experimental trials (200 for each approach) from full simulation took eight full workdays.

Figure 4D:
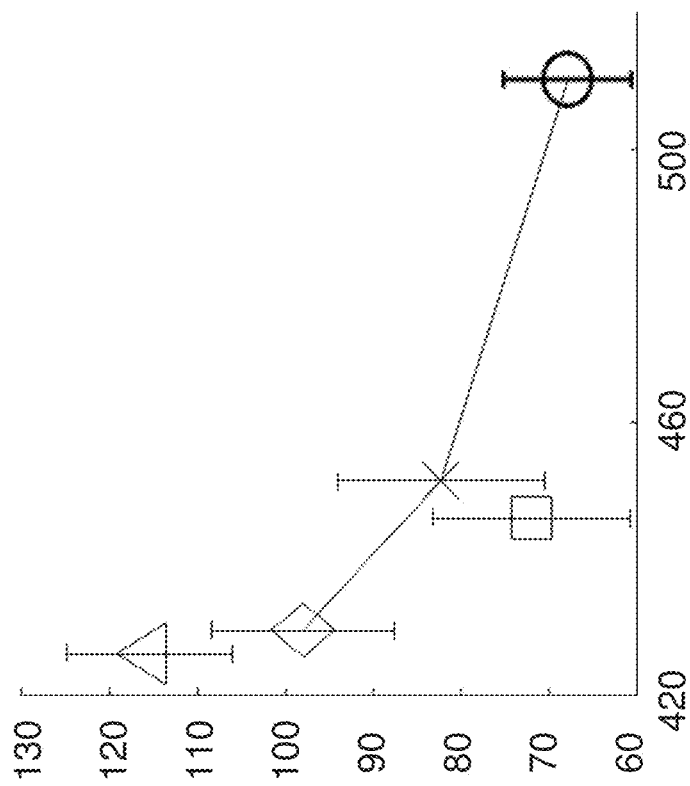
Figure 4C:
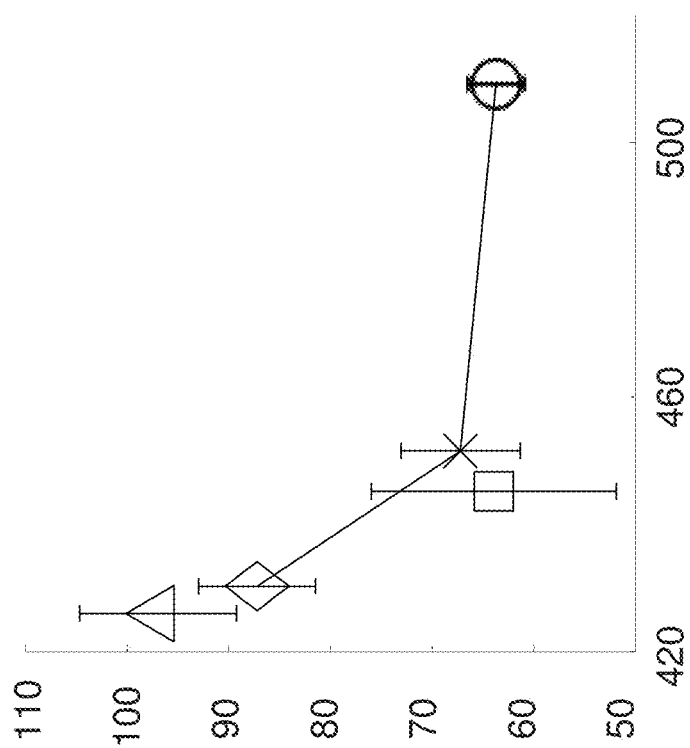

FIGS. 4A-4D show abstraction simulation of the overall performances of TMPUD and two baseline methods. The x-axis represents the average traveling distance, and the y-axis represents the total number of collisions and stops. FIGS. 4A-4D correspond to four different road conditions. The road conditions, low-density and low-acceleration (FIG. 4A), low-density and high-acceleration (FIG. 4B), high-density and low-acceleration (FIG. 4C), high-density and high-acceleration (FIG. 4D). Under each road condition, each algorithm was evaluated using 4000 trials. Batch-based evaluations were employed with four batches for significance analysis, where each batch includes 1000 trials.

Results from Abstract Simulation

FIGS. 4A-4D present the performances of TMPUD and the baseline methods in both traveling distance and the number of unsafe behaviors. The x-axis corresponds to the average traveling distance, and y-axis corresponds to the total number of collisions and stops (both are considered failure cases of driving behaviors). From FIGS. 4A-4D, TMPUD is shown to be the most efficient (x-axis) among those methods that produced comparable performances in safety (y-axis), except that Th-based (β=0.5) produced slightly less unsafe behaviors (but it performed poorly in efficiency).

There are a few side observations. Not surprisingly, No-com produced the worst performance of in safety (y-axis), though its traveling distance remains the lowest. This is because, using No-com, the vehicle blindly executes task-level actions while unrealistically believing driving behaviors are always safe. The Th-based baseline's performance depends on its safety threshold (β), where a greater value produces safer but less efficient behaviors. The results show that TMPUD improves vehicles' task-completion efficiency, while ensuring safety in different road conditions.

Focusing on urban driving scenarios, both a safety evaluation algorithm, and a task-motion planning algorithm, called TMPUD, are provided for autonomous driving. TMPUD bridges the gap between task planning and motion planning in autonomous driving. TMPUD was extensively evaluated using a 3D urban driving simulator (CARLA) and an abstract simulator. Results suggest that TMPUD improves the task-completion efficiency in different road conditions, while ensuring the safety of driving behaviors.

TMPUD may also be implemented using different task and motion planners, and these in turn may be evaluated in different testing platforms (e.g., using simulators with a physics engine) under different conditions. The technology may be applied to various autonomous mobile platforms, such as robots, drones.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine- or machines-executable instructions. For example, a module may be implemented as a hardware circuit including custom VLSI circuits or gate arrays, off-the-shelf semiconductors such as analog circuits, quantum computers, microprocessors, logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices. The absence of a module reflects the inability of system including the module to execute in given circumstances to perform the function of the respective module, and not that its physical or logical constituents are excluded, that is, the module is unavailable. In the foregoing description, numerous specific details are provided, such as examples of programming, software modules, user selections, network transactions, distributed ledgers, blockchains, smart contracts, database queries, database structures, hardware modules, hardware circuits, hardware chips, etc., to provide a thorough understanding of the present embodiments. One skilled in the relevant art will recognize, however, that the invention requires a specific implementation that requires special purpose technology for implementation, that generic hardware alone will not achieve the objectives set forth herein.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other, but in that case the unitary element must meet established criteria for each item. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an "inclusive or". Similarly, the phrase "A, B, C, or a combination thereof" or "A, B, C, or any combination thereof" includes A alone, B alone, C alone, a combination of A and B, a combination of A and C, a combination of B and C, or a combination of A, B, and C.

As used herein, whether in the above description or the following claims, the terms "comprising," "including," "carrying," "having," "containing," "involving," and the like are to be understood to be open-ended, that is, to mean including but not limited to. The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

The terms "about" or "approximately" are intended to denote a range for a quantitative parameter that achieves substantially the same result in the same manner, with either a predictable relation between input parameter and behavior, a statistically insignificant change in response with respect to the change between a nominal input parameter and another input parameter within the stated range of "about" or "approximately". Thus, a feature would be outside a range of "about" or "approximately" if the result is achieved in a substantially different manner, a substantially different result is achieved, within the range statistically significant and meaningful differences in output response are achieved based on differences between the nominal parameter and the putative one which is "about" or "approximately" the same, or the result is unpredictable to an extent that the output response unpredictable deviates from the benchmark established. "Substantially" and "significant" are interpreted according to the understanding of persons of ordinary skill in the art, dependent on the context, and are intended to represent a reasonable range of quantitative difference which may be ignored or compensated without change in cause or effect.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein. It is also understood that the algorithms are not limited by particular expressions, and rather are intended to encompass functional equivalents regardless of expression. Further, as is known and well understood, semantic expressions relating inputs or available data and output or action are themselves algorithms.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

Any embodiment of any of the systems, methods, and article of manufacture can "consist of" or "consist essentially of", rather than "comprise", "have", or "include", any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Thus, the transitional phrases "consisting of" and "consisting essentially of," respectively, shall be considered exclusionary transitional phrases, as set forth, with respect to claims, in the United States Patent Office Manual of Patent Examining Procedures. Additionally, the terms "wherein" or "whereby" may be used interchangeably with "where".

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

The phrase "configured to" means a specification or clarification of the structure or composition of an element defining what the element is, by way of a specific description of its configuration and interface with other elements or an external constraint. The phrase "adapted to" means a specification or clarification of a function or relationship of an element defining what the element does, by way of a specific description of its adaptation and interface with other elements or an external constraint. Functional language within such a specification of an element within a claim is taken to be an affirmative limitation, and not a mere intended use. Functional language or context within a claim preamble is to be considered non-limiting and outside of the claim scope, unless integrated by specific reference and inclusion by the express claim scope.

The claims hereinbelow are to be construed as excluding abstract subject matter as judicially excluded from patent protection, and the scope of all terms and phrases is to be constrained to only include that which is properly encompassed. By way of example, if a claim phrase is amenable of construction to encompass either patent eligible subject matter and patent ineligible subject matter, then the claim shall be interpreted to cover only the patent eligible subject matter. The scope of the claims shall be considered definite in accordance with the ability of a judicial or administrative court or tribunal to make this determination, regardless of any retroactive or ex post facto changes in interpretation by such court or tribunal. The various disclosure expressly provided herein, in conjunction with the incorporated references, are to be considered to encompass any combinations, permutations, and sub-combinations of the respective disclosures or portions thereof, and shall not be limited by the various exemplary combinations specifically described herein.

REFERENCES

[1] J.-F. Bonnefon, A. Shariff, and I. Rahwan, "The social dilemma of autonomous vehicles," Science, vol. 352, no. 6293, pp. 1573-1576, 2016.
[2] A. Geiger, P. Lenz, and R. Urtasun, "Are we ready for autonomous driving? the kitti vision benchmark suite," in 2012 IEEE Conference on Computer Vision and Pattern Recognition. IEEE, 2012, pp. 3354-3361.
[3] M. Maurer, J. C. Gerdes, B. Lenz, H. Winner et al., "Autonomous driving," Berlin, Germany: Springer Berlin Heidelberg, vol. 10, pp. 978-3, 2016.
[4] C. J. Haboucha, R. Ishaq, and Y. Shiftan, "User preferences regarding autonomous vehicles," Transportation Research Part C: Emerging Technologies, vol. 78, pp. 37-49, 2017.
[5] P. Koopman and M. Wagner, "Autonomous vehicle safety: An interdisciplinary challenge," IEEE Intelligent Transportation Systems Magazine, vol. 9, no. 1, pp. 90-96, 2017.
[6] P. Cao, Z. Xu, Q. Fan, and X. Liu, "Analysing driving efficiency of mandatory lane change decision for autonomous vehicles," IET Intelligent Transport Systems, vol. 13, no. 3, pp. 506-514, 2018.
[7] B. Paden, M. Cáp, S. Z. Yong, D. Yershov, and E. Frazzoli, "A survey of motion planning and control techniques for self-driving urban vehicles," IEEE Transactions on intelligent vehicles, vol. 1, no. 1, pp. 33-55, 2016.
[8] S. Srivastava, E. Fang, L. Riano, R. Chitnis, S. Russell, and P. Abbeel, "Combined task and motion planning through an extensible planner-independent interface layer," in 2014 IEEE international conference on robotics and automation (ICRA). IEEE, 2014, pp. 639-646.
[9] B. Kim, L. P. Kaelbling, and T. Lozano-Pérez, "Learning to guide task and motion planning using score-space representation," in 2017 IEEE International Conference on Robotics and Automation (ICRA). IEEE, 2017, pp. 2810-2817.
[10] C. R. Garrett, T. Lozano-Perez, and L. P. Kaelbling, "Ffrob: Leveraging symbolic planning for efficient task and motion planning," The International Journal of Robotics Research, vol. 37, no. 1, pp. 104-136, 2018.
[11] S.-Y. Lo, S. Zhang, and P. Stone, "Petlon: planning efficiently for task-level-optimal navigation," in Proceedings of the 17th International Conference on Autonomous Agents and MultiAgent Systems (AAMAS), 2018, pp. 220-228.
[12] A. Dosovitskiy, G. Ros, F. Codevilla, A. Lopez, and V. Koltun, "Carla: An open urban driving simulator," in Conference on Robot Learning, 2017, pp. 1-16.
[13] C. Chen, A. Gaschler, M. Rickert, and A. Knoll, "Task planning for highly automated driving," in 2015 IEEE Intelligent Vehicles Symposium (IV). IEEE, 2015, pp. 940-945.
[14] C. Liu and M. Tomizuka, "Control in a safe set: Addressing safety in human-robot interactions," in ASME 2014 Dynamic Systems and Control Conference. American Society of Mechanical Engineers Digital Collection, 2014.
[15] C. Liu, and M. Tomizuka, "Safe exploration: Addressing various uncertainty levels in human robot interactions," in 2015 American Control Conference (ACC). IEEE, 2015, pp. 465-470.
[16] J. Chen, B. Yuan, and M. Tomizuka, "Model-free deep reinforcement learning for urban autonomous driving," in 2019 IEEE Intelligent Transportation Systems Conference (ITSC), 2019, pp. 2765-2771.
[17] J. Chen, S. E. Li, and M. Tomizuka, "Interpretable end-to-end urban autonomous driving with latent deep reinforcement learning," arXiv preprint arXiv: 2001.08726, 2020.
[18] J. Chen, W. Zhan, and M. Tomizuka, "Autonomous driving motion planning with constrained iterative lqr," IEEE Transactions on Intelligent Vehicles, vol. 4, no. 2, pp. 244-254, 2019.
[19] C. Liu and M. Tomizuka, "Enabling safe freeway driving for automated vehicles," in 2016 American Control Conference (ACC). IEEE, 2016, pp. 3461-3467.
[20] J. Bi, V. Dhiman, T. Xiao, and C. Xu, "Learning from interventions using hierarchical policies for safe learning," in Proceedings of the Thirty-Fourth AAAI Conference on Artificial Intelligence, 2020.
[21] C. Paxton, V. Raman, G. D. Hager, and M. Kobilarov, "Combining neural networks and tree search for task and motion planning in challenging environments," in 2017 IEEE/RSJ International Conference on Intelligent Robots and Systems (IROS). IEEE, 2017, pp. 6059-6066.
[22] K. B. Lim, S. Park, S. Kim, J. M. Jeong, and Y.-S. Yoon, "Behavior planning of an unmanned ground vehicle with actively articulated suspension to negotiate geometric obstacles," in 2009 IEEE/RSJ International Conference on Intelligent Robots and Systems. IEEE, 2009, pp. 821-826.
[23] C. Xiu and H. Chen, "A behavior-based path planning for autonomous vehicle," in International Conference on Intelligent Robotics and Applications. Springer, 2010, pp. 1-9.
[24] J. Wei, J. M. Snider, T. Gu, J. M. Dolan, and B. Litkouhi, "A behavioral planning framework for autonomous driving," in 2014 IEEE Intelligent Vehicles Symposium Proceedings. IEEE, 2014, pp. 458-464.
[25] C. Chen, M. Rickert, and A. Knoll, "Combining task and motion planning for intersection assistance systems," in 2016 IEEE Intelligent Vehicles Symposium (IV). IEEE, 2016, pp. 1242-1247.
[26] S. Cambon, R. Alami, and F. Gravot, "A hybrid approach to intricate motion, manipulation and task planning," The International Journal of Robotics Research, vol. 28, no. 1, pp. 104-126, 2009.
[27] J. Wolfe, B. Marthi, and S. Russell, "Combined task and motion planning for mobile manipulation," in Twentieth International Conference on Automated Planning and Scheduling, 2010.
[28] D. S. Nau, T.-C. Au, O. Ilghami, U. Kuter, J. W. Murdock, D. Wu, and F. Yaman, "Shop2: An htn planning system," Journal of artificial intelligence research, vol. 20, pp. 379-404, 2003.
[29] E. Erdem, K. Haspalamutgil, C. Palaz, V. Patoglu, and T. Uras, "Combining high-level causal reasoning with low-level geometric reasoning and motion planning for robotic manipulation," in 2011 IEEE International Conference on Robotics and Automation. IEEE, 2011, pp. 4575-4581.
[30] A. Houenou, P. Bonnifait, V. Cherfaoui, and W. Yao, "Vehicle trajectory prediction based on motion model and maneuver recognition," in 2013 IEEE/RSJ international conference on intelligent robots and systems. IEEE, 2013, pp. 4363-4369.

[31] S. Ammoun and F. Nashashibi, "Real time trajectory prediction for collision risk estimation between vehicles," in 2009 IEEE 5th International Conference on Intelligent Computer Communication and Processing. IEEE, 2009, pp. 417-422.

[32] V. Lifschitz, "Answer set programming and plan generation," Artificial Intelligence, vol. 138, no. 1-2, pp. 39-54, 2002.

S. Amiri, S. Bajracharya, C. Goktolgal, J. Thomason, and S. Zhang, "Augmenting knowledge through statistical, goal-oriented human-robot dialog," in 2019 IEEE/RSJ International Conference on Intelligent Robots and Systems (IROS). IEEE, 2019, pp. 744-750.

[34] Y.-q. Jiang, S.-q. Zhang, P. Khandelwal, and P. Stone, "Task planning in robotics: an empirical comparison of pddl- and asp-based systems," Frontiers of Information Technology & Electronic Engineering, vol. 20, no. 3, pp. 363-373, 2019.

[35] M. T. Emirler, I. M. C. Uygan, B. Aksun Güvenc, and L. Güvenc, "Robust pid steering control in parameter space for highly automated driving," International Journal of Vehicular Technology, 2014.

[36] S. Shah, D. Dey, C. Lovett, and A. Kapoor, "Airsim: High-fidelity visual and physical simulation for autonomous vehicles," in Field and service robotics. Springer, 2018, pp. 621-635.

[37] N. Koenig and A. Howard, "Design and use paradigms for gazebo, an open-source multi-robot simulator," in 2004 IEEE/RSJ International Conference on Intelligent Robots and Systems (IROS)(IEEE Cat. No. 04CH37566), vol. 3. IEEE, 2004, pp. 2149-2154.

[38] Rajasekaran, Sanguthevar, and Suneeta Ramaswami. "Optimal mesh algorithms for the Voronoi diagram of line segments and motion planning in the plane." Journal of Parallel and Distributed Computing 26, no. 1 (1995): 99-115.

[39] Ahmed, Nizam. "Robot Motion Planning." (1997).

[40] Hopcroft, John E., and Gordon T. Wilfong. "Reducing multiple object motion planning to graph searching." SIAM Journal on Computing 15, no. 3 (1986): 768-785.

[41] Tang, Kai. "On computing contact configurations of a curved chain." Graphical Models and Image Processing 61, no. 6 (1999): 341-361.

[42] Garrett, Caelan Reed, Tomis Lozano-Pdrez, and Leslie Pack Kaelbling. "FFRob: An efficient heuristic for task and motion planning." In Algorithmic Foundations of Robotics XI, pp. 179-195. Springer, Cham, 2015.

[43] Kaelbling, Leslie Pack, and Tomás Lozano-Pérez. "Integrated task and motion planning in belief space." The International Journal of Robotics Research 32, no. 9-10 (2013): 1194-1227.

[44] Garrett, Caelan Reed, Rohan Chitnis, Rachel Holladay, Beomjoon Kim, Tom Silver, Leslie Pack Kaelbling, and Tomis Lozano-Pdrez. "Integrated task and motion planning." arXiv preprint arXiv:2010.01083 (2020).

[45] Dantam, Neil T., Zachary K. Kingston, Swarat Chaudhuri, and *Lydia* E. Kavraki. "An incremental constraint-based framework for task and motion planning." The International Journal of Robotics Research 37, no. 10 (2018): 1134-1151.

[46] Rao, Nageswara S. V. "An Algorithmic Framework for Robot Navigation in Unknown Terrains." (1988).

[47] Ramaswami, Suneeta. "Algorithmic Motion Planning and Related Geometric Problems on Parallel Machines (Dissertation Proposal)." (1993).

[48] Guibas, Leonidas J., Micha Sharir, and Shmuel Sifrony. "On the general motion-planning problem with two degrees of freedom." Discrete & Computational Geometry 4, no. 5 (1989): 491-521.

[49] Halperin, Dan. "On the complexity of a single cell in certain arrangements of surfaces related to motion planning." Discrete & Computational Geometry 11, no. 1 (1994): 1-33.

[50] Srivastava, Siddharth, Eugene Fang, Lorenzo Riano, Rohan Chitnis, Stuart Russell, and Pieter Abbeel. "Combined task and motion planning through an extensible planner-independent interface layer." In 2014 IEEE international conference on robotics and automation (ICRA), pp. 639-646. IEEE, 2014.

[51] Kedem, Klara, and Micha Sharir. "An efficient motion-planning algorithm for a convex polygonal object in two-dimensional polygonal space." Discrete & Computational Geometry 5, no. 1 (1990): 43-75.

[52] Lagriffoul, Fabien, Neil T. Dantam, Caelan Garrett, Aliakbar Akbari, Siddharth Srivastava, and Lydia E. Kavraki. "Platform-independent benchmarks for task and motion planning." IEEE Robotics and Automation Letters 3, no. 4 (2018): 3765-3772.

[53] Garrett, Caelan Reed, Tomis Lozano-Pdrez, and Leslie Pack Kaelbling. "FFRob: An efficient heuristic for task and motion planning." In Algorithmic Foundations of Robotics XI, pp. 179-195. Springer, Cham, 2015.

[54] Halperin, Dan, Mark H. Overmars, and Micha Sharir. "Efficient motion planning for an L-shaped object." SIAM Journal on Computing 21, no. 1 (1992): 1-23.

[55] Kaelbling, Leslie Pack, and Tomis Lozano-Pdrez. "Hierarchical task and motion planning in the now." In 2011 IEEE International Conference on Robotics and Automation, pp. 1470-1477. IEEE, 2011.

[56] Dantam, Neil T., Zachary K. Kingston, Swarat Chaudhuri, and *Lydia* E. Kavraki. "Incremental Task and Motion Planning: A Constraint-Based Approach." In Robotics: Science and systems, vol. 12, p. 00052. 2016.

[57] Koltun, Vladlen. "Pianos are not flat: Rigid motion planning in three dimensions." In Symposium on Discrete Algorithms: Proceedings of the sixteenth annual ACM-SIAM symposium on Discrete algorithms, vol. 23, no. 25, pp. 505-514. 2005.

[58] Lagriffoul, Fabien, Dimitar Dimitrov, Julien Bidot, Alessandro Saffiotti, and Lars Karlsson. "Efficiently combining task and motion planning using geometric constraints." The International Journal of Robotics Research 33, no. 14 (2014): 1726-1747.

[59] van der Stappen, A. Frank, Mark H. Overmars, Mark de Berg, and Jules Vleugels. "Motion planning in environments with low obstacle density." Discrete & Computational Geometry 20, no. 4 (1998): 561-587.

[60] Kornev, Ivan I., Vladislav I. Kibalov, and Oleg Shipitko. "Local path planning algorithm for autonomous vehicle based on multi-objective trajectory optimization in state lattice." In Thirteenth International Conference on Machine Vision, vol. 11605, p. 116051I. International Society for Optics and Photonics, 2021.

[61] Seccamonte, Francesco, Juraj Kabzan, and Emilio Frazzoli. "On Maximizing Lateral Clearance of an Autonomous Vehicle in Urban Environments." In 2019 IEEE Intelligent Transportation Systems Conference (ITSC), pp. 1819-1825. IEEE, 2019.

[62] Broadhurst, Adrian, Simon Baker, and Takeo Kanade. A prediction and planning framework for road safety analysis, obstacle avoidance and driver information. Carnegie Mellon University, the Robotics Institute, 2004.

[63] Sisbot, Emrah Akin, Aurdlie Clodic, Rachid Alami, and Maxime Ransan. "Supervision and motion planning for a mobile manipulator interacting with humans." In Proceedings of the 3rd ACM/IEEE international conference on Human robot interaction, pp. 327-334. 2008.

[64] Best, Andrew, Sahil Narang, Daniel Barber, and Dinesh Manocha. "Autonovi: Autonomous vehicle planning with dynamic maneuvers and traffic constraints." In 2017 IEEE/RSJ International Conference on Intelligent Robots and Systems (IROS), pp. 2629-2636. IEEE, 2017.

What is claimed is:

1. A method of operating a vehicle, comprising:

automatically planning a motion of the vehicle with an automated motion planner $P^m$, which conducts a search in a motion planning domain $D^m$ to determine and optimum motion plan comprising an action a which solves a motion planning problem specified by an initial pose $x^i$ representing a first position and a first orientation of the vehicle, a goal pose $x^g$ representing a second position and a second orientation of the vehicle, and a road network providing constraints on the vehicle, and produces a control signal $\langle \delta, \theta \rangle$, wherein $\delta \in \Delta$ is an acceleration and $\theta \in \Theta$ is a steering angle of control operation sets $\Delta$ and $\Theta$, such that $\langle \delta, \theta \rangle \leftarrow P^m(x, x')$ to achieve a collision-free motion trajectory $\xi$ connecting the initial pose $x^i$ and the goal pose $x^g$ taking into account the constraints on the vehicle, to incrementally advance the vehicle toward a goal, the optimum motion plan comprising action a being selected dependent on an associated utility of the incremental advance that represents a change in value, based on at least a safety of the motion trajectory with respect to an environment of operation of the vehicle, a benefit resulting from the incremental advance, and a cost of the incremental advance; and automatically planning a task for the vehicle with an automated task planner $P^t$, the task comprising a sequence of the actions to advance the vehicle toward the goal, selectively dependent on an optimization of an aggregate prospective utility of the task comprising the benefit resulting from achieving the goal, the costs associated with the sequence of actions, and the safety of the sequence of actions to advance the vehicle toward the goal, wherein the planning a task comprises:

calculating a plan $p \in P$ of a set of plans P based on a task planning problem within a task planning domain by $D^t$, including a set of states S within a factored state space, such that each state $s \in S$ is defined by values of a fixed set of variables, the task planning problem comprising an initial state $s^{init} \in S$, a goal state $s^g \in S$, and a set of actions A, each action $a \in A$ being defined by its starting state s and resulting state s', the plan p consisting of a sequence of transitions represented as $p = \langle s_0, a_0, \ldots, s_{N-1}, a_{N-1}, s_N \rangle$, where $s_0 = s^{init}$, $s^N = s^g$;

defining a utility function dependent on at least a cost function Cost(s,a,s') and a safety function Safe(s,a,s') of conducting action $\langle s,a,s' \rangle$ in state s; and producing an optimal plan $$p^* = \operatorname*{argmin}_{p \in P} f(\text{Cost}(\langle s, a, s' \rangle), \text{Safe}(\langle s, a, s' \rangle))$$

based on the utility function.

2. The method according to claim 1, wherein the optimum plan p* is produced based on the utility function $$p^* = \operatorname*{argmin}_{p \in P} \sum_{\langle s,a,s' \rangle \in p} \left[ \text{Cost}(\langle s, a, s' \rangle) + \frac{\gamma}{1 + e^{\text{Safe}(\langle s,a,s' \rangle) - 1}} \right].$$

where $\gamma$ is a constant coefficient and $\gamma > 0$.

3. The method according to claim 1, wherein the optimum action a comprises stopping the vehicle to avoid a collision.

4. The method according to claim 1, wherein the search is conducted directly in a two-dimensional Cartesian space such that the position and the orientation of the vehicle is uniquely represented as the pose, denoted by x and constrained by an urban road network, wherein some parts of the space are designated as free space, and remaining parts are designated as obstacles.

5. The method according to claim 4, further comprising:
planning the motion a with the motion planner $P^m$ comprising a path planner and a tracking planner;
calculating with the path planner in a first phase, the collision-free trajectory $\xi$ connecting the initial pose $x^i$ and the goal pose $x^g$ taking into account any motion constraints on the vehicle with a minimal trajectory length;
defining with the tracking planner in a second phase, control signal $\langle \delta, \theta \rangle$ to drive the vehicle to follow the calculated collision-free trajectory $\xi$; and
mapping the states s with a state mapping function, $f: X = f(s)$, into a set of feasible poses X in a continuous space as available options for the motion planner $P^m$, wherein availability of at least one pose $x \in X$ is assumed in each state s, such that if state s is feasible, the vehicle is in a free space of $D^m$, and if state S is infeasible, the vehicle is not in a free space of $D^m$.

6. The method according to claim 1, further comprising:
calculating the safety level, Safe($\langle s,a,s' \rangle$), of a motion-level implementation of the action $\langle s, a, s' \rangle$, wherein the safety level enables the task planner to incorporate a road condition into a process of sequencing actions toward accomplishing complex driving tasks; and
calculating a sequence of continuous sequence of the control signal $\langle \delta, \theta \rangle$ to perform the action $\langle s,a,s' \rangle$, comprising the acceleration $\delta \in \Delta$ and the steering angle $\theta \in \Theta$, to drive the vehicle following the collision-free trajectory, while ensuring no collision on the road, wherein sets $\Delta$ and $\Theta$ denote an operation specification of a tracking controller to drive the vehicle to follow a collision-free trajectory,
wherein $U_s(t) \cup \Delta \times \Theta$ specifies a safe control set at time t, in which all elements, denoted by $u(t) = \langle \delta, \theta \rangle$, are safe for the vehicle to perform at time t, such that a probability of elements sampled from set Δ×Θ being located in the safe control set $U_s$ represents the safety level of action ⟨s,a,s'⟩.

7. The method according to claim 1, further comprising:
receiving an input which includes the action ⟨s,a,s'⟩, a state mapping function $f$, the motion planner $P^m$ consisting of path planner and tracking controller, and a tracking controller's operation specification sets Δ and Θ;
obtaining short-period trajectories of the vehicle and surrounding vehicles, where $V_i$, i∈[1, ..., N] is an ith vehicle within a sensing range of the vehicle;
iteratively:
estimating a safety between the vehicle and the surrounding vehicles $V_i$, where i∈[1, ..., N], given that the vehicle is performing action ⟨s,a,s'⟩ at a motion level;
calculating a safe control set $U_i^s(t)$ that includes all safe control signals with regard to the surrounding vehicles $V_i$ at time t;
randomly sampling M elements from a set Δ×Θ, and calculating a probability $o_i(t)$ of the sampled elements falling in set $U_i^s(t)$;
converting a list of values of the estimation of safety $\{o_i(t)\}$ into a single value $o^*_i$ according to $$o_i^* = \frac{\max_{t \in T}\{o_i(t)\} + \text{mean}_{t \in \mathcal{T}}\{o_i(t)\}}{2};$$

and
selecting a minimum value, $o^*_i$, i∈[1, ..., N], as an overall safety value, where $$0 \le i \le \frac{(t_2 - t_2)}{\omega};$$

and
producing an output of an estimated safety value Safe(⟨s,a,s'⟩)∈[0.0,1.0].

8. The method according to claim 1, further comprising:
receiving inputs:
action ⟨s,a,s'⟩,
state mapping function $f$,
motion planner $P^m$, and
control operation sets Δ and Θ;
sampling initial and goal poses x←$f$(s) and x'←$f$(s'), given action ⟨s,a,s'⟩, and $f$;
calculating a collision-free trajectory $\xi^E$, using $P^m$(x,x'), where $\xi^E$=x, $\xi(t_2)$=x', and $[t_1, t_2]$ is a horizon;
predicting a trajectory $\xi_i^s$ for an ith surrounding vehicle $V_i$, where i∈[1, ..., N], and $[t_1, t_2]$ is the horizon;
for each surrounding vehicle $V_i$:
calculating a safe control set $U_i^s(t)$ between the vehicle and surrounding vehicle $V_i$ at time t∈$[t_1,t_2]$, where $U_i^s(t) \cup \Delta \times \Theta$ and $$t = t_1 + \omega \times i, i \le \frac{(t_2 - t_2)}{\omega}$$

sampling M elements randomly from set Δ×Θ and calculating a probability $o_i(t)$ of the elements falling in set $U_i^s(t)$; and
converting a list of estimated safety values, $\{o_i(t)\}$, into a scalar value $o^*_i$ using $$o_i^* = \frac{\max_{t \in T}\{o_i(t)\} + \text{mean}_{t \in \mathcal{T}}\{o_i(t)\}}{2};$$

and
selecting a minimum value, $o^*_i$, i∈[1, ..., N], as a safety value.

9. The method according to claim 1, further comprising:
calculating both costs and safety values of the vehicle's navigation actions with the motion planner $P^m$ to produce motion trajectories;
generating the control signal ⟨δ,θ⟩ to move the vehicle;
mapping states s to 2D coordinates in continuous spaces using a state mapping function $f$.

10. The method according to claim 1, further comprising:
initializing the cost function Cost(s,a,s') and the safety function Safe(s,a,s');
estimating a safety level, μ, of action ⟨s,a,s'⟩;
updating the safety function Safe(s,a,s') using μ and the cost function Cost(s,a,s') using p*; and
calculating a new optimal plan p'.

11. The method according to claim 10, further comprising:
calculating and executing the control signal ⟨δ,θ⟩ repeatedly until the vehicle reaches the goal pose $s^g$ with the motion planner $P^m$ having as an output ⟨δ,θ⟩;
initializing the cost function Cost(s,a,s') with sampled poses x∈$f$(s): Cost (⟨s,a,s'⟩)←A* (x,x');
initializing the safety function Safe(s,a,s') with Safe(s,a,s')←1.0;
calculating the optimal task plan p using the cost function Cost(s,a,s') and the safety function Safe(s,a,s'):
p←P'($s^{init}$, $s^g$, Cost, Safe), where p=⟨$s^{init}$→$a_0$, $s_1$, $a_1$, ..., $s^g$⟩
until plan p is not empty:
extracting a first action of p,⟨s,a,s'⟩, and calculating a safety value μ;
updating the safety function Safe(s,a,s'): Safe(⟨∈a, s' ⟩)←μ and the cost function Cost(s,a,s'):Cost (⟨s,a,s'⟩)←A*(x,x');
generating a new plan: p'←P'(s, $s^g$, Cost, Safe); and
if p'==p
then x'←$f$(s'), and while x!=x',
calling the motion planner ⟨δ,θ⟩←$P^m$(x, x'), executing the control signal ⟨δ,θ⟩, and updating the vehicle's current pose x;
removing a tuple ⟨s,a⟩ from plan p;
else updating current plan p←p'.

12. The method according to claim 1, wherein the task is planned with a task planner P', implemented using Answer Set Programming (ASP).

13. The method according to claim 1, wherein the environment of operation comprises surrounding vehicles, wherein the surrounding vehicles are in motion.

14. The method according to claim 1, wherein the optimization of the aggregate prospective utility comprises minimizing with a travel distance of the vehicle while maintaining a margin of safety.

15. The method according to claim 1,
wherein the vehicle is an autonomous vehicle, and the task comprises navigating a route, further comprising determining a safety with respect to the environment of the vehicle dependent on real-time conditions of operation,
said automatically planning the task comprising selecting motion trajectory options consistent with the task that are safe with respect to a safety threshold, wherein the action comprises a maneuver, and the selected options are responsive to a cost of the maneuver, a utility of the maneuver, and a determined safety of the maneuver;
further comprising controlling the autonomous vehicle according to the planned motion.

16. The method according to claim 1, further comprising automatically updating the planning of motion and planning of the task in real time dependent on real-time conditions of operation of the vehicle.

17. The method according to claim 1, wherein the safety is automatically statistically determined by the automated processor based on a predicted risk, comprising a risk of collision.

18. The method according to claim 1,
wherein the vehicle is an autonomous vehicle,
the method further comprising:
receiving data relating to a relationship of the vehicle with respect to the environment of operation;
determining the safety of the motion trajectories comprising a motion and environment-dependent safety of the vehicle within the environment of operation dependent on the received data;
said automatically planning the task comprising continuously planning a utility-optimized route for the vehicle along a path toward the goal having execution options within the route, updated dependent on the determined motion and environment-dependent safety of the autonomous vehicle;
the utility-optimized route comprising a selection of the execution options which alter a relation of the vehicle with the environment of operation, that meet at least one safety criterion with respect to the determined motion and environment-dependent safety; and
controlling the vehicle according to the utility-optimized route and automatically planned motion, to thereby achieve safe and efficient advancement of the vehicle toward the goal.

19. A computer readable medium containing non-transitory instructions for controlling a programmable processor of an autonomous vehicle, comprising:
instructions for automatically planning a motion of the vehicle with an automated motion planner $P^m$, which conducts a search in a motion planning domain $D^m$ to determine and optimum motion plan comprising an action a which solves a motion planning problem specified instructions for producing an optimal plan $$p^* = \underset{p \in P}{\arg\min} f(\text{Cost}(\langle s, a, s' \rangle), \text{Safe}(\langle s, a, s' \rangle))$$

based on the utility function.

20. A system for operating a vehicle, comprising:
a sensor configured to receive information about an environment of operation of the vehicle;
an automated motion planner $P^m$ configured to plan a motion of the vehicle, which conducts a search in a motion planning domain $D^m$ to determine and optimum motion plan comprising an action a which solves a motion planning problem specified by an initial pose $x^i$ representing a first position and a first orientation of the vehicle, a goal pose $x^g$ representing a second position and a second orientation of the vehicle, and a road network providing constraints on the vehicle, and produces a control signal $\langle \delta, \theta \rangle$, wherein $\delta \in \Delta$ is an acceleration and $\theta \in \Theta$ is a steering angle of control operation sets $\Delta$ and $\Theta$, such that $\langle \delta, \theta \rangle \leftarrow P^m(x, x')$, to achieve a collision-free motion trajectory $\xi$ connecting the initial pose $x^i$ and the goal pose $x^g$ and taking into account the constraints on the vehicle, to incrementally advance the vehicle toward a goal, the optimum motion plan comprising action a being selected dependent on an associated utility of the incremental advance that represents a change in value, based on at least a safety of the motion trajectory with respect to an environment of operation of the vehicle, a benefit resulting from the incremental advance, and a cost of the incremental advance; and
an automated task planner $P^t$ configured to automatically plan a task for the vehicle, the task comprising a sequence of the actions to advance the vehicle toward the goal, selectively dependent on an optimization of an aggregate prospective utility of the task comprising the benefit resulting from achieving the goal, the costs associated with the sequence of actions, and the safety of the sequence of actions to advance the vehicle toward the goal, wherein the task is planned by:
calculation of a plan $p \in P$ of a set of plans P based on a task planning problem within a task planning domain by $D^t$, including a set of states S within a factored state space, such that each state $s \in S$ is defined by values of a fixed set of variables, the task by an initial pose $x^i$ representing a first position and a first orientation of the vehicle, a goal pose $x^g$ representing a second position and a second orientation of the vehicle, and a road network providing constraints on the vehicle, and produces a control signal, $\langle \delta, \theta \rangle$, wherein $\delta \in \Delta$ A is an acceleration and $\theta \in \Theta$ is a steering angle of control operation sets $\Delta$ and $\Theta$, such that $\langle \delta, \theta \rangle \leftarrow P^m(x, x')$, to achieve a collision-free motion trajectory $\xi$ connecting the initial pose $x^i$ and the goal pose $x^g$ taking into account the constraints on the vehicle, to incrementally advance the vehicle toward a goal, the optimum motion plan comprising action a being selected dependent on an associated utility of the incremental advance that represents a change in value, based on at least a safety of the motion trajectory with respect to an environment of operation of the vehicle, a benefit resulting from the incremental advance, and a cost of the incremental advance; and
instructions for automatically planning a task for the vehicle with an automated task planner $P^t$, the task comprising a sequence of the actions to advance the vehicle toward the goal, selectively dependent on an optimization of an aggregate prospective utility of the task comprising the benefit resulting from achieving the goal, the costs associated with the sequence of actions, and the safety of the sequence of actions to advance the vehicle toward the goal, comprising:

instructions for calculating a plan p∈P of a set of plans P based on a task planning problem within a task planning domain by $D^r$, including a set of states S within a factored state space, such that each state s∈S is defined by values of a fixed set of variables, the task planning problem comprising an initial state $s^{init}$∈S, a goal state $s^g$∈S, and a set of actions A, each action a∈A being defined by its starting state s and resulting state s', the plan p consisting of a sequence of transitions represented as p=⟨$s_0$, $a_0$, . . . , $s_{N-1}$, $a_{N-1}$, $s_N$⟩, where $s_0$=$s^{init}$, $s^N$=$s^g$;

instructions defining a utility function dependent on at least a cost function Cost(s,a,s') and a safety function Safe(s,a,s') of conducting action ⟨s,a,s'⟩ in state s; and planning problem comprising an initial state $s^{init}$∈S', a goal state $s^g$∈S, and a set of actions A, each action a∈A being defined by its starting state s and resulting state s', the plan p consisting of a sequence of transitions represented as p=⟨$s_0$, $a_0$, . . . , $s_{N-1}$, $a_{N-1}$, $s_N$⟩, where $s_0$=$s^{init}$, $s^N$=$s^g$;

determining an optimal plan p* according to a utility function $$p = \langle s_0, a_0, \ldots, s_{N-1}, a_{N-1}, s_N \rangle,$$

dependent on at least a cost function Cost(s,a,s') and a safety function Safe(s,a,s') of conducting action ⟨s,a,s'⟩ in state s; and an output configured to control the vehicle according to the control signal ⟨δ,θ⟩ of the planned motion.

* * * * *